United States Patent
Magness

(10) Patent No.: US 12,502,305 B2
(45) Date of Patent: Dec. 23, 2025

(54) DENTAL APPLIANCE FOR TREATMENT OF BRUXISM AND SLEEP APNEA

(71) Applicant: R. Joseph Magness, Orem, UT (US)

(72) Inventor: R. Joseph Magness, Orem, UT (US)

(*) Notice: Subject to any disclaimer, the term of this patent is extended or adjusted under 35 U.S.C. 154(b) by 1131 days.

(21) Appl. No.: 16/889,662

(22) Filed: Jun. 1, 2020

(65) Prior Publication Data

US 2020/0375790 A1 Dec. 3, 2020

Related U.S. Application Data

(60) Provisional application No. 62/910,455, filed on Oct. 4, 2019, provisional application No. 62/855,792, filed on May 31, 2019.

(51) Int. Cl.
*A61F 5/56* (2006.01)
*B29C 64/386* (2017.01)
(Continued)

(52) U.S. Cl.
CPC ............ *A61F 5/566* (2013.01); *B29C 64/386* (2017.08); *B33Y 50/00* (2014.12); *B33Y 80/00* (2014.12);
(Continued)

(58) Field of Classification Search
CPC .. A61F 5/566; A61F 2005/563; B29C 64/386; B33Y 50/00; B33Y 80/00; G16H 50/50; B29L 2031/753
See application file for complete search history.

(56) References Cited

U.S. PATENT DOCUMENTS

| 4,304,227 A | 12/1981 | Samelson |
| 4,997,182 A * | 3/1991 | Kussick ............... A61F 5/58 |
| | | 482/11 |

(Continued)

FOREIGN PATENT DOCUMENTS

| EP | 2730258 A1 | 5/2014 |
| JP | 5404642 | 2/2014 |

(Continued)

OTHER PUBLICATIONS

Emad Ahmed Awad et al. "Treatment of retroglossal obstruction in adult obstructive sleep apnea with tongue retaining device: A clinical report", Current Science International, 2017, vol. 06, Issue 03, pp. 723-728.

(Continued)

*Primary Examiner* — Rachael E Bredefeld
*Assistant Examiner* — Seth R. Brown
(74) *Attorney, Agent, or Firm* — Young Basile Hanlon & MacFarlane, P.C.

(57) ABSTRACT

A dental appliance is disclosed. The appliance may include an arcuate base shaped to extend along at least a portion of an upper dental arch of a patient and match with a custom fit at least certain maxillary teeth of the patient. The appliance may further include a tongue-retention feature. The tongue-retention feature may connect to the arcuate base and comprise a palatal portion and a sublingual portion. The sublingual portion may cooperate with the palatal portion to form a cavity shaped to receive an anterior portion of a tongue of the patient therewithin. The palatal portion may have an exterior surface custom-formed to match at least a portion of a hard palate of the patient.

20 Claims, 45 Drawing Sheets

(51) Int. Cl.
*B29L 31/00* (2006.01)
*B33Y 50/00* (2015.01)
*B33Y 80/00* (2015.01)
*G16H 50/50* (2018.01)

(52) U.S. Cl.
CPC ........ *G16H 50/50* (2018.01); *A61F 2005/563* (2013.01); *B29L 2031/753* (2013.01)

(56) References Cited

U.S. PATENT DOCUMENTS

| | | | |
|---|---|---|---|
| 5,649,540 | A | 7/1997 | Alvarez et al. |
| 5,682,903 | A | 11/1997 | Meade |
| 6,494,209 | B2 | 12/2002 | Kulick |
| 6,837,246 | B1 * | 1/2005 | DeLuke ............... A61F 5/566 |
| | | | 128/862 |
| 6,877,513 | B2 | 4/2005 | Scarberry et al. |
| 7,607,439 | B2 | 10/2009 | Li |
| 8,196,587 | B2 | 6/2012 | Chodorow |
| 8,261,748 | B1 | 9/2012 | Goldberg |
| 9,956,111 | B2 | 5/2018 | Togliatti |
| 10,080,680 | B2 | 9/2018 | Magness |
| 10,285,782 | B2 | 5/2019 | Mauclaire |
| 2007/0183572 | A1 | 8/2007 | Drummond et al. |
| 2009/0126742 | A1 | 5/2009 | Summer |
| 2013/0092176 | A1 | 4/2013 | Li |
| 2016/0022474 | A1 * | 1/2016 | Magness ............... A61F 5/566 |
| | | | 128/848 |
| 2018/0200102 | A1 | 7/2018 | Magness |
| 2018/0207020 | A1 | 7/2018 | Hart et al. |
| 2019/0091060 | A1 | 3/2019 | Shah |

FOREIGN PATENT DOCUMENTS

| | | |
|---|---|---|
| WO | 2009064914 | 5/2009 |
| WO | 2011/060103 A1 | 5/2011 |
| WO | 2018/045135 A1 | 3/2018 |
| WO | 2019034742 A1 | 2/2019 |
| WO | 2019/068703 A1 | 4/2019 |

OTHER PUBLICATIONS

Translation of JP5404642.
Extended European Search Report mailed Jan. 5, 2023 in corresponding European Patent Application 20814236.4.

* cited by examiner

DENTAL APPLIANCE FOR TREATMENT OF BRUXISM AND SLEEP APNEA

RELATED APPLICATIONS

This application claims the benefit of U.S. Provisional Patent Application No. 62/855,792 filed May 31, 2019, which is hereby incorporated by reference.

U.S. Provisional Patent Application No. 62/910,455, U.S. patent application Ser. No. 15/845,944, U.S. Provisional Patent Application No. 62/435,615, U.S. patent application Ser. No. 14/808,807, U.S. Provisional Patent Application No. 62/028,860, U.S. patent application Ser. No. 14/321,648, U.S. Provisional Patent Application No. 61/901,696, and U.S. Provisional Patent Application No. 61/841,682 are each hereby incorporated by reference. U.S. Pat. No. 6,666,212 is also hereby incorporated by reference.

BACKGROUND

1. Field of the Invention

This invention relates to dental systems and, more particularly, to novel systems and methods for treating bruxism, sleep apnea, or combinations thereof.

2. Background Art

Bruxism, or grinding and clenching of teeth, can cause irreversible damage to teeth and the temporomandibular joint (TMJ). For example, bruxism may contribute to a temporomandibular disorder (TMD). Bruxism can contribute to sleep problems.

Sleep apnea is a sleep disorder typically characterized by pauses in breathing. These pauses cause carbon dioxide to build up in the bloodstream. In response to this build-up, the brain wakes the person from sleeping. Once awake, normal breathing may resume and the person may fall asleep again. However, the interruption, or a series of such interruptions may prevent the person from getting adequate rest. This may in turn produce daytime fatigue, a slower reaction time, vision problems, an increased risk of diabetes, and the like. Accordingly, what is needed is an apparatus and method for preventing bruxism and/or sleep apnea and the negative consequences thereof.

BRIEF SUMMARY OF THE INVENTION

In view of the foregoing, in accordance with the invention as embodied and broadly described herein, a method and apparatus are disclosed in one embodiment of the present invention as including a dental appliance having or providing a tongue-retention feature. For example, in selected embodiments, an appliance may comprise a base custom formed to engage the upper (i.e., maxillary) teeth of a patient and a tongue-retention feature formed by one or more structures extending from the base. A tongue-retention feature may engage a tongue of a patient so as to hold the tongue in a forward position within the mouth of the patient. During sleep, athletic activity, or the like, a tongue-retention feature may prevent a tongue from falling back within the mouth of a patient and inhibiting breathing. Accordingly, a tongue-retention feature may enable an appliance to combat sleep apnea.

A tongue-retention feature may be a cavity into which a patient may insert his or her tongue. As a tongue is inserted within the cavity, the air therewithin may be expelled. Accordingly, when a tongue is fully seated within the tongue-retention feature, the moist exterior of the tongue may interact with an interior surface of the cavity to create a suction effect resisting extraction of the tongue therefrom. In this manner, a tongue-retention feature may assist in holding a tongue in a forward position until the suction effect is intentionally broken.

A tongue-retention feature may be formed or defined by a sublingual portion extending under an anterior portion of a tongue. In certain embodiments, a sublingual portion may cooperate with a hard palate of a patient to form a cavity for receiving and suctionally engaging an anterior portion of the tongue. In other embodiments, a tongue retention feature may be formed or defined by a sublingual portion extending under an anterior portion of a tongue and a palatal portion extending over the anterior portion of the tongue. The sublingual portion and the palatal portion may cooperate to form a cavity for receiving and suctionally engaging an anterior portion of the tongue.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
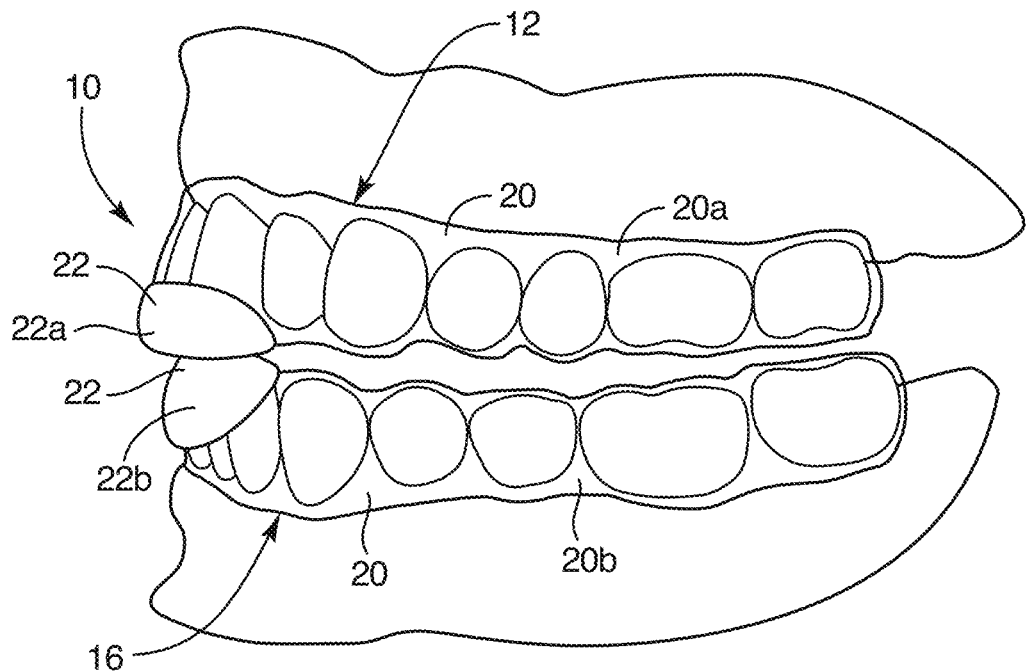
FIG. 1 is a side view of one embodiment of a dental appliance in accordance with the present invention installed on a patient.
Figure 1:
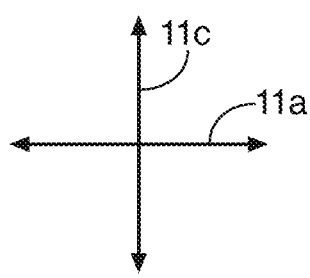

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 2:
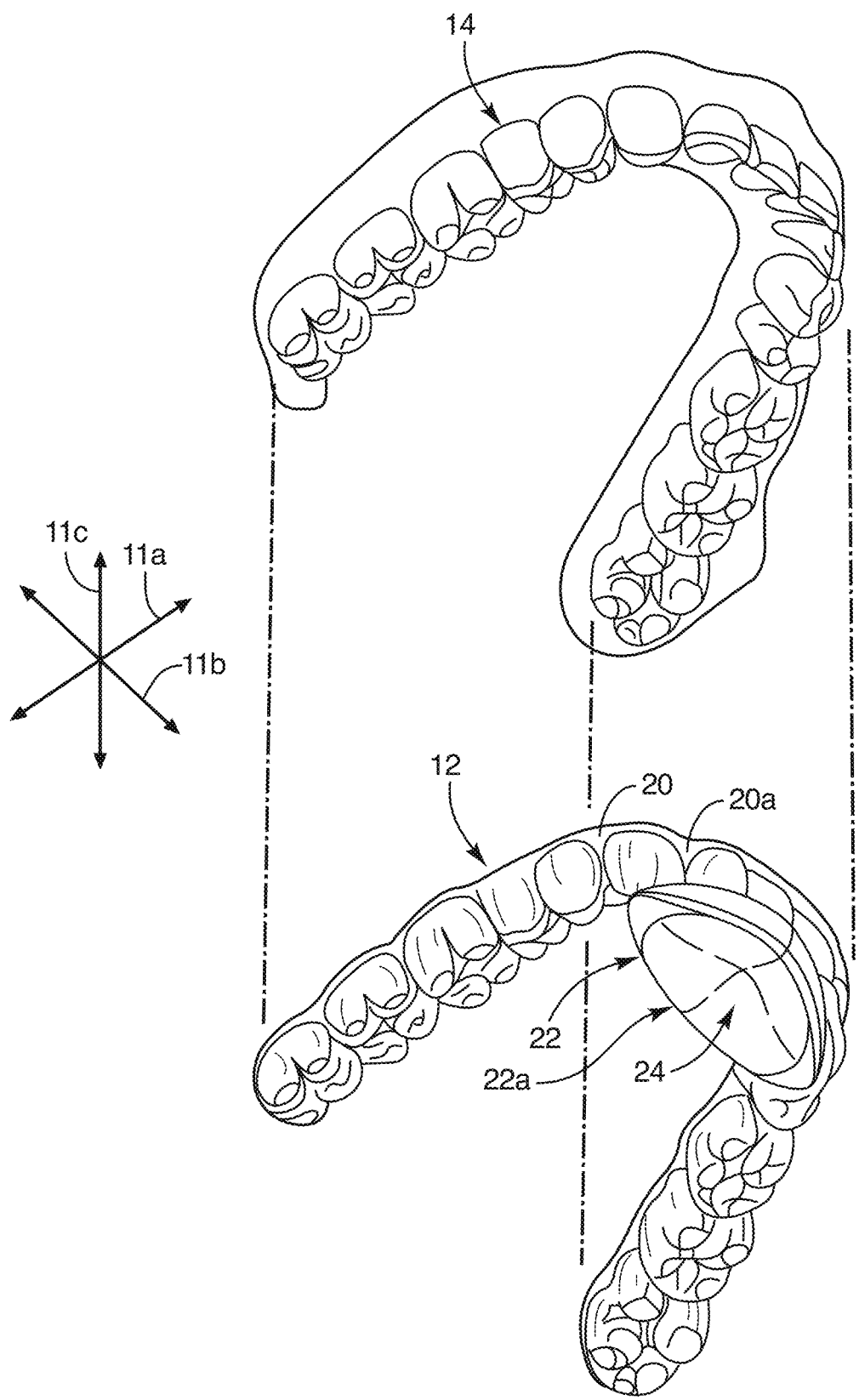
FIG. 2 is a perspective view of one embodiment of an upper portion of a dental appliance in accordance with the present invention.
Figure 3:
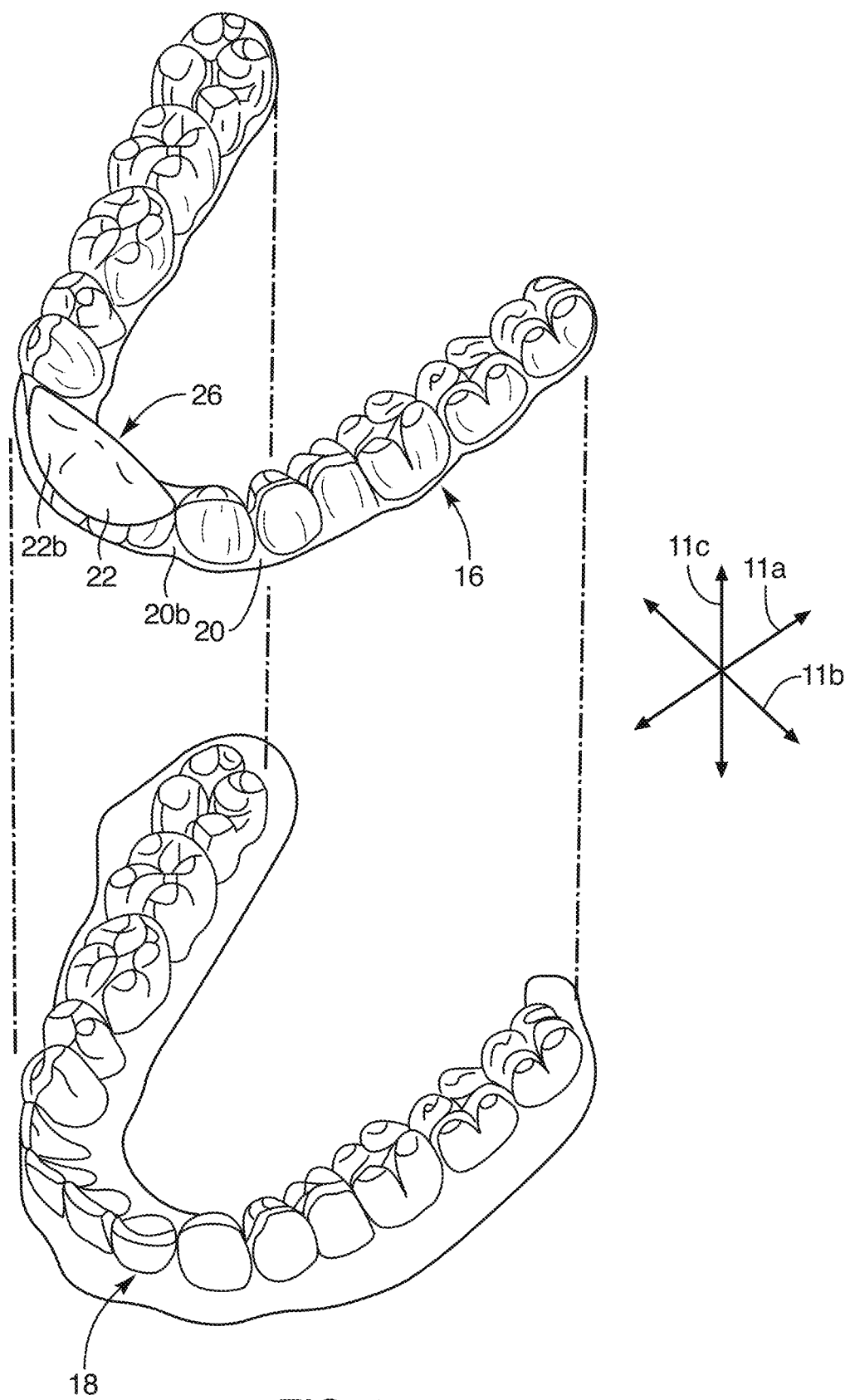
FIG. 3 is a perspective view of one embodiment of a lower portion of a dental appliance in accordance with the present invention.
Figure 4:
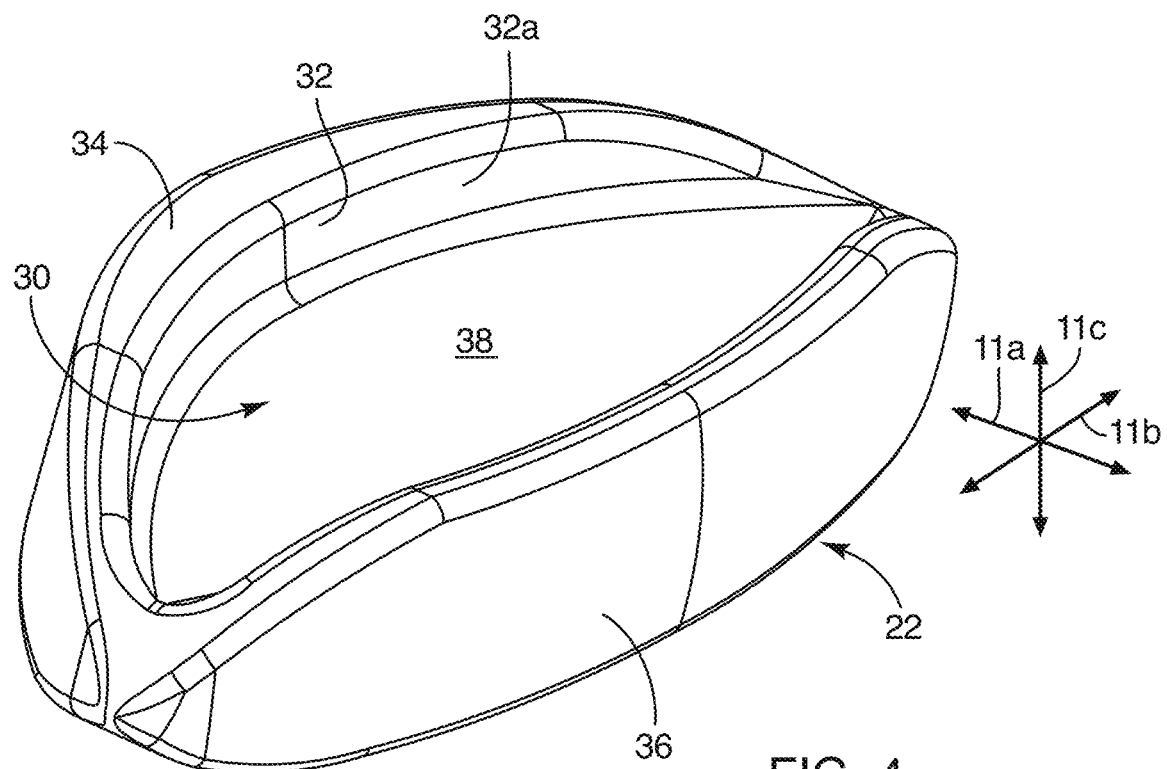
FIG. 4 is a perspective view of one embodiment of a feature having an indentation or recess in accordance with the present invention.
Figure 5:
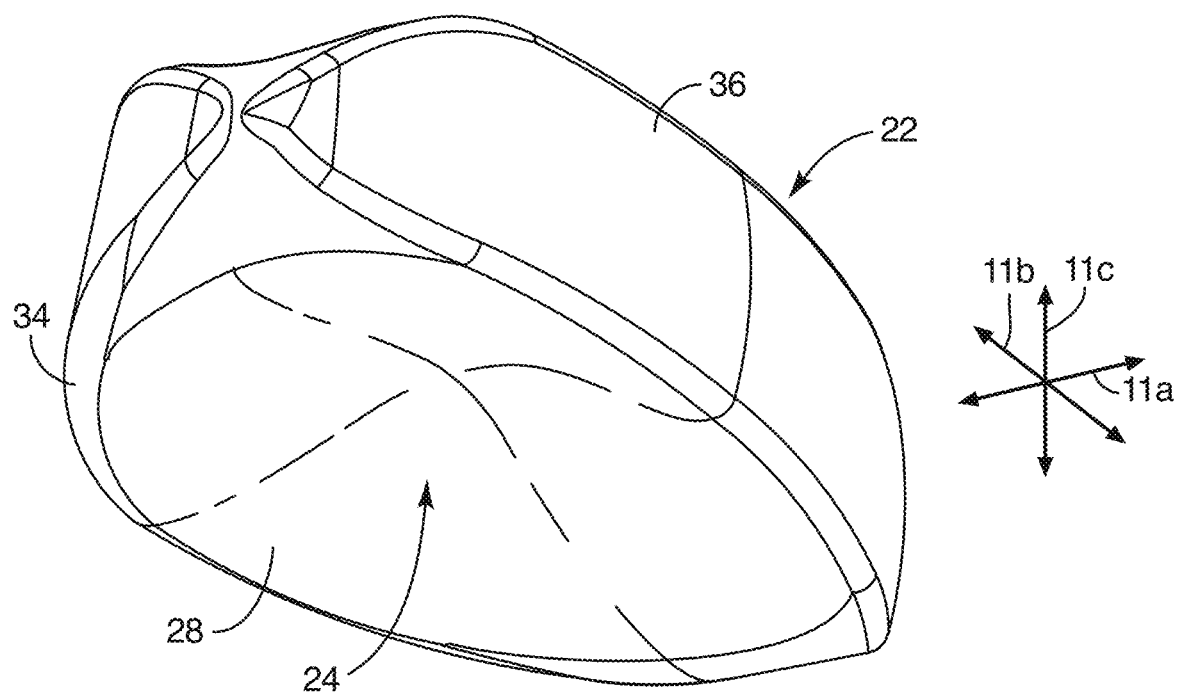
FIG. 5 is another perspective view of the feature of FIG. 4.
Figure 6:
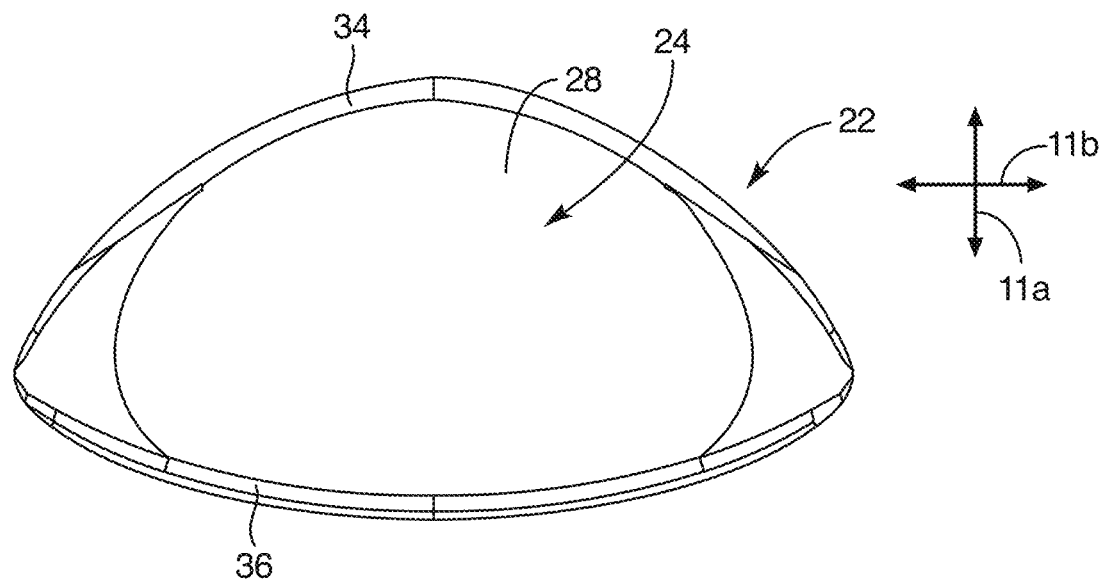
FIG. 6 is a bottom view of the feature of FIG. 4.
Figure 7:
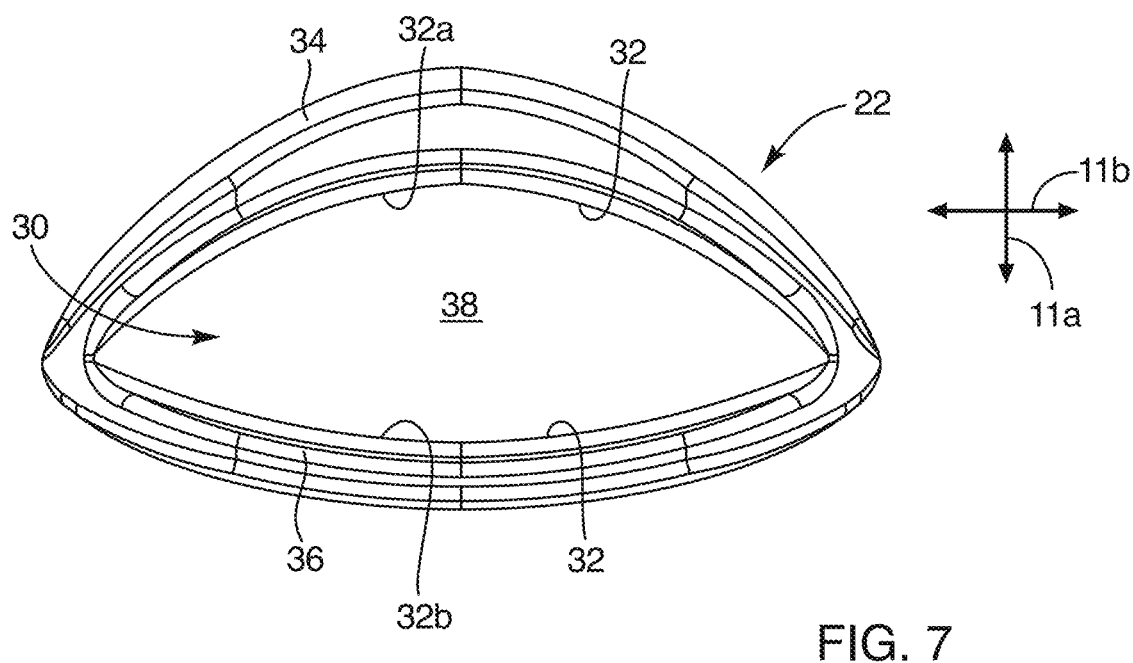
FIG. 7 is a top view of the feature of FIG. 4.
Figures 8, 9:
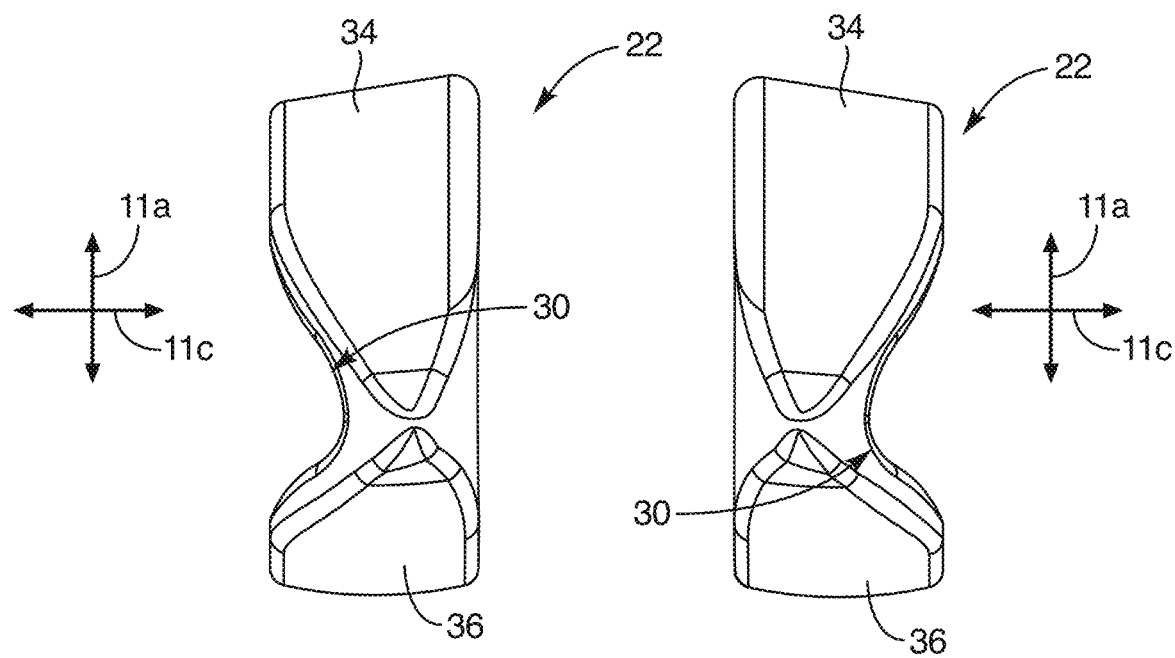
FIG. 8 is a first side view of the feature of FIG. 4.
FIG. 9 is a second, opposite side view of the feature of FIG. 4.
Figure 10:
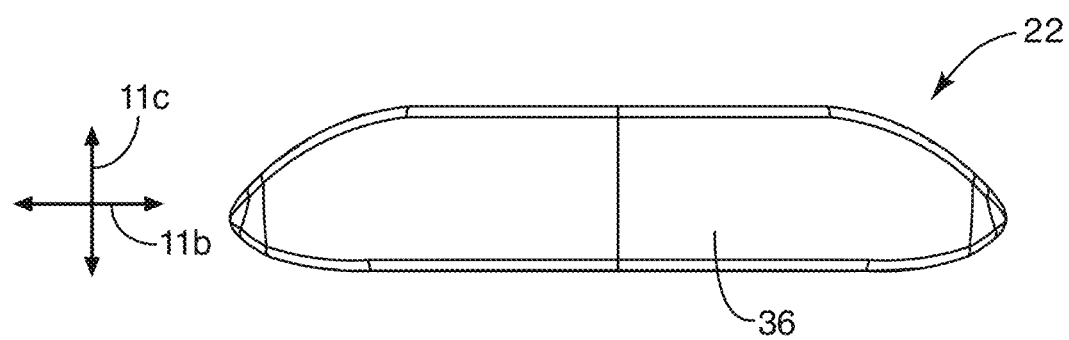
FIG. 10 is a rear view of the feature of FIG. 4.
Figure 11:
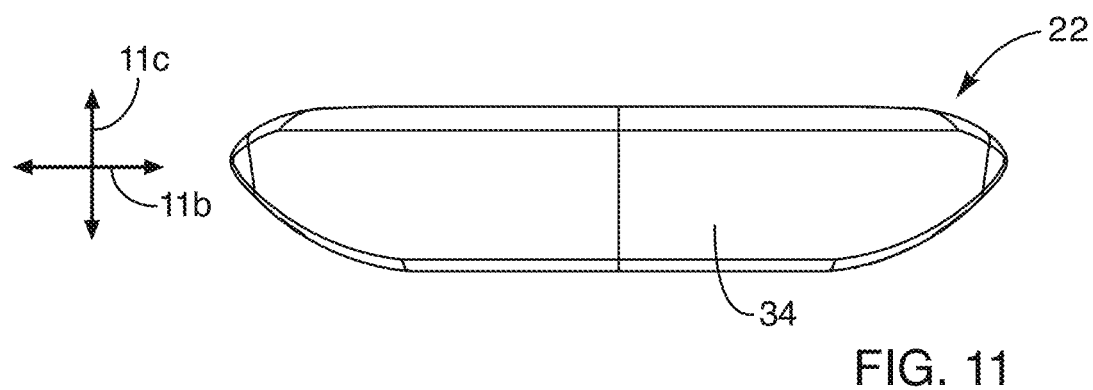
FIG. 11 is a front view of the feature of FIG. 4.
Figure 12:
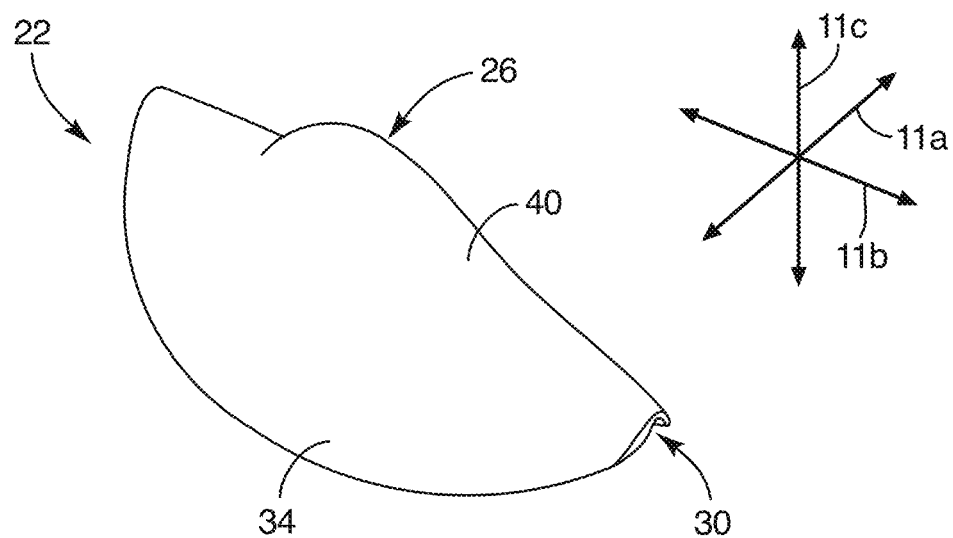
FIG. 12 is a perspective view of one embodiment of a feature having a protrusion or mound in accordance with the present invention.
Figure 13:
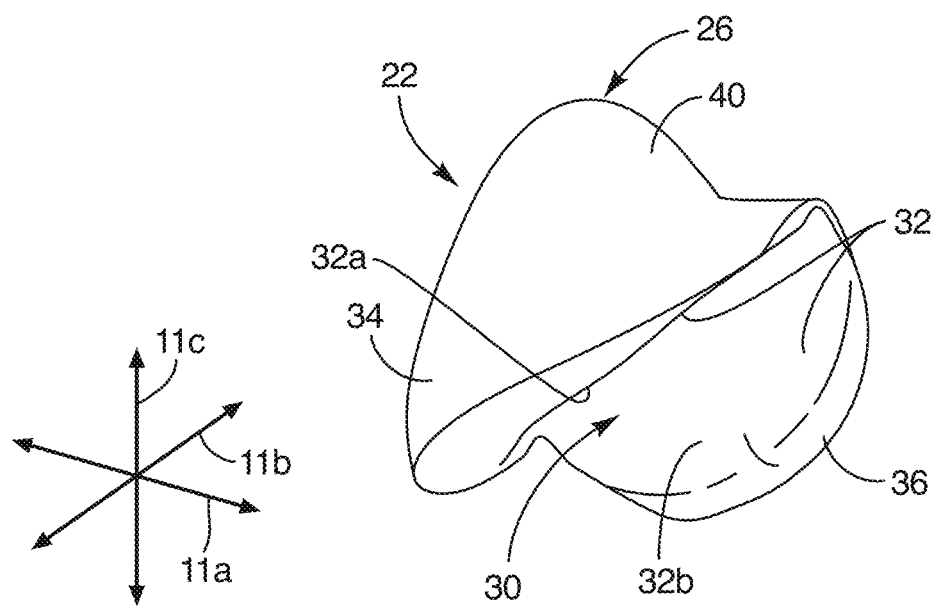
FIG. 13 is another perspective view of the feature of FIG. 12.
Figure 14:
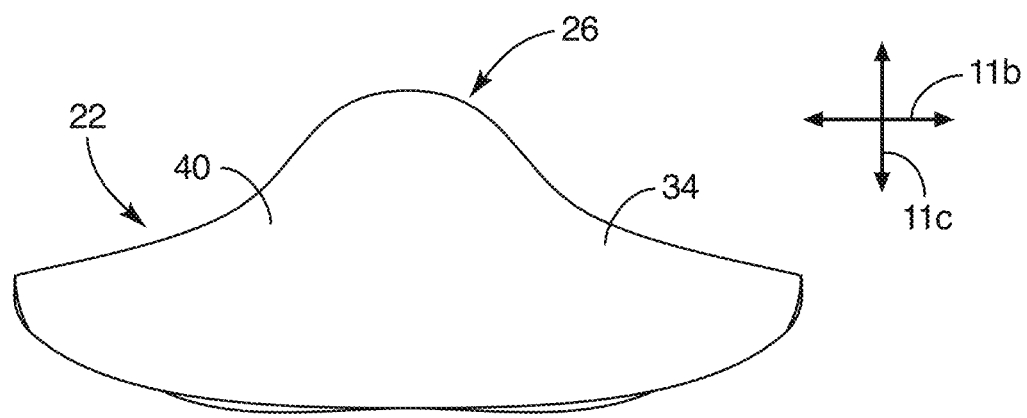
FIG. 14 is a front view of the feature of FIG. 12.
Figure 15:
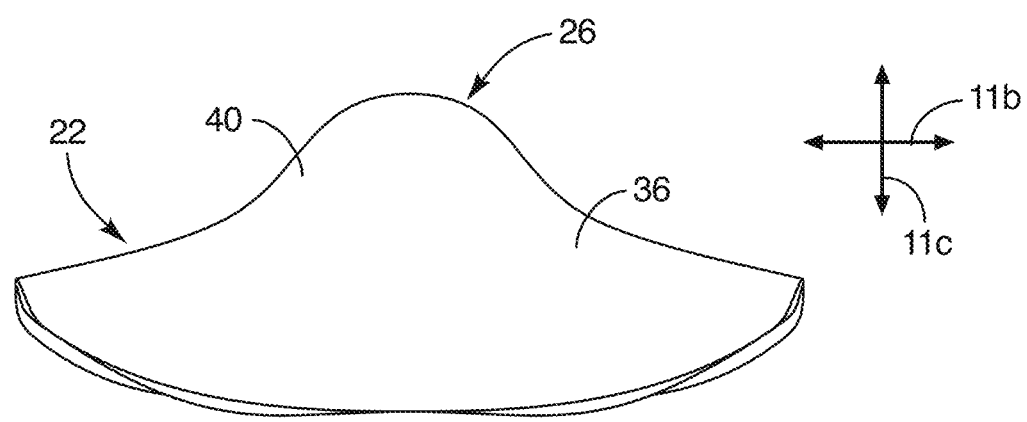
FIG. 15 is a back view of the feature of FIG. 12.
Figure 16:
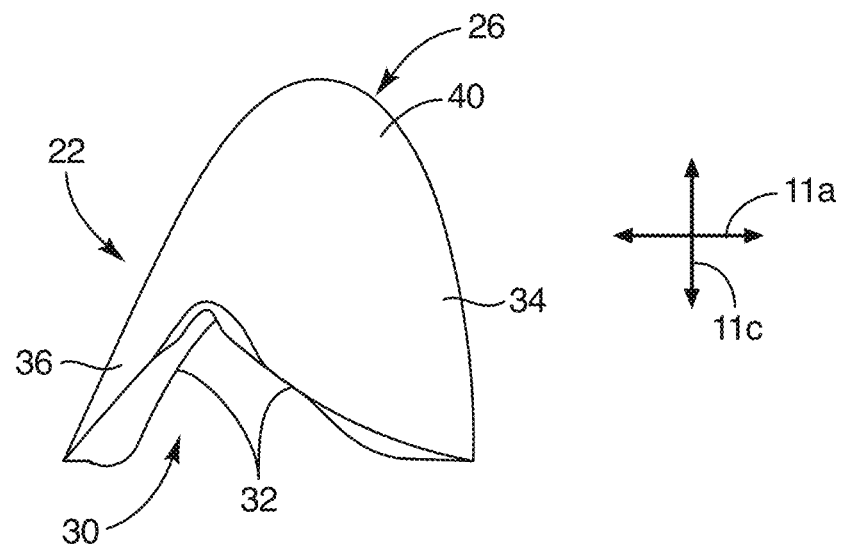
FIG. 16 is a first side view of the feature of FIG. 12.
Figure 17:
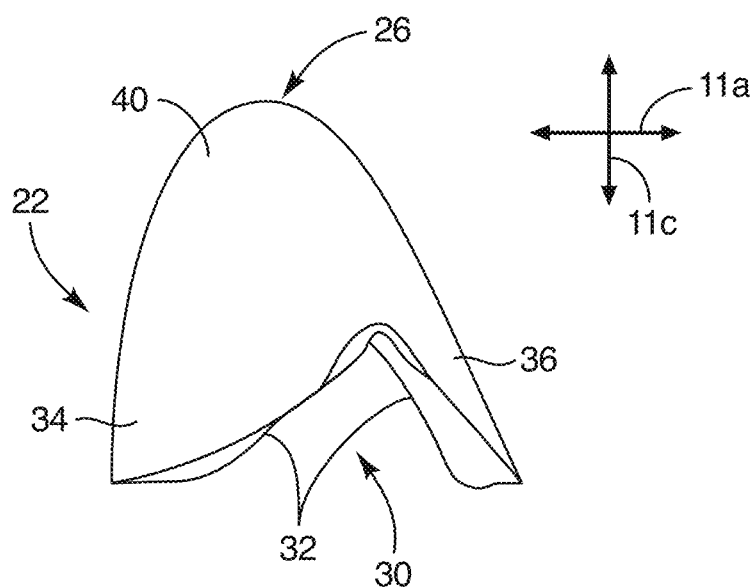
FIG. 17 is a second, opposite side view of the feature of FIG. 12.
Figure 18:
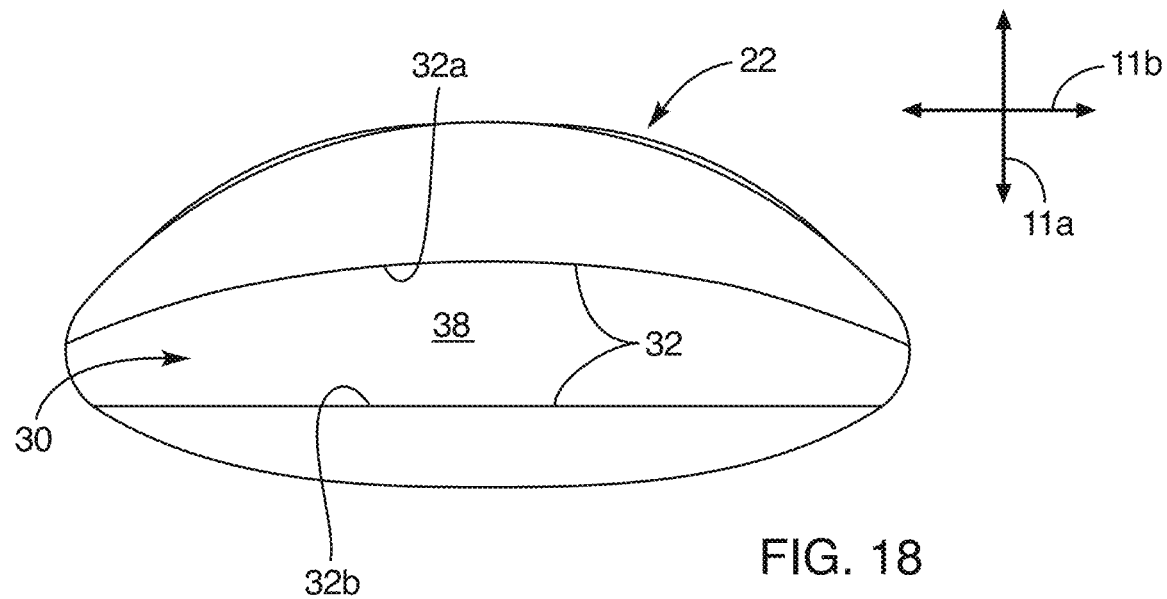
FIG. 18 is a bottom view of the feature of FIG. 12.
Figure 19:
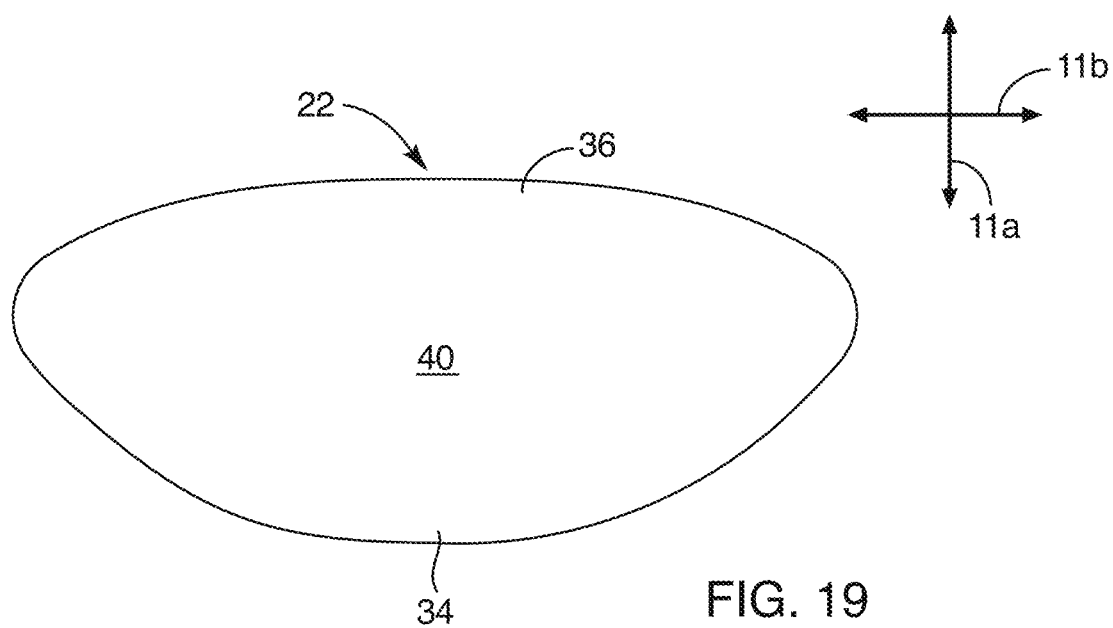
FIG. 19 is a top view of the feature of FIG. 12.
Figure 20:
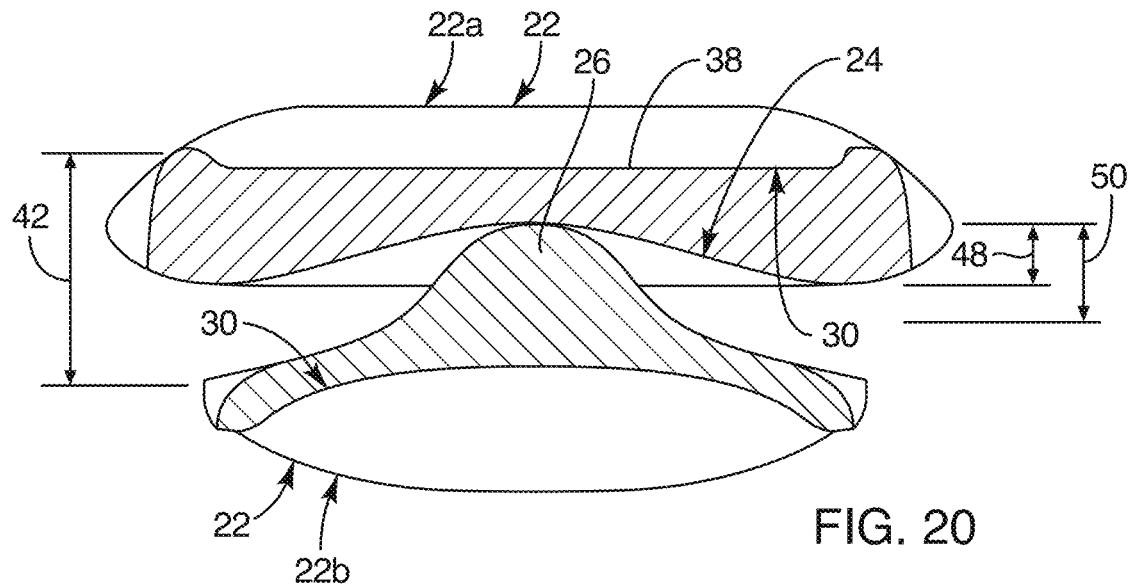
FIG. 20 is a partial, cross-sectional, front view of one embodiment of a dental appliance wherein the feature of FIG. 4 and the feature of FIG. 12 are abutting and aligned in accordance with the present invention.
Figure 21:
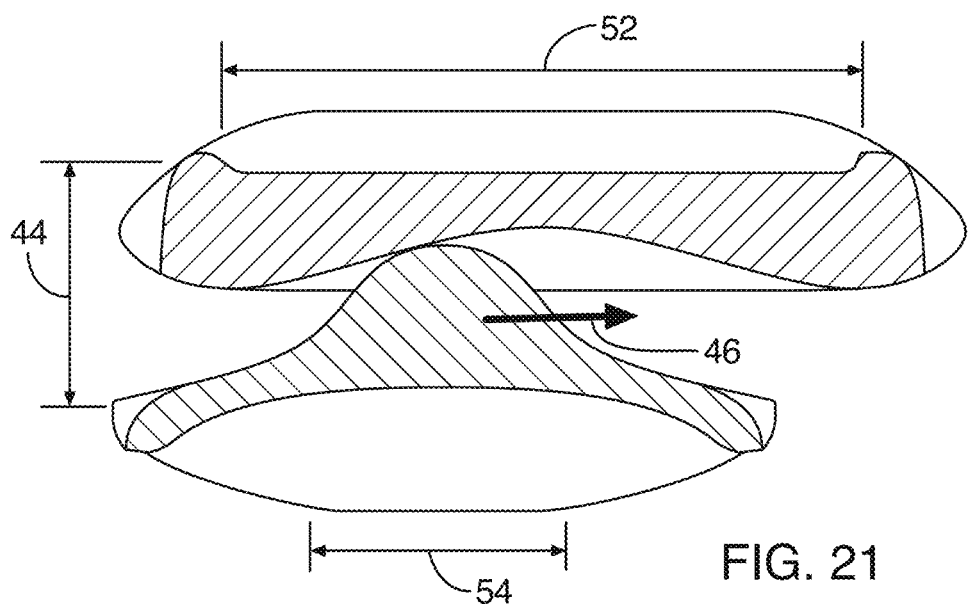
FIG. 21 is a partial, cross-sectional, front view the dental appliance of FIG. 20 wherein the feature of FIG. 4 and the feature of FIG. 12 are abutting and the feature of FIG. 12 is shifted to the left in accordance with the present invention.
Figure 22:
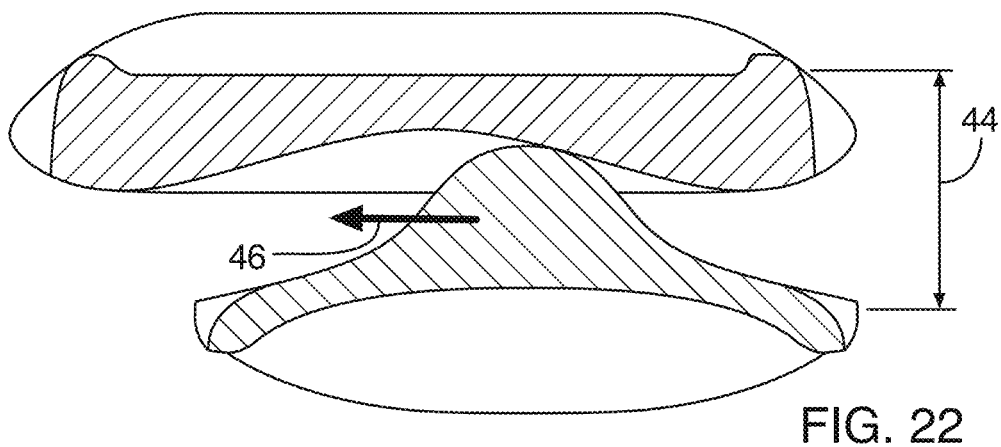
FIG. 22 is a partial, cross-sectional, front view the dental appliance of FIG. 20 wherein the feature of FIG. 4 and the feature of FIG. 12 are abutting and the feature of FIG. 12 is shifted to the right in accordance with the present invention.
Figure 23:
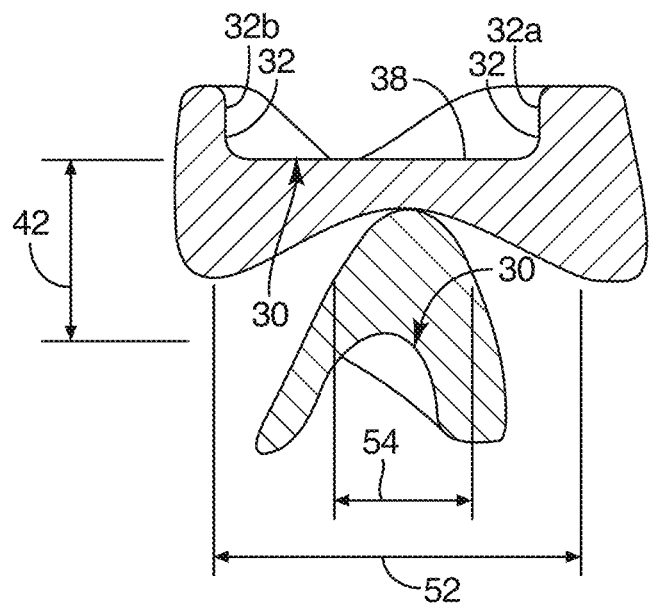
FIG. 23 is a partial, cross-sectional, side view on one embodiment of a dental appliance wherein the feature of FIG. 4 and the feature of FIG. 12 are abutting and aligned in accordance with the present invention.
Figure 24:
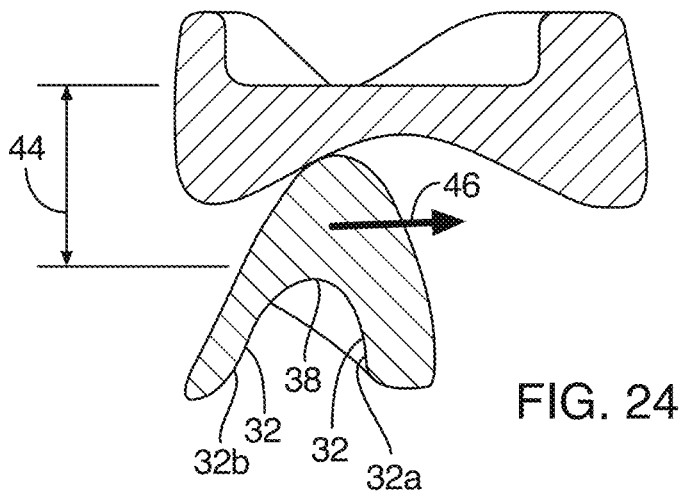
FIG. 24 is a partial, cross-sectional, side view the dental appliance of FIG. 23 wherein the feature of FIG. 4 and the feature of FIG. 12 are abutting and the feature of FIG. 12 is shifted rearward in accordance with the present invention.
Figure 25:
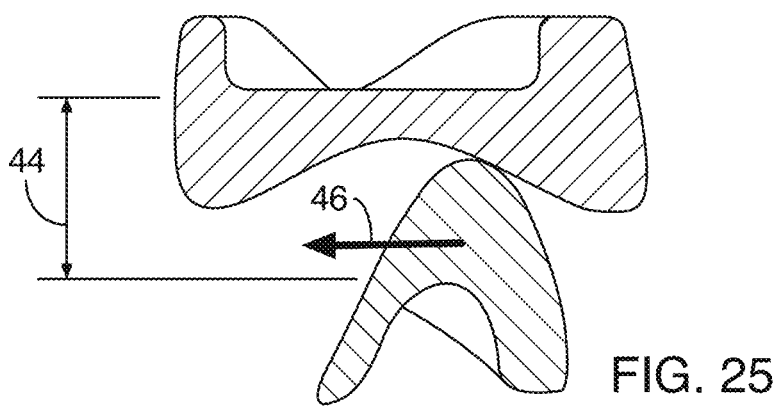
FIG. 25 is a partial, cross-sectional, side view the dental appliance of FIG. 23 wherein the feature of FIG. 4 and the feature of FIG. 12 are abutting and the feature of FIG. 12 is shifted forward in accordance with the present invention.
Figure 26:
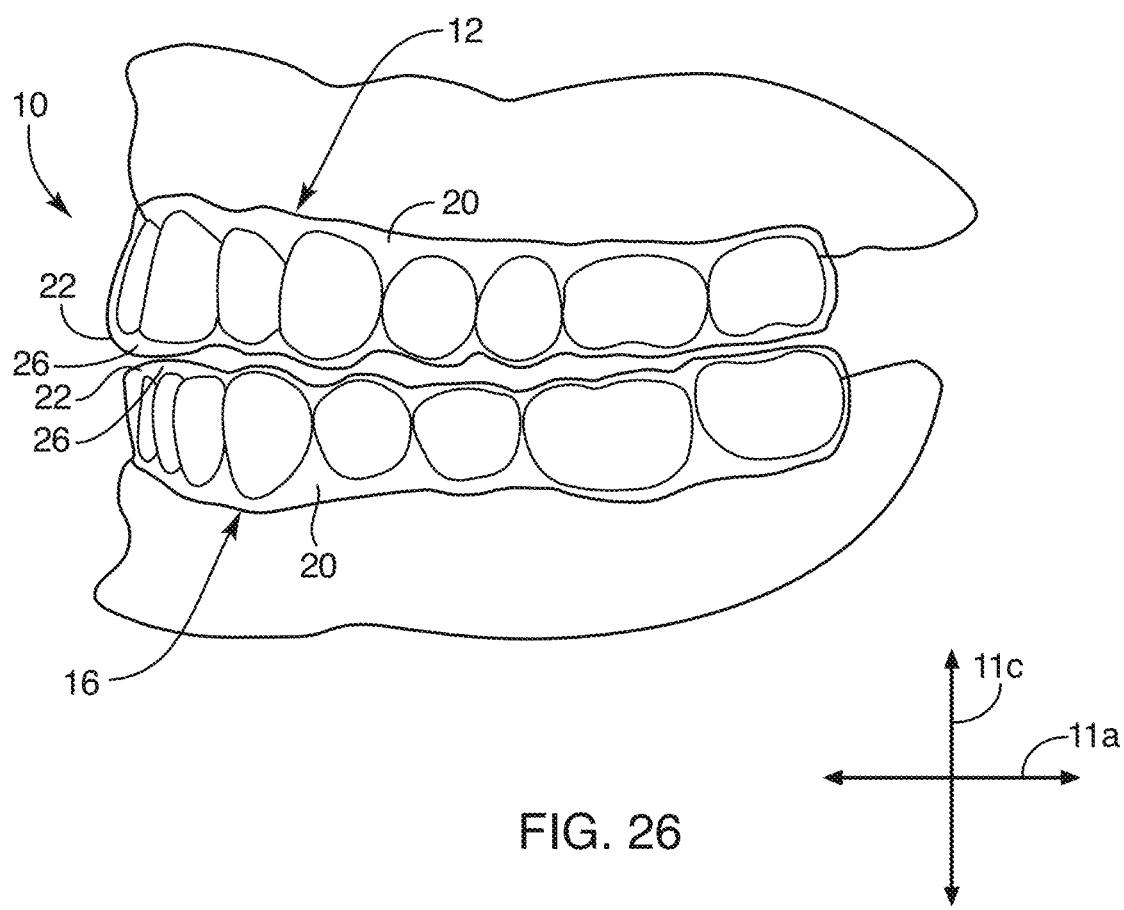
FIG. 26 is a side elevation view of an alternative embodiment of a dental appliance in accordance with the present invention installed on a patient.
Figure 27:
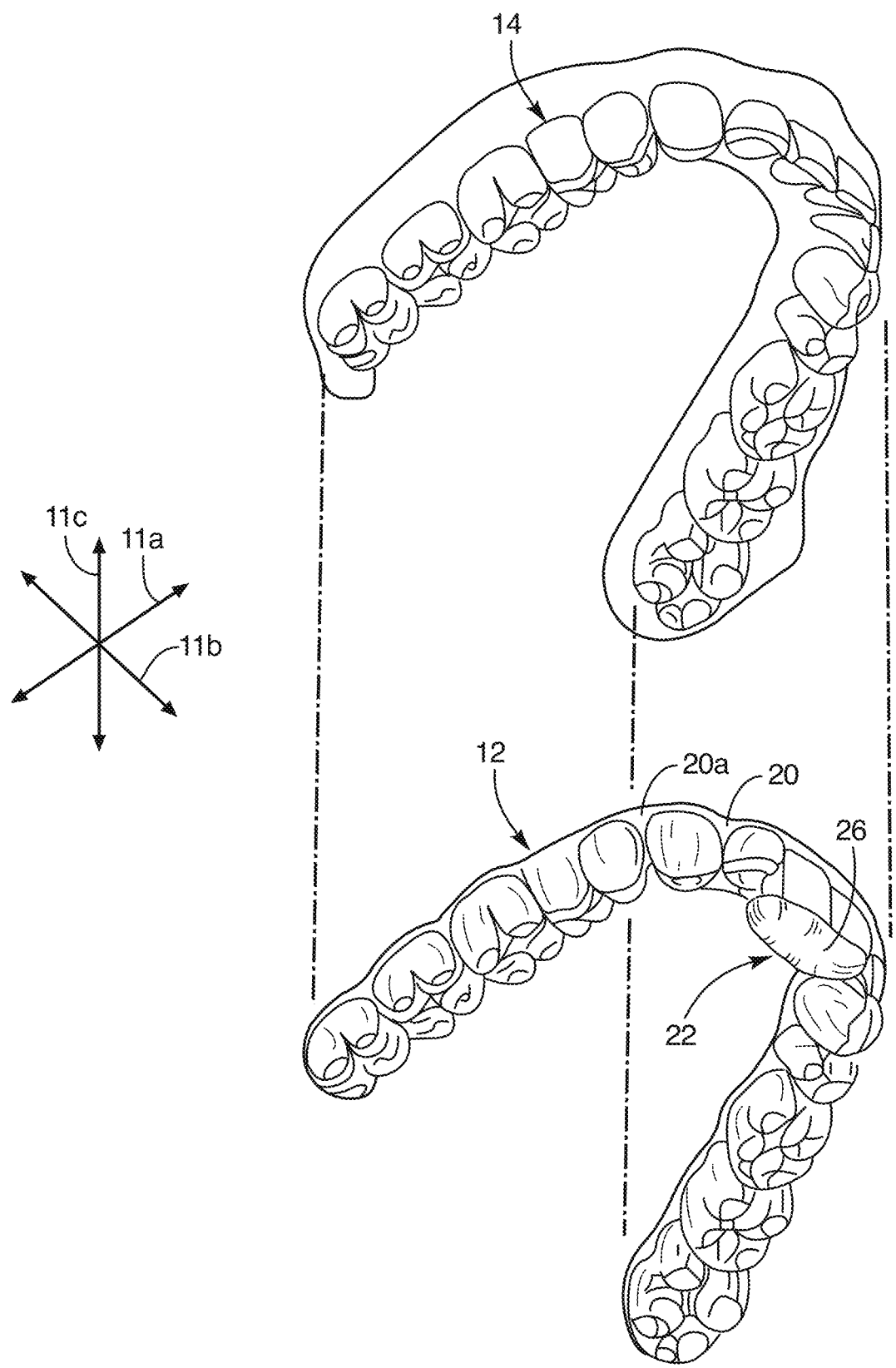
FIG. 27 is a perspective view of an alternative embodiment of an upper portion of a dental appliance in accordance with the present invention.
Figure 28:
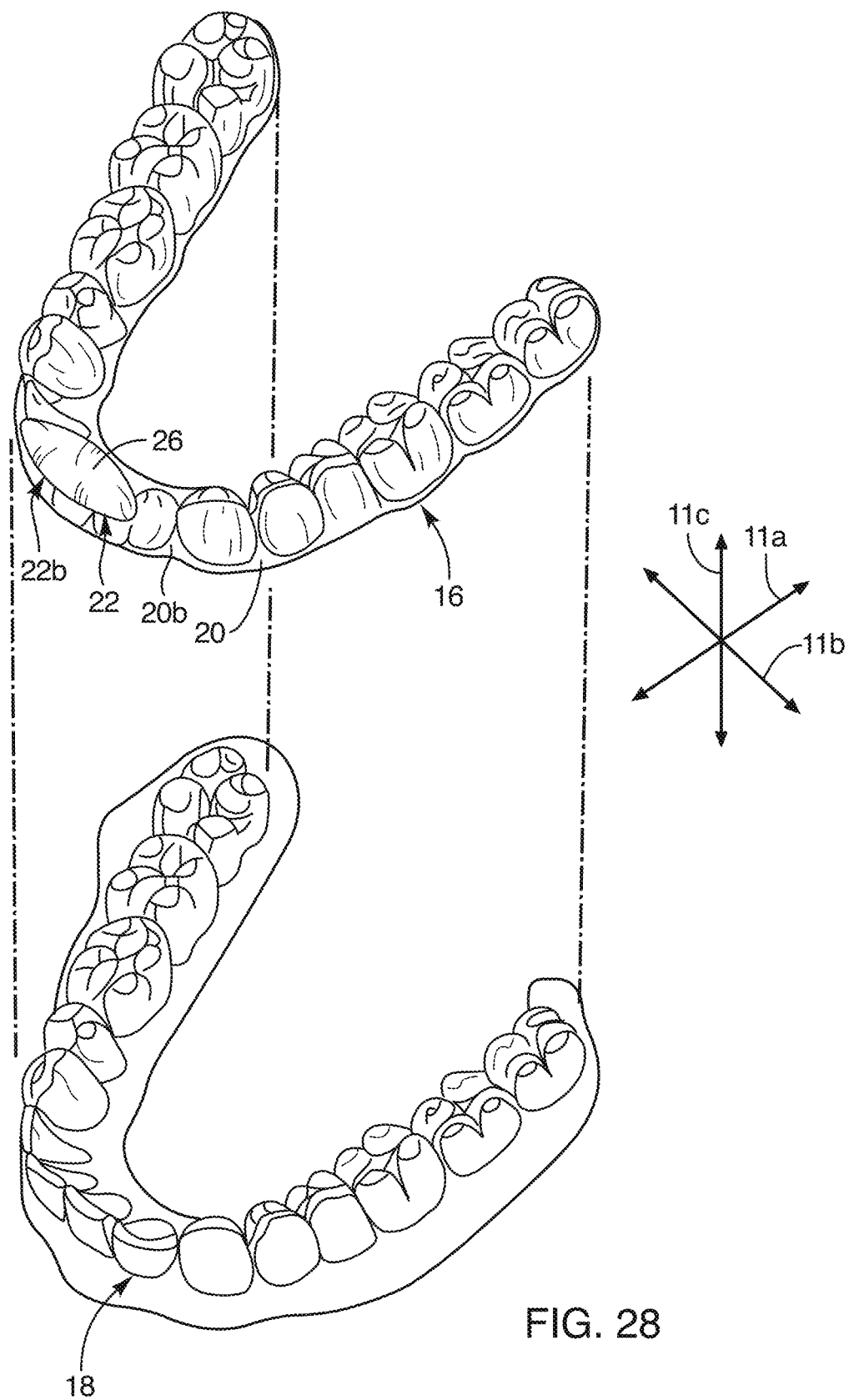
FIG. 28 is a perspective view of an alternative of a lower portion of a dental appliance in accordance with the present invention.
Figure 29:
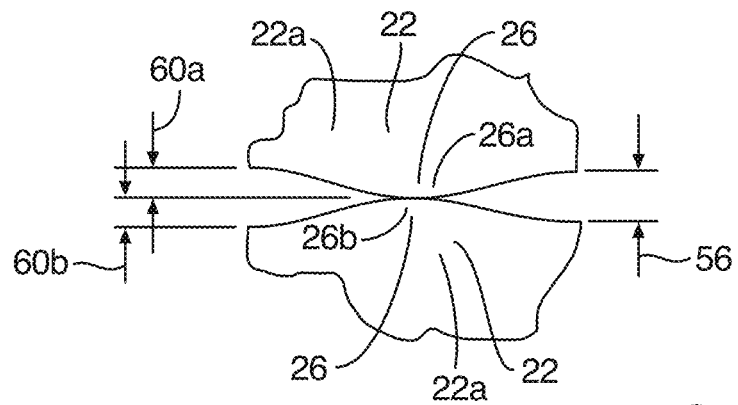
FIG. 29 is a partial front view of one embodiment of a dental appliance wherein opposing protrusions of the upper and lower portions are abutting and aligned in accordance with the present invention.
Figure 30:
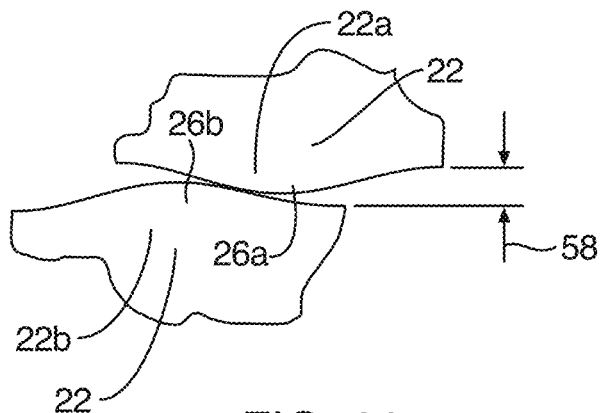
FIG. 30 is a partial front elevation view the dental appliance of FIG. 29 wherein the upper and lower portions are abutting and the lower portion is shifted to the left in accordance with the present invention.
Figure 31:
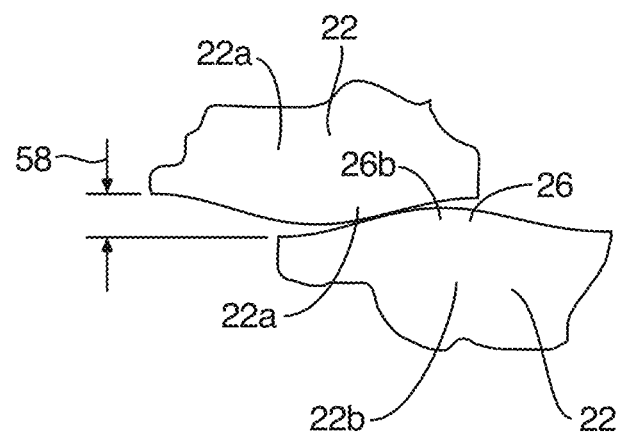
FIG. 31 is a partial front elevation view the dental appliance of FIG. 29 wherein the upper and lower portions are abutting and the lower portion is shifted to the right in accordance with the present invention.
Figure 32:
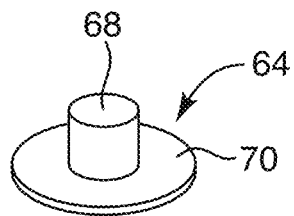
FIG. 32 is a perspective view of one embodiment of an engagement mechanism in accordance with the present invention.
Figure 33:
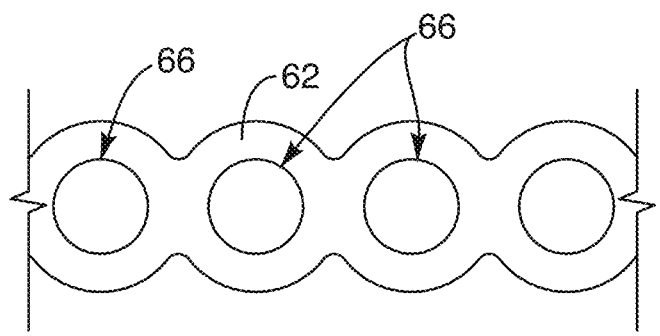
FIG. 33 is a side view of a portion of one embodiment of a biasing member in accordance with the present invention.
Figure 34:
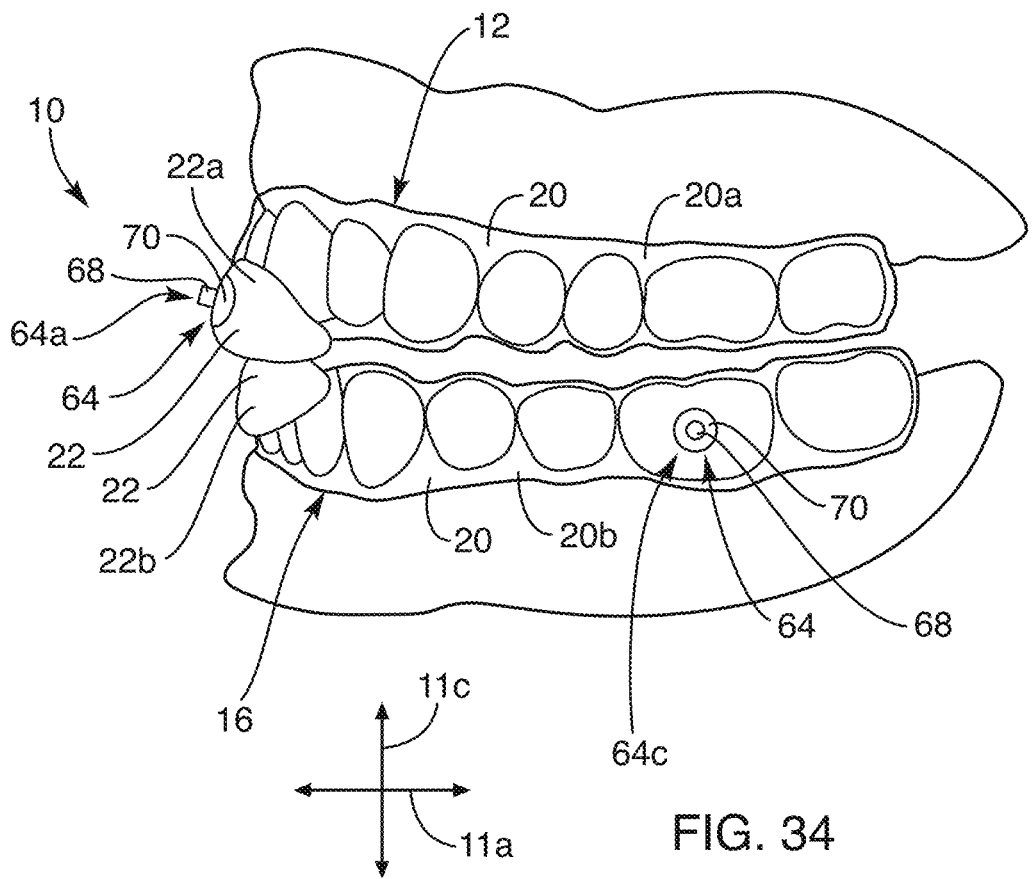
FIG. 34 is a side view of an alternative embodiment of a dental appliance in accordance with the present invention installed on a patient.
Figure 35:
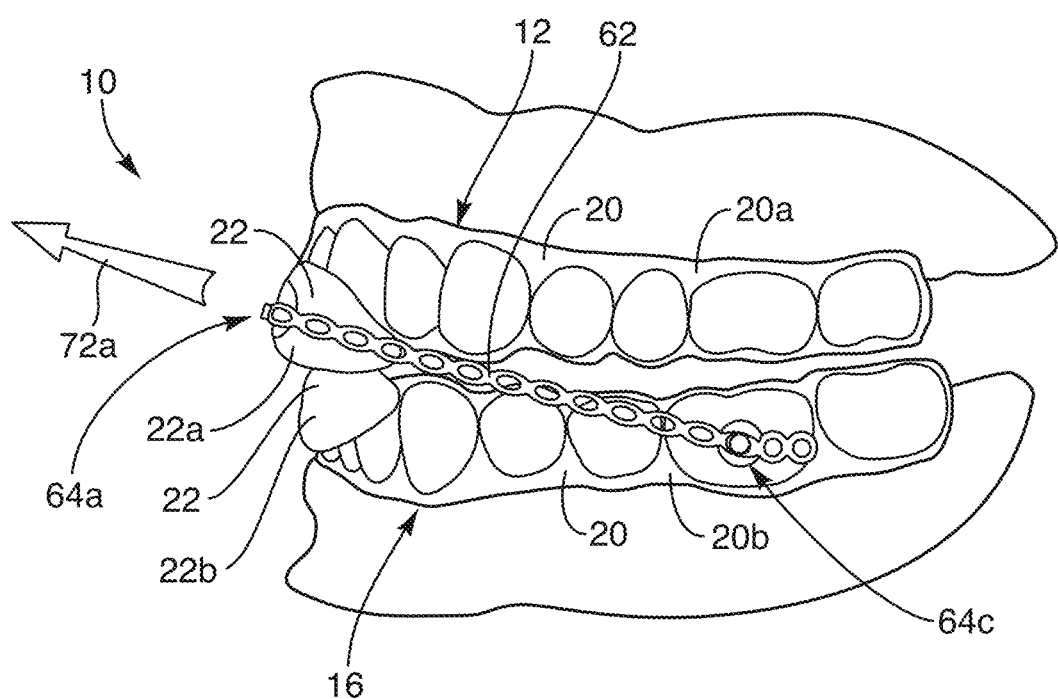
FIG. 35 is a side view of the dental appliance of FIG. 34 with the biasing member of FIG. 33 applied thereto in accordance with the present invention.
Figure 36:
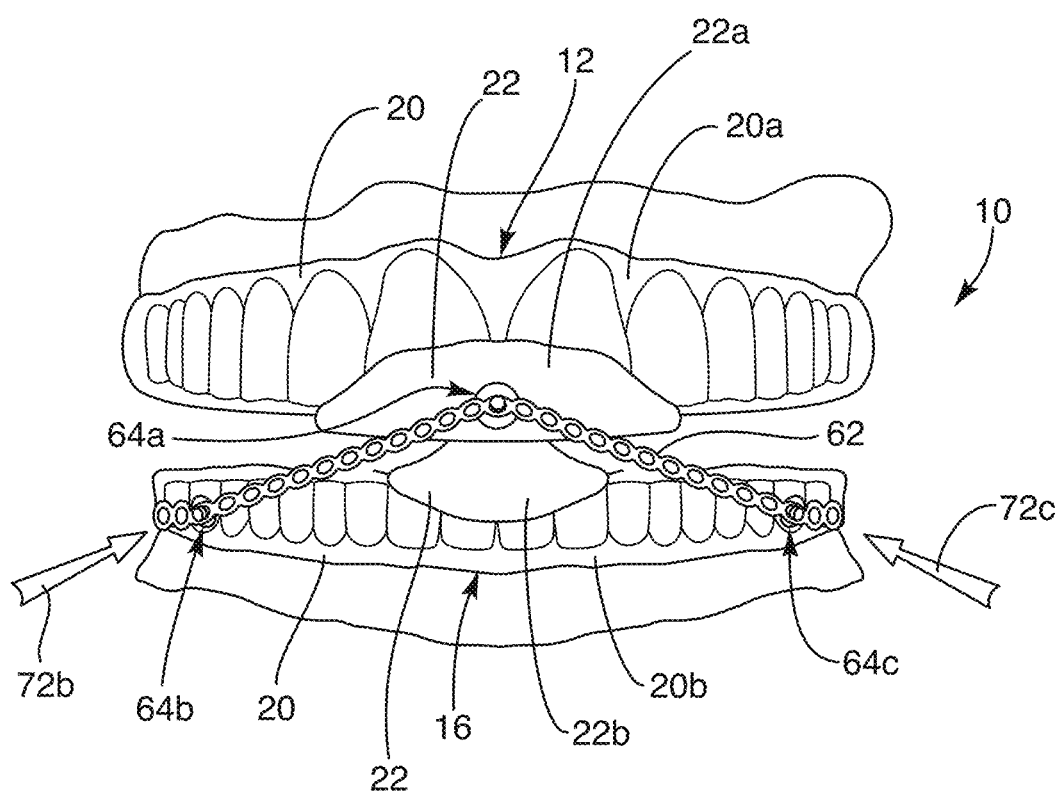
FIG. 36 is a front view of the dental appliance of FIG. 34 with the biasing member of FIG. 33 applied thereto in accordance with the present invention.
Figure 37:
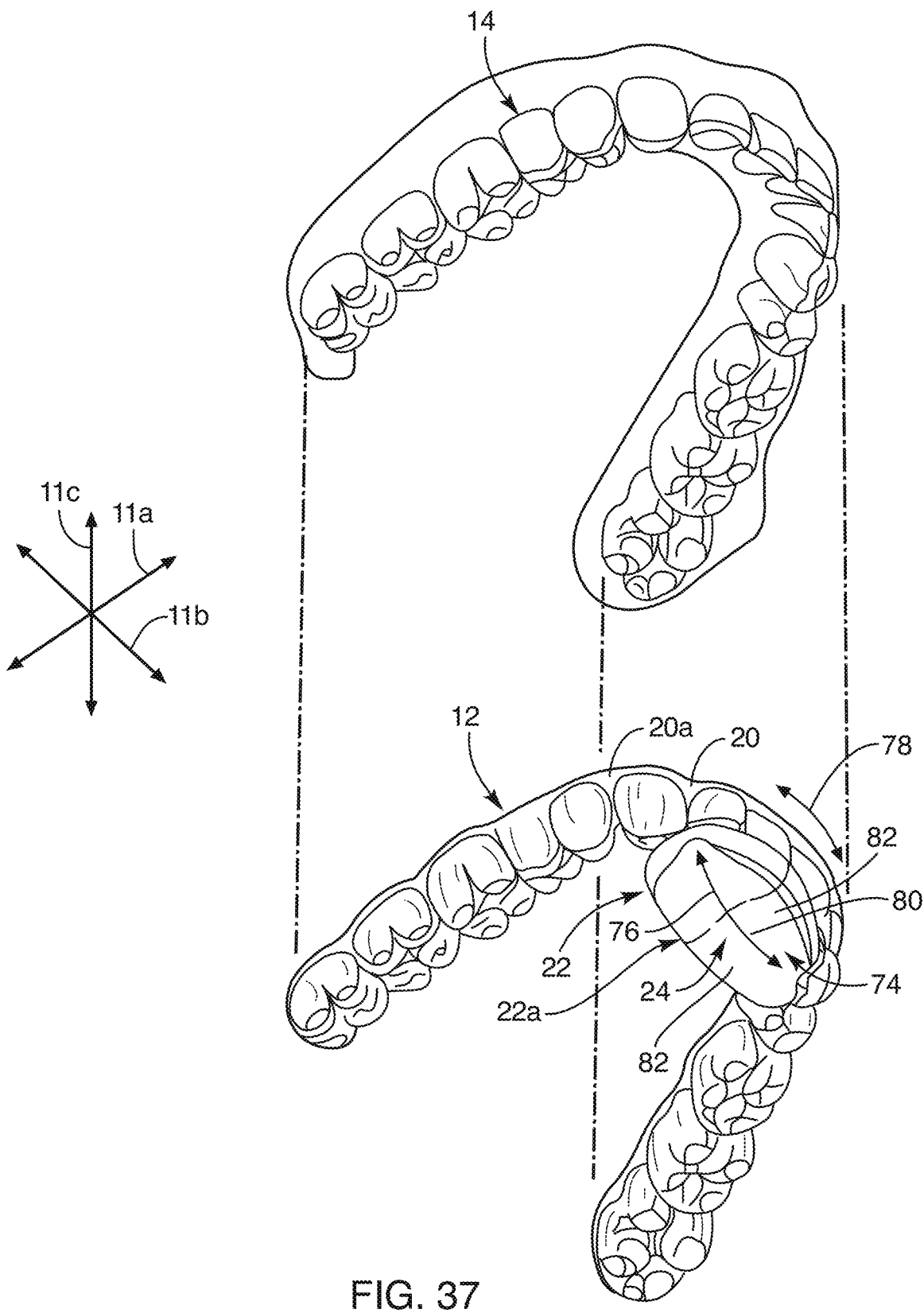
FIG. 37 is a perspective view of another alternative embodiment of an upper portion of a dental appliance in accordance with the present invention.
Figure 38:
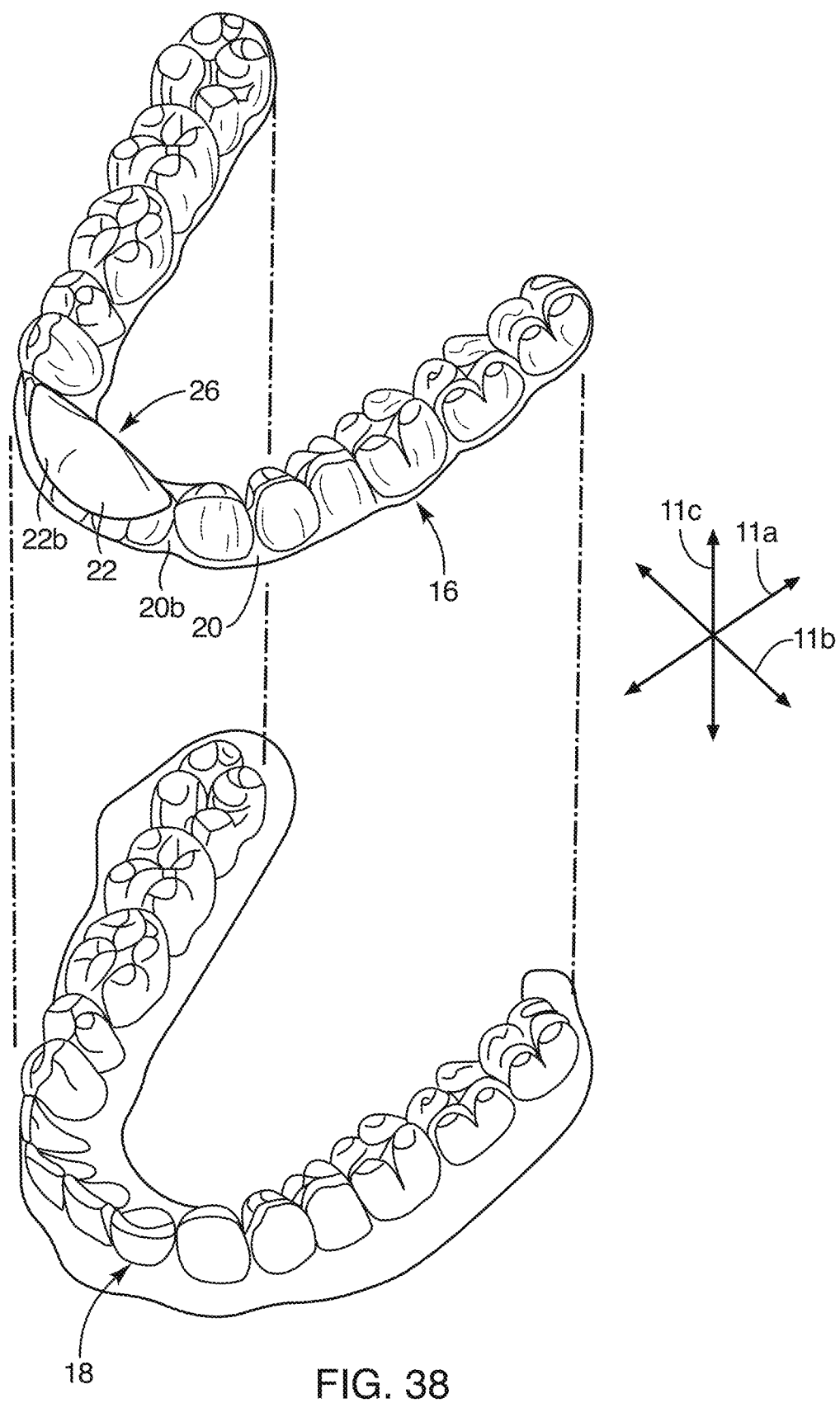
FIG. 38 is a perspective view of another alternative embodiment of a lower portion of a dental appliance in accordance with the present invention, wherein the lower portion is configured to engage the upper portion of FIG. 36 and the feature of the lower portion comprises a protrusion that is broader or wider in the lateral direction than the protrusion illustrated in FIG. 3 in order to provide a smoother motion and/or diminished obstacle during lateral excursion within the groove of the feature of the upper portion of FIG. 36.
Figure 39:
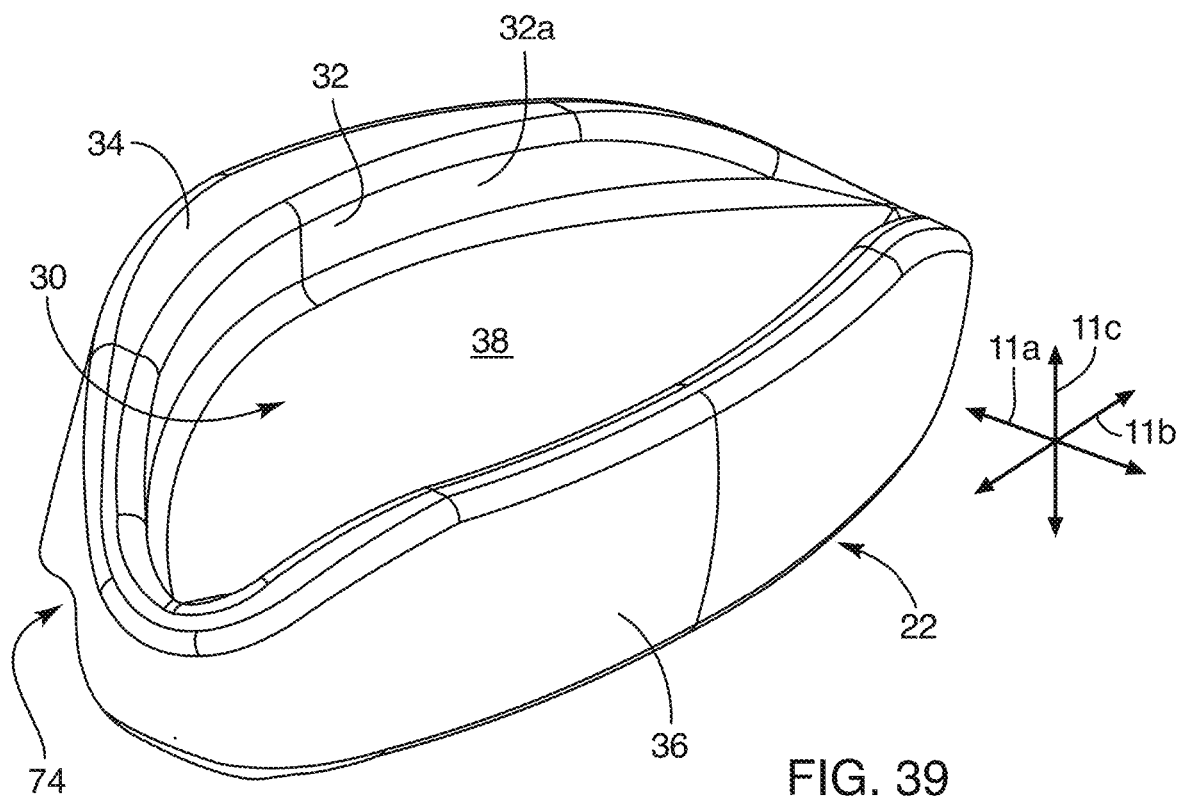
FIG. 39 is a perspective view of one embodiment of a feature having an indentation configured as a groove extending in the lateral direction in accordance with the present invention.
Figure 40:
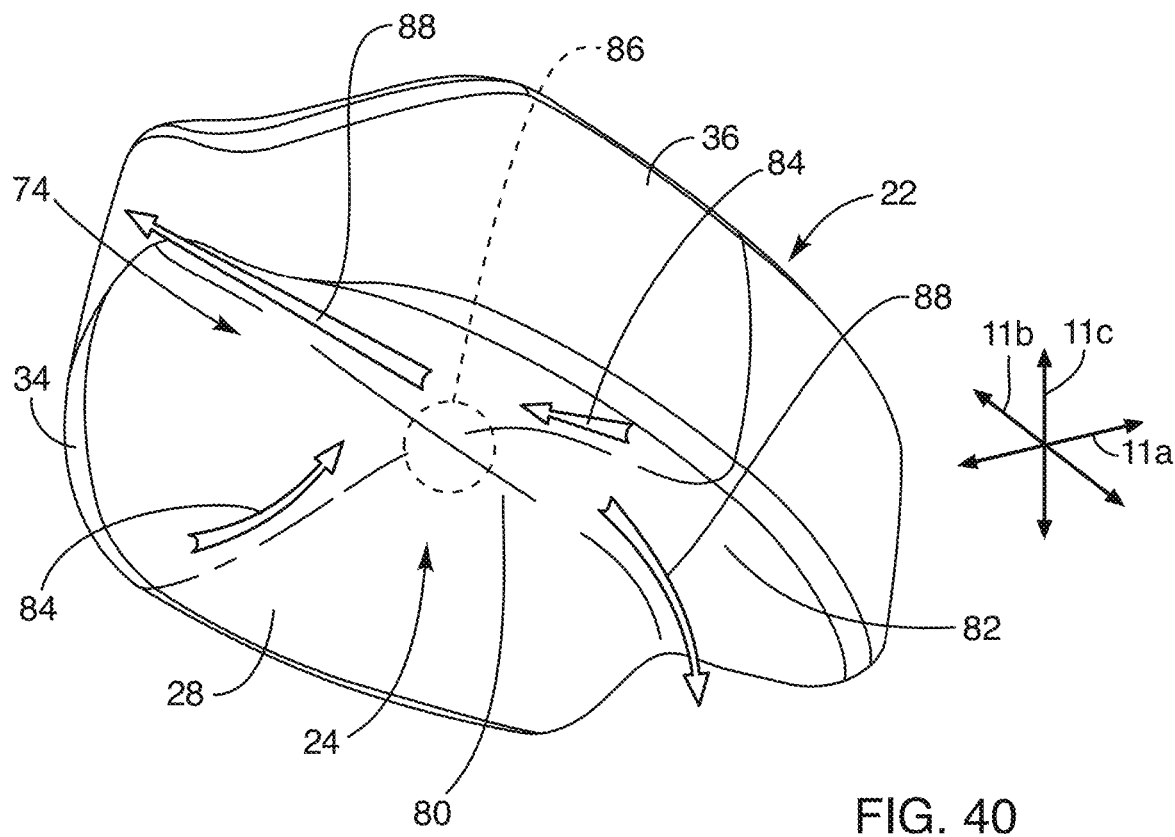
FIG. 40 is another perspective view of the feature of FIG. 39.
Figures 41, 42:
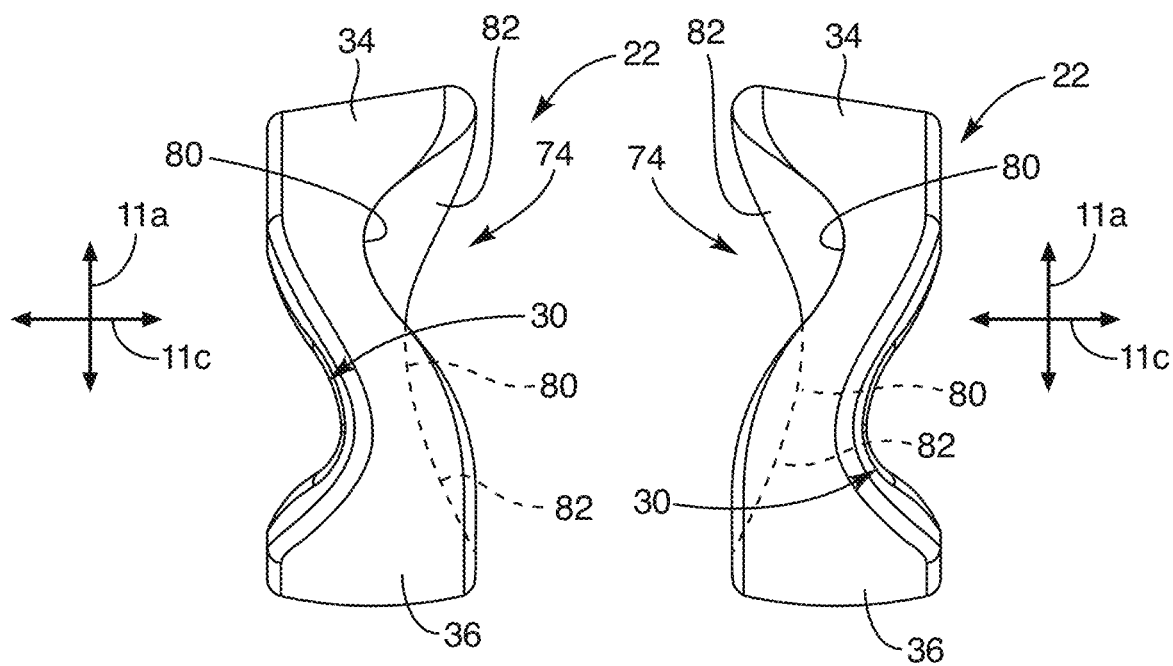
FIG. 41 is a first side view of the feature of FIG. 39.
FIG. 42 is a second, opposite side view of the feature of FIG. 39.
Figure 43:
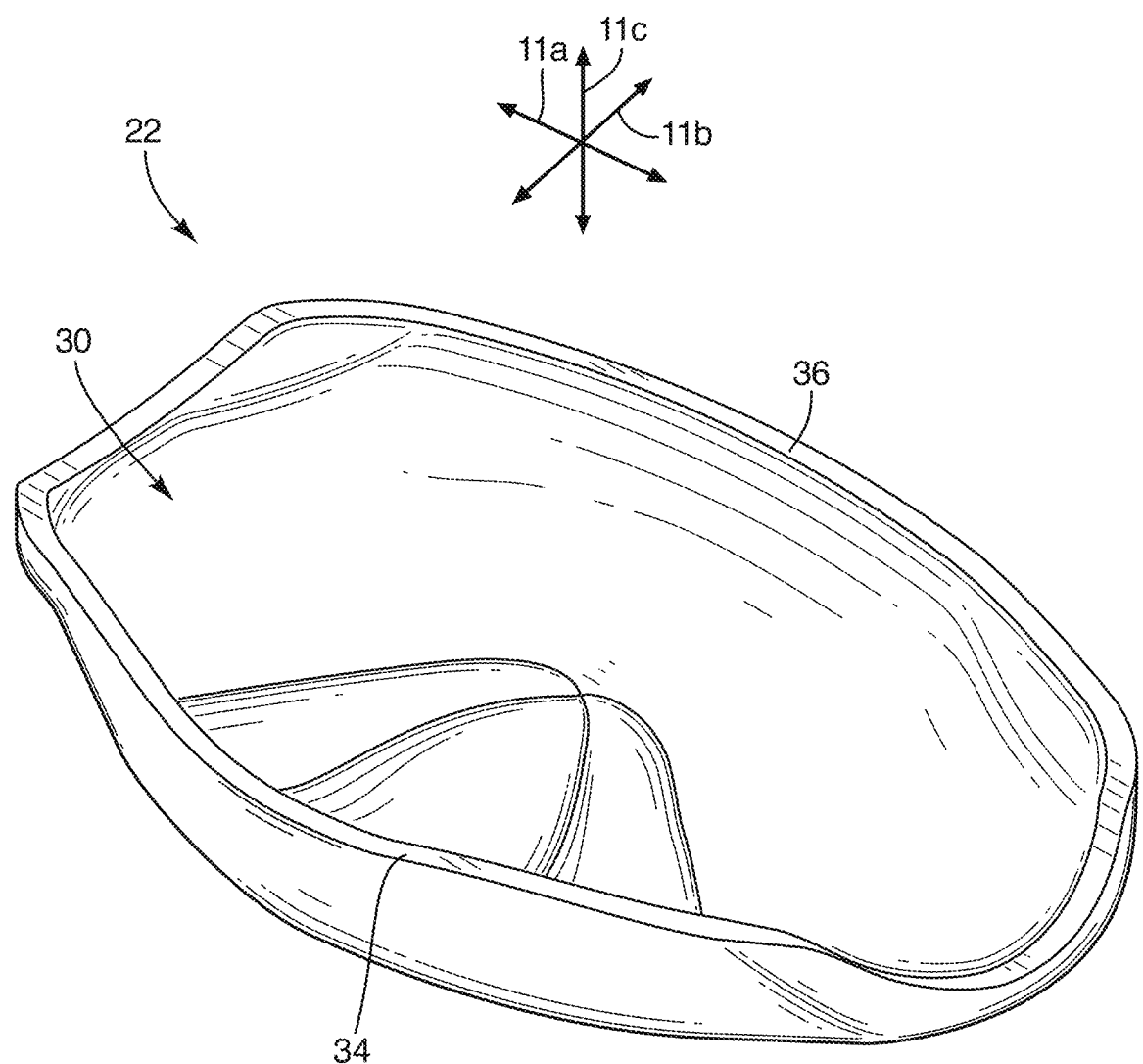
FIG. 43 is an isometric view of another alternative embodiment of a feature of a dental appliance in accordance with the present invention.
Figure 44:
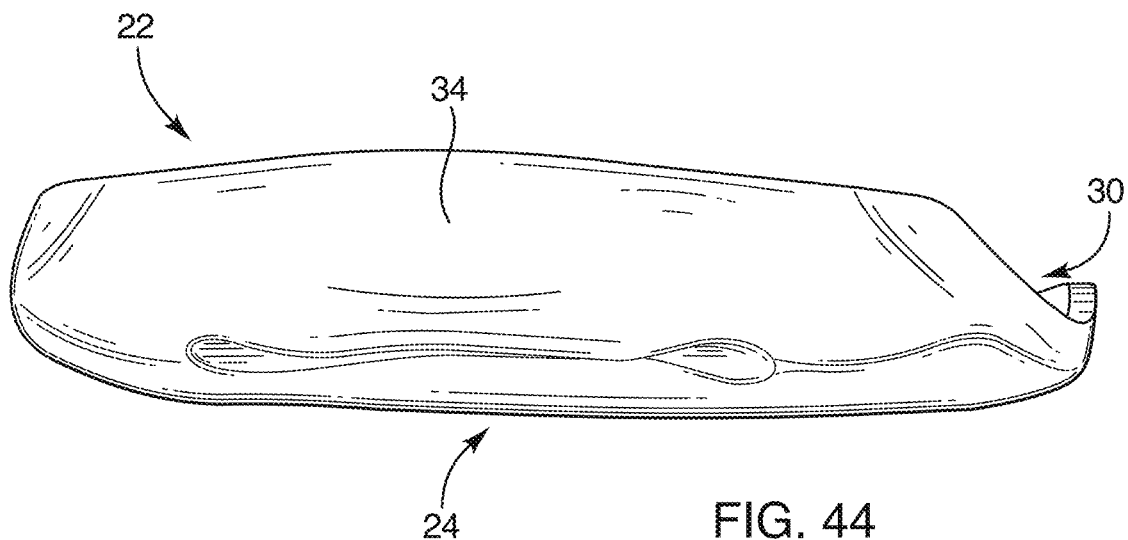
FIG. 44 is another isometric view of the feature of FIG. 43.
Figure 45:
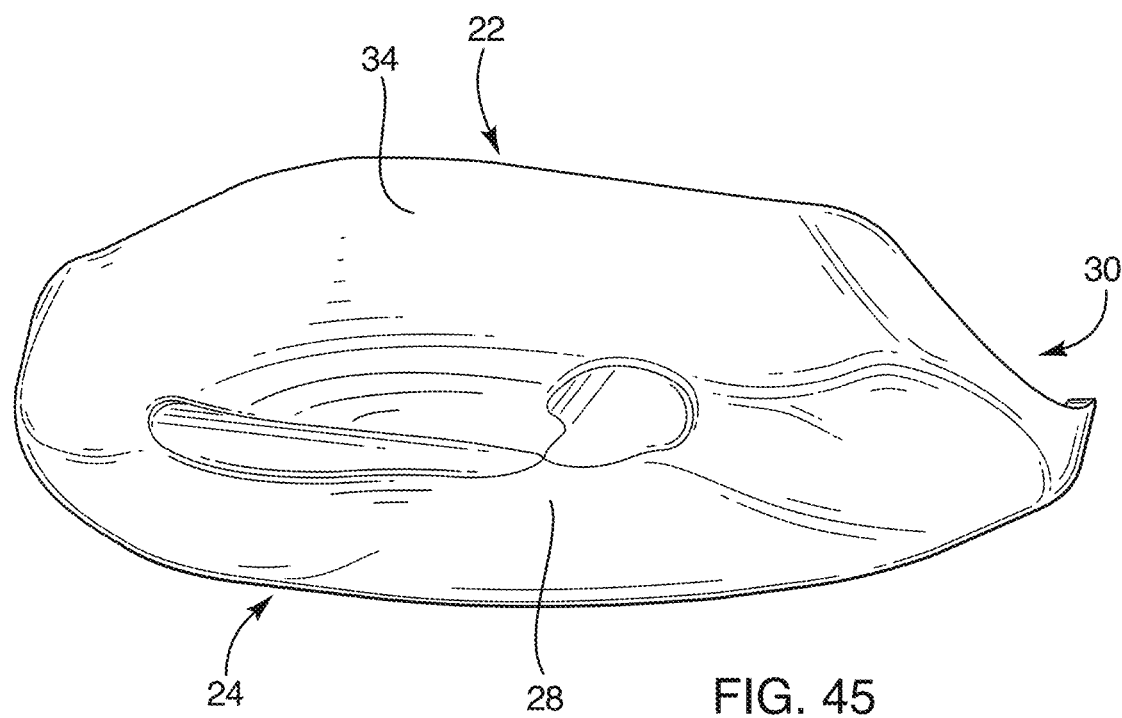
FIG. 45 is another isometric view of the feature of FIG. 43.
Figure 46:
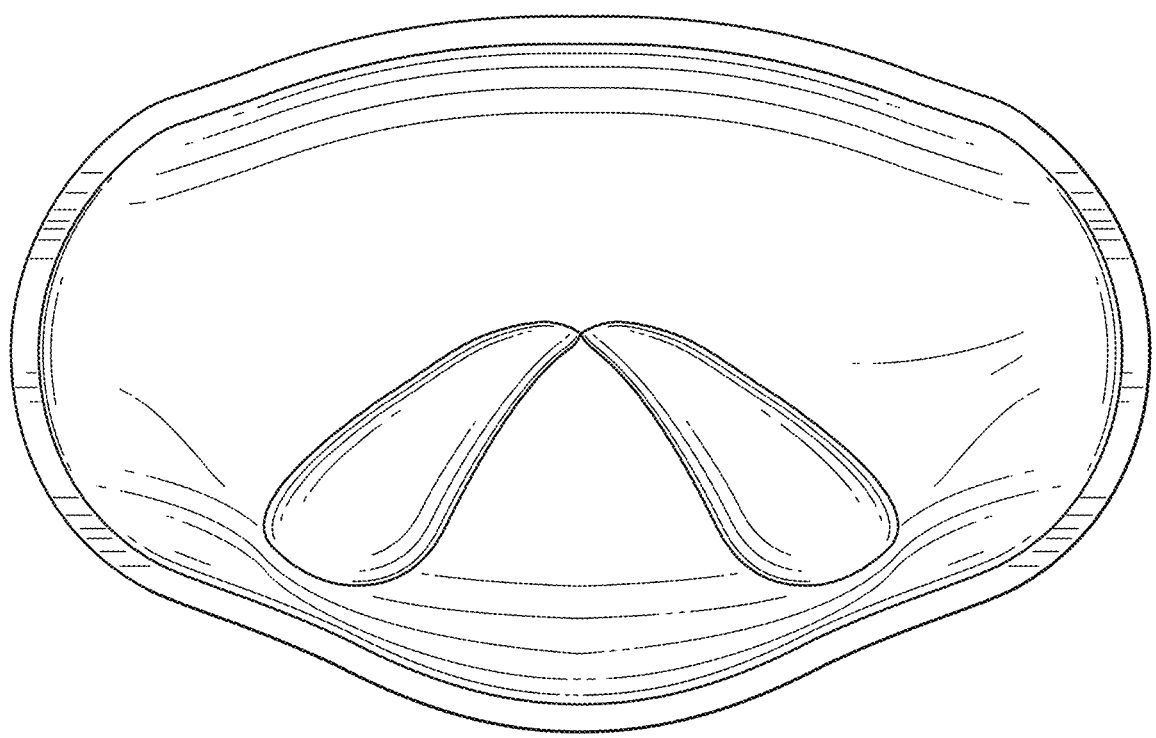
FIG. 46 is a top view of the feature of FIG. 43 showing an interior thereof.
Figure 47:
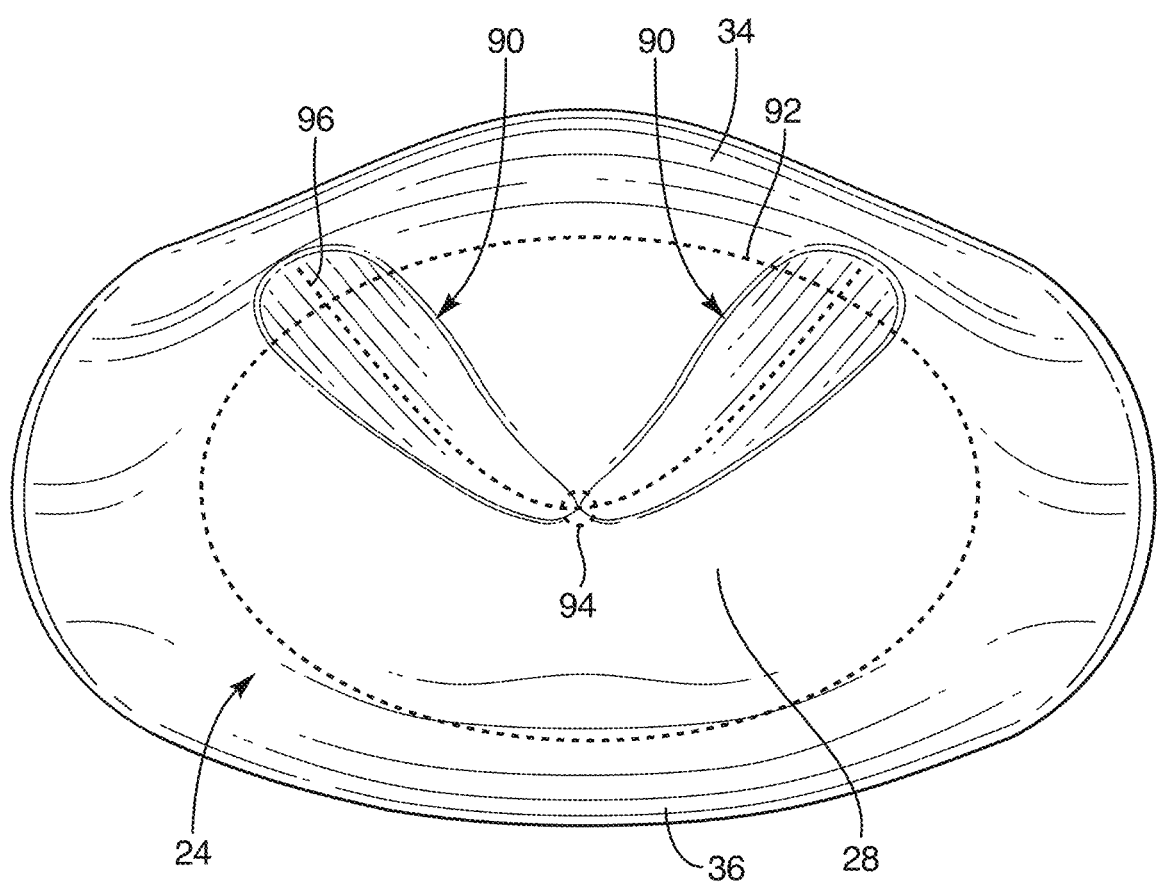
FIG. 47 is a bottom view of the feature of FIG. 43 showing an exterior thereof.
Figure 48:
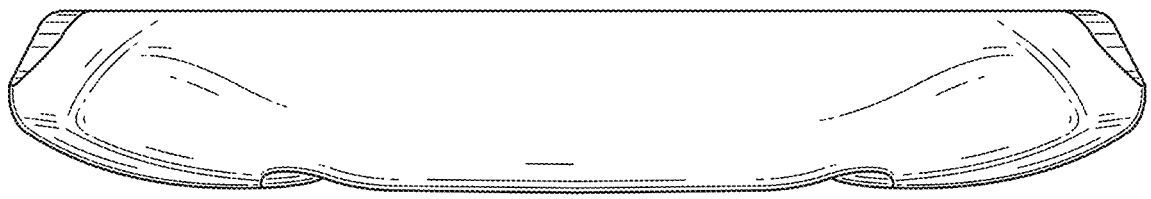
FIG. 48 is a front view of the feature of FIG. 43.
Figure 49:
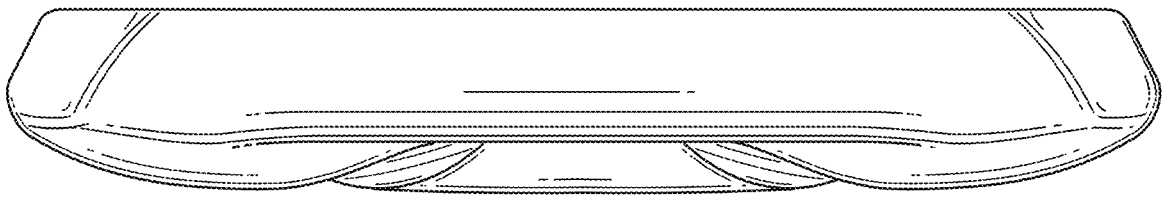
FIG. 49 is a back view of the feature of FIG. 43.
Figure 50:
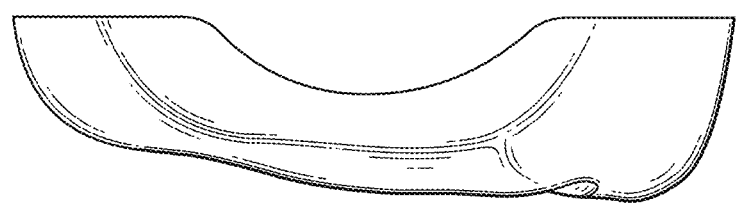
FIG. 50 is a first side view of the feature of FIG. 43.
Figure 51:
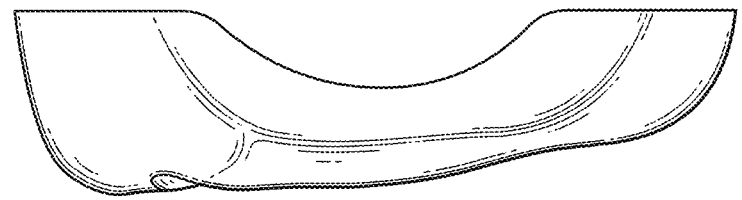
FIG. 51 is a second side view of the feature of FIG. 43.
Figure 52:
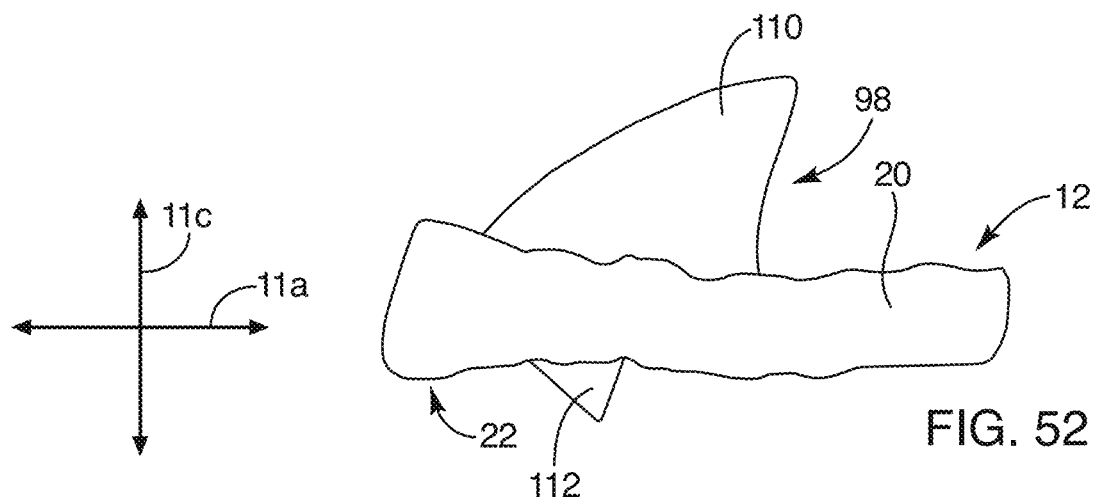
FIG. 52 is a side view of an alternative embodiment of an upper portion of a dental appliance, wherein the upper portion includes or is connected to a tongue-retention feature in accordance with the present invention.
Figure 53:
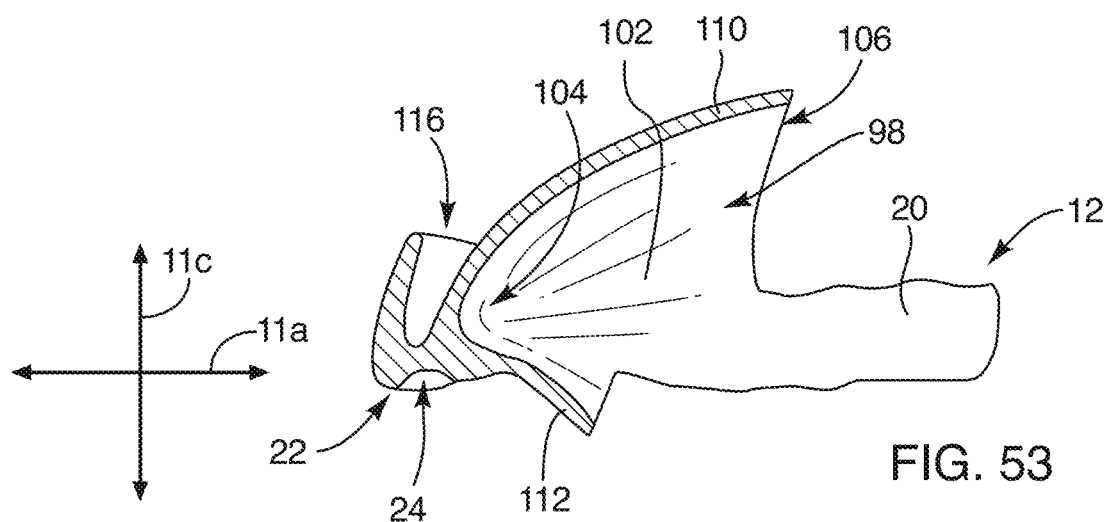
FIG. 53 is a cross-sectional side view of the upper portion and tongue-retention feature of FIG. 52.
Figure 54:
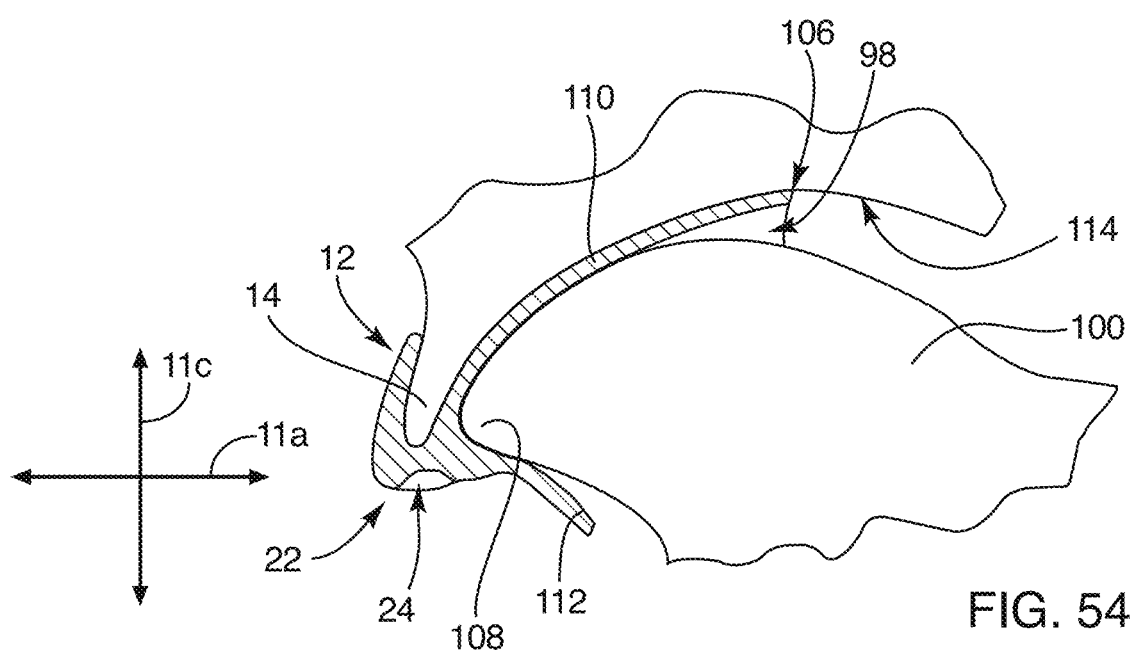
FIG. 54 is a cross-sectional side view of the upper portion and tongue-retention feature of FIG. 52 installed on a patient.
Figure 55:
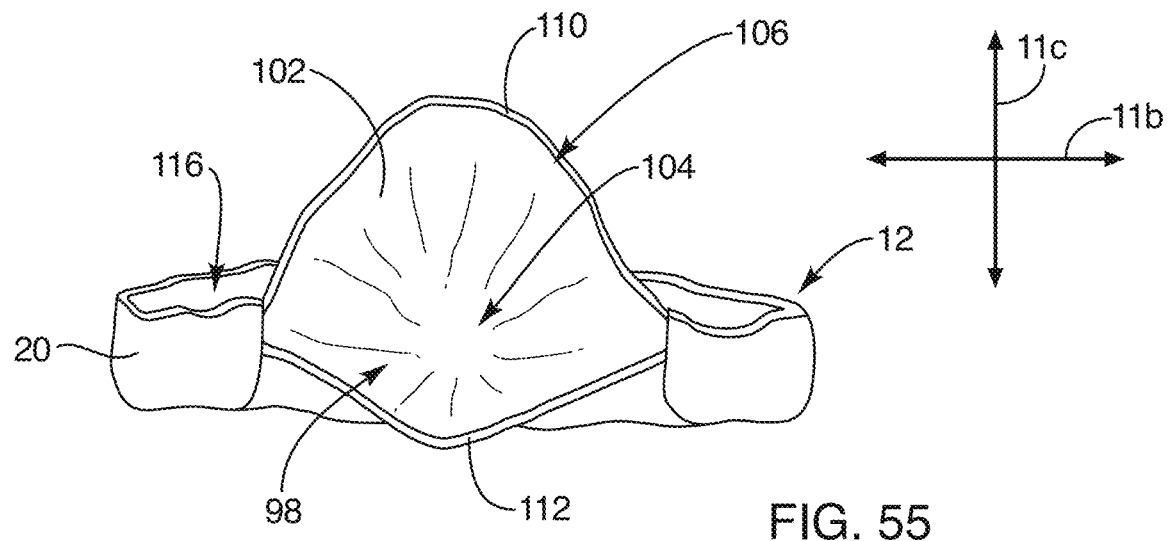
FIG. 55 is a rear view of the upper portion and tongue-retention feature of FIG. 52.
Figure 56:
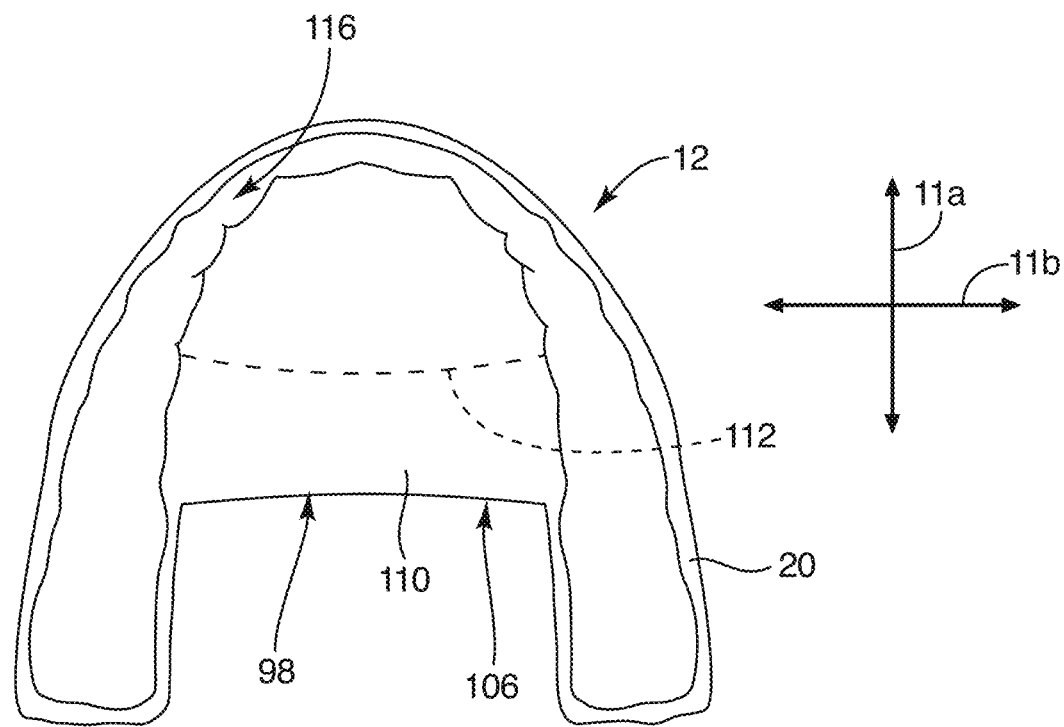
FIG. 56 is a top view of the upper portion and tongue-retention feature of FIG. 52.

Referring to FIGS. 1-3, bruxism may cause unnecessary muscle strain, tension, and pain. For example, while grinding and clenching teeth, jaw muscles may be contracted and strained for extended periods of time. Additionally, grinding and clenching of teeth may cause muscle strain and tension in other areas. For example, bruxism may produce muscle strain, tension, and pain in the muscles of the neck. Bruxism may cause sleep problems as well.

For example, when the muscular systems of the head and neck are contracting, a patient may not enter deeper levels of sleep. Thus, habitual clenching and grinding can prevent the parasympathetic system from operating at its potential. A depressed immune system, lower metabolism, depressed neurotransmitter activity, lower reaction time, high stress levels, feelings of depression and more have all been documented and linked to lack of deep sleep.

Additionally, muscle tension and stress from over worked muscles and lack of sleep are a leading cause of headaches. When the brain receives too much bad sensory information, it may translate to a headache. The motor component of the trigeminal nerve can send a lot of bad sensory information to the brain. Thus, headaches may be a symptom of bruxism.

By treating bruxism, an appliance 10 in accordance with the present invention may cure a host of ailments. For example, an appliance 10 may protect teeth from harmful abrasion and unnecessary wear. An appliance 10 may also reduce inflammation of the periodontal ligament (PDL), reduce pulpitis of the teeth, preserve an orthodontic tooth position, reduce muscle strain, tension, and pain in the muscles of the jaw, reduce muscle strain, tension, and pain in the muscles of the neck, enable a user to enter deeper levels of sleep, and/or reduce headaches.

In describing an appliance 10 in accordance with the present invention, it may be helpful to define a coordinate system. For example, in selected embodiments, an appliance 10 may be described in terms of a longitudinal direction 11a, lateral direction 11b, and transverse direction 11c. The longitudinal, lateral, and transverse directions 11a, 11b, 11c may extend orthogonally with respect to one another.

In selected embodiments, an appliance 10 in accordance with the present invention may include an upper portion 12 corresponding to (e.g., engaging, covering, being worn over) one or more upper or maxillary teeth 14 of a patient and a lower portion 16 corresponding to (e.g., engaging, covering, being worn over) one or more lower or mandibular teeth 18 of the patient. In certain embodiments, the upper and lower portions 12, 16 of an appliance 10 may be worn simultaneously.

An appliance 10 may cover all of the teeth of a patient or some subset thereof. For example, in selected embodiments, an upper portion 12 may engage or cover all or substantially all maxillary teeth 14 of a patient and a lower portion 16 may engage or cover all or substantially all mandibular teeth 18 of the patient. This may allow for orthodontic retention, product delivery (e.g., application of a whitening product to the teeth), or the like or a combination thereof. Alternatively, one or both of an upper portion 12 and a lower portion 16 may respectively cover less than (e.g., substantially less than) all of the maxillary and mandibular teeth of a patient.

In selected embodiments, upper and lower portions 12, 16 in accordance with the present invention may each include a base 20 and a feature 22. For example, an upper portion 12 may include a first base 20a and a first feature 22a, while a lower portion 16 may include a second base 20b and a second feature 22b.

A base 20 may be shaped to selectively engage one or more teeth of a patient. A feature 22 may be secured to a base 20. Thus, a base 20 may interface between a feature 22 and certain teeth of a patient. For example, a base 20 may be custom made to closely fit certain teeth of a patient. Accordingly, when the base 20 is applied to the one or more teeth, the base 20 may tend to stay there by mechanical gripping, suction, or the like or some combination thereof. Thus, once a base 20 is applied to one or more teeth, a corresponding feature 20 may be held in a desired orientation or position with respect to the teeth. However, the base 20 and corresponding feature 22 may be removed from the patient by simply pulling the base 20 away from the corresponding teeth.

In certain embodiments, an appliance 10 may include features 22 positioned opposite one another. For example, a first feature 22a of an upper portion 12 may be positioned opposite a second feature 22b of a lower portion 16. Accordingly, mandibular motion of a patient (e.g., biting down) may result in a first feature 22a contacting a second feature 22b.

In selected embodiments, features 22 may be positioned and shaped to interface or interact with one another in a particular manner. For example, a first feature 22a may comprise an indentation 24 or recess 24 and a second feature 22b may comprise a protrusion 26 or mound 26. Alternatively, a first feature 22a may comprise a protrusion 26 or mound 24 and a second feature 22b may comprise an indentation 24 or recess 24. Thus, while FIGS. 1-3 show an indentation 24 forming part of an upper portion 12 and a protrusion 26 forming part of a lower portion 16, in other embodiments, a protrusion 26 may form part of an upper portion 12 and an indentation 24 may form part of a lower portion 16.

In certain embodiments, features 22 may be positioned and shaped to interface or interact with one another to control, direct, or influence the mandibular motion, mandibular loadings, or the like of a corresponding patient. For example, when an appliance 10 is in place, opposing first and second features 22a, 22b may be located on or secured to anterior areas of the respective first and second bases 20a, 20b. Moreover, the first and second features 22a, 22b may be shaped, sized, or position such that contact therebetween may be or comprise an initial, primary, or exclusive point of contact for forces of occlusion (e.g., biting loads) or the like passing form mandibular teeth to maxillary teeth of the corresponding patient.

As a result, an appliance 10 may cause all forces of occlusion to be directed to the front of the mouth or to the front teeth (e.g., maxillary central incisors, maxillary lateral incisors, mandibular central incisors, mandibular lateral incisors, or the like or combinations or sub-combinations thereof). The brain of a patient may not allow the muscles of mastication to produce the same force of occlusion when pressure is only on the front teeth. That is, an appliance 10 may not allow the muscles around the joint to contract at full strength. Thus, an appliance may 10 may prevent a patient from clenching or grinding teeth and provide to the patient the benefits associated therewith.

An appliance 10 in accordance with the present invention may be manufactured in any suitable manner. In selected embodiments, a base 20 and corresponding feature 22 may be made as a monolithic unit by three-dimensional printing, photo-activation, machining, casting, molding, or the like. Alternatively, impressions (e.g., actual or digital impressions) of a patient's teeth may be taken and models of the patient's teeth may be fabricated. Polymeric material (e.g., acrylic sheets) may be applied to and/or formed around the modeled teeth to form first and second bases 20a, 20b. Thus, the bases 20 may be custom made to closely fit selected teeth of a patient. Once the bases 20 are formed, appropriate features 22 may be applied thereto.

Features 22 in accordance with the present invention may be manufactured from any suitable material or combinations of materials. Suitable materials may include polymers, ceramics, metals, metal alloys, or the like. In certain embodiments, features 22 be manufactured as separate, standardized pieces. That is, while a base 20 may be custom made to fit only one patient, a feature 22 may be an "off-the-shelf" item that may be applied to various bases 20. For example, features 22 may be manufactured in one size or in a relative small set of sizes (e.g., small, medium, large, etc.). Then, once a base 20 has been made, an appropriate feature 22 may be selected, positioned, and bonded to an anterior area of the base 20. Alternatively, a feature 22 may be formed by hand from a polymeric material, epoxy, or the like that is molten, in a softened condition, uncured, or the like and urged against or otherwise bonded to a base 20.

In selected embodiments, a feature 22a corresponding to an upper portion 12 may be positioned differently than a feature 22b corresponding to a lower portion 16. This difference may ensure that the two features 22a, 22b properly align when a lower jaw of the corresponding patient is in a desired position (e.g., a neutral, central, forward, lower, or mouth-slightly-open position, or a combination or sub-combination thereof). This desired position may be selected to control jaw position and postural muscles of the neck and head to open the airway of the patient, thereby decreasing snoring and reducing the incidence or symptoms of sleep apnea. For example, in certain embodiments, a feature 22a corresponding to an upper portion 12 may be positioned primarily or largely posterior and/or inferior to the maxillary central incisors, while a feature 22b corresponding to a lower portion 16 may be positioned primarily or largely superior (and possible anterior or posterior to) the mandibular central incisors.

Referring to FIGS. 4-11, a feature 22 providing or comprising an indentation 24 or recess 24 may have any suitable configuration. In selected embodiments, such a feature 22 may include a first side having a concave surface 28 forming a concavity, which concavity may be the indentation 24 or recess 24. The feature 22 may also include a second side having a channel 30 facilitating securement of the feature 22 to a base 20.

For example, a channel 30 may provide a location for bonding material to be applied to a feature 22 before the feature 22 is applied to a corresponding base 20. Alternatively, or in addition thereto, in selected embodiments, an aperture 30 or channel 30 may include one or more curved surfaces 32 that track or loosely follow a typical curve associated with an anterior area of a base 20. That is, as a base 20 may curve to accommodate the natural positioning of the incisors, cuspids, bicuspids, etc. of the patient, so a channel 30 or curved surface 32 thereof may curve to accommodate the shape of the base 20. Accordingly, the curved surface 32 may facilitate positioning and stabilizing of a feature 22 with respect to a corresponding base 20.

In selected embodiments, a channel 30 may divide a feature 22 into an anterior portion 34 and a posterior portion 36. When connected to a base 20 and applied to a patient, an anterior portion 34 may be largely or exclusively positioned anterior to the teeth (e.g., incisors, cuspids, etc.) of the patient. Conversely, a posterior portion 36 may be positioned largely or exclusively posterior to those teeth.

In selected embodiments, one curved surface 32a or side of a channel 30 may be part of an anterior portion 34, while another, opposite curved surface 32b or side of the channel 30 may be part of a posterior portion 36. A channel 30 may have any suitable width in the longitudinal direction 11a between such opposing surfaces 32a, 32b. In selected embodiments, a channel 30 may have a width just wide enough to accommodate the outer or exposed portions of the incisors (or the incisors and cuspids) and the thickness of the base 20 extending thereover. Alternatively, a channel 30 may have a width that significantly wider than the teeth corresponding thereto.

For example, a channel 30 may have one curved surface 32a that tracks or loosely follows the curvature of the anterior side of the teeth, while an opposing curved surface 32b extends posteriorly away from a posterior side of the teeth. In such embodiments, the wide channel 30 may increase the stability with which the feature 22 may be secured to a base 20. Such stability may be helpful when a feature 22 comprises an indentation 24 or recess 24 positioned largely or entirely posterior to the corresponding teeth.

In selected embodiments, the width in the longitudinal direction 11a between opposing surfaces 32 of a channel 30 may be substantially constant across a feature 22 in the lateral direction 11b. That is, the width of the channel 30 may be substantially constant from one end of the channel 30 to the other. Alternatively, the width may vary. For example, in certain embodiments, a channel 30 may have the smallest width at the lateral 11b extremes thereof. The channel 30 may be the widest at a middle portion thereof.

In certain embodiments, curvature of the opposing surfaces 32 of a channel 30 may be complementary or track one another. For example, if a curved surface 32a corresponding to an anterior portion 34 of a feature 22 is primarily concave, then an opposing curved surface 32b corresponding to a posterior portion 36 of the feature 22 may be primarily convex. Alternatively, curvature of the opposing surfaces 32 of a channel 30 may be substantially opposite. For example, if a curved surface 32a corresponding to an anterior portion 34 of a feature 22 is primarily concave, then an opposing curved surface 32b corresponding to a posterior portion 36 of the feature 22 may also be primarily concave and extend away from the other surface 32a.

A channel 30 in accordance with the present invention may have any suitable floor 38 or ceiling 38 connecting the opposing curved surfaces 32 or sides. For example, a floor 38 or ceiling 38 may be substantially flat. Alternatively, a floor 38 or ceiling 38 may be curved (e.g., smoothly curving and transitioning from one curved surface 32a to the opposing curved surface 32b). In selected embodiments, a feature 22 corresponding to an indentation 24 or recess 24 may have a channel 30 with a floor 38 or ceiling 38 that is substantially flat, while a feature 22 corresponding to a protrusion 26 or mound 26 may have a channel 30 with a floor 38 or ceiling 38 that is smoothly curved as it transitions from one curved surface 32a to the opposing curved surface 32b.

The various edges and surfaces of a feature 22 may be radiused and smooth. Smooth, radiused edges and smooth surfaces may enhance the comfort experienced by a patient in wearing an appliance 10 in accordance with the present invention. For example, an upper lip of a patient may rest on an anterior portion 34 of a feature 22 of an upper portion 12 of an appliance 10. Accordingly, the anterior portion 34 may be radiused and smooth to avoid irritating or harming the tender tissues on the interior of the upper lip. Similarly, the tip of a tongue of a patient may rest on a posterior portion 36 of a feature 22 of an upper portion 12 of an appliance 10. Accordingly, the posterior portion 34 may be radiused and smooth to avoid irritating or harming the tongue of the patient.

Referring to FIGS. 12-19, a feature 22 providing or comprising a protrusion 26 or mound 26 may have any suitable configuration. In selected embodiments, such a feature 22 may include a first side having a convex surface 40 forming the protrusion 26 or mound 26. The feature 22 may also include a second side having an aperture 30 or channel 30 facilitating securement of the feature 22 to a base 20. In certain embodiments, such an aperture 30 or channel 30 may include one or more curved surfaces 32 that track or loosely follow a typically curve associated with an anterior area of a base 20.

Referring to FIGS. 20-25, in selected embodiments, as features 22 interact with one another, they may change a position of a lower jaw of a patient. For example, when lateral excursions (e.g., when a lower jaw moves side to side in the lateral direction 11b) take place, opposing features 22 may lessen the strain in the TMJ. That is, when directly contacting and opposing one another, the opposing features 22 may maintain a certain initial separation 42 between an upper and lower jaw. However, during a lateral excursion, a protrusion 26 may pass or move out of alignment with an opposing indentation 26. That is, a protrusion 26 may move along and "climb" the walls of an indentation 24. In a laterally misaligned position, a new, greater separation 44 between an upper and lower jaw may be applied or enforced. In certain embodiments or with certain patients, this greater separation 44 in a lateral excursion may lower the strain imposed on the TMJ.

Similarly, in certain embodiments during a longitudinal excursion (e.g., when a lower jaw moves in or out in the longitudinal direction 11a), a protrusion 26 may pass or move out of alignment with an opposing indentation 24. As with a lateral excursion, a longitudinal excursion may cause a protrusion 26 may move along and "climb" the walls of an indentation 24. Accordingly, in a longitudinally misaligned position, a new, greater separation 44 between an upper and lower jaw may also be applied or enforced.

A protrusion 26 and indentation 24 in accordance with the present invention may have any suitable fit or relative size therebetween. For example, in selected embodiments, a protrusion 26 may be significantly thinner than an opposing indentation 24 in the longitudinal direction 11a, the lateral direction 11b, or both the longitudinal and lateral directions 11a, 11b. In such embodiments, a protrusion 26 may move within an opposing indentation 24 through a sizable range of motion in the longitudinal direction 11a, the lateral direction 11b, or both the longitudinal and lateral directions 11a, 11b, respectively.

Alternatively, a protrusion 26 may be closer to the size of an opposing indentation 24 in the longitudinal direction 11a, the lateral direction 11b, or both the longitudinal and lateral directions 11a, 11b. In such embodiments, a protrusion 26 may move within the indentation 24 through a smaller range of motion in the longitudinal direction 11a, the lateral direction 11b, or both the longitudinal and lateral directions 11a, 11b, respectively. In certain embodiments, a protrusion 26 may substantially match the size of an opposing indentation 24 in one or both of the longitudinal and lateral directions 11a, 11b. Thus, longitudinal and/or lateral excursions may only be permitted to the extent that the protrusion 26 exits the opposing indentation 24.

Accordingly, the relative sizing and shapes of a protrusion 26 and opposing indentation 24 may define to a certain degree the range of motion of a lower jaw with respect to an upper jaw. Additionally, in selected embodiments, the relative sizing and shapes of a protrusion 26 and opposing indentation 24 may define or generate a biasing force urging a lower jaw into a particular alignment (e.g., a neutral and/or centered alignment) with an upper jaw. For example, the sides of an indentation 24 may bias an opposing protrusion 26 toward a center of the indentation 24. That is, if a protrusion 22 is contacting the sides of an indentations 20 as shown in FIGS. 21, 22, 24, 25, forces of occlusion may result in a centering force 46 urging a lower jaw to return to a desired (e.g., a neutral and/or centered) alignment.

In selected embodiments, each feature 22 and the surfaces 28, 40 thereof may extend gradually and smoothly from the surrounding area of the respective portions 12, 16. Accordingly, in such embodiments, when in contact with one another, opposing features 22 may move smoothly over one another (e.g., in lateral excursions, longitudinal excursions, or both lateral and longitudinal excursions).

Indentations 24 and protrusions 26 in accordance with the present invention may have any suitable depth 48 and height 50, respectively. In selected embodiments, the depth 48 of a particular indentation 24 may be less than or substantially equal to the height 50 of a corresponding protrusion 26. In certain embodiments, the height 50 of a protrusion 26 may be in a range from about 1 mm to about 12 mm and preferably from about 3 mm to about 8 mm. In such embodiments, the depth 48 of an indentation 24 may also be in a range from about 1 mm to about 12 mm and preferably from about 3 mm to about 8 mm.

Similarly, indentations 24 and protrusions 26 in accordance with the present invention may have any suitable base widths 52, 54, respectively. In selected embodiments, the base width 52 of a particular indentation 24 in both the longitudinal and lateral directions 11*a*, 11*b* may be greater than or substantially equal to the base width 54 of a corresponding protrusion 26 in both the longitudinal and lateral directions 11*a*, 11*b*.

In certain embodiments, the base width 54 of a protrusion 26 in the lateral direction 11*b* may be in a range from about 2 mm to about 15 mm and preferably from about 5 mm to about 10 mm. In such embodiments, the base width 52 of an indentation 24 in the lateral direction 11*b* may be in a range from about 3 mm to about 30 mm and preferably from about 10 mm to about 20 mm.

In certain embodiments, the base width 54 of a protrusion 26 in the longitudinal direction 11*a* may be less than the base width 52 of an indentation 24 in the lateral direction 11*b*. For example, the base width 54 of a protrusion 26 in the longitudinal direction 11*a* may be in a range from about 2 mm to about 12 mm and preferably from about 5 mm to about 8 mm. In such embodiments, the base width 52 of an indentation 24 in the longitudinal direction may be in a range from about 3 mm to about 20 mm and preferably from about 8 mm to about 15 mm.

Referring to FIGS. 26-31, in certain alternative embodiments, an appliance 10 may include two opposing protrusions 26 or mounds 26, one on the anterior section of each portion 12, 16. When an appliance 10 is in place, opposing protrusions 26 on the anterior sections of the upper and lower portions 12, 16 may form an initial, primary, or exclusive point of contact between an upper jaw and a lower jaw. This may cause all forces of occlusion to be directed to the front of the mouth or to the front teeth and, therefore, prevent a patient from clenching or grinding teeth and provide to the patient the benefits associated therewith.

In selected embodiments, opposing protrusions 26 may change a position of a lower jaw. For example, when lateral excursions take place, opposing protrusions 26 may lessen the strain in the TMJ. That is, when directly contacting and opposing one another, two protrusions 26 may maintain a certain initial separation 56 between an upper and lower jaw. However, during a lateral excursion, one protrusion 26*a* may pass or move out of alignment with the other protrusion 26*b*. That is, one protrusion 26*a* may slide off of the other protrusion 26*b*. In a misaligned position, a new, lower separation 58 between an upper and lower jaw may be allowed or permitted. In certain embodiments or applications, or with certain patients, a lower separation 58 may lower the strain imposed on the TMJ in a lateral excursion.

In certain embodiments, during a longitudinal excursion, one protrusion 26*a* may pass or move out of alignment with the other protrusion 26*b*. In a misaligned position, a new, lower separation 58 between an upper and lower jaw may be allowed or permitted. Alternatively, one or both protrusions 26 may be formed such that longitudinal excursions produce no new or lower separation 58 between an upper and lower jaw.

In selected embodiments, each protrusion 26 may extend gradually and smoothly from the surrounding area of the respective portions 12, 16. Accordingly, in such embodiments, when in contact with one another, opposing protrusions 26 may move smoothly over one another (e.g., in lateral excursions, longitudinal excursions, or both lateral and longitudinal excursions).

Protrusions 26 in accordance with the present invention may have any suitable height 60. In selected embodiments, opposing protrusions 26*a*, 26*b* may have different heights 60*a*, 60*b*. Alternatively, the heights 60*a*, 60*b* of the opposing protrusions 26*a*, 26*b* may be equal. In certain embodiments, the height 60 of each protrusion 26 may be in a range from about 1 mm to about 6 mm and preferably from about 3 mm to about 6 mm. The width (e.g., base width) of each protrusion 26 may be in a range from about 5 mm to about 20 mm and preferably from about 10 mm to about 15 mm.

An appliance 10 with opposing protrusions 26 may be manufactured in any suitable manner. In selected embodiments, impressions of a patient's teeth may be taken, models of patient's teeth may be fabricated, and then polymeric material (e.g., acrylic sheets) may be applied to and/or formed around the modeled teeth to form appropriate bases 20. Protrusions 26 may then be positioned appropriately and bonded to the bases 20 on the anterior area thereof.

Bonding a protrusion 26 to a base 20 may be done by bonding on a feature 22 manufactured as separate, standardized piece. Alternatively, a feature 22 and corresponding protrusion 26 may be formed by hand from a polymeric material, epoxy, or the like that is molten, in a softened condition, uncured, or the like and urged against or otherwise bonded to a base 20.

In selected embodiments, a protrusion 26*a* corresponding to an upper portion 12 may be positioned differently than a protrusion 26*b* corresponding to a lower portion 16. This difference may ensure that the two protrusions 26*a*, 26*b* properly align when a lower jaw is in a desired position (e.g., a neutral position). For example, in certain embodiments, a protrusion 26*a* corresponding to an upper portion 12 may be positioned primarily behind the maxillary central incisors, while a protrusion 26*b* corresponding to a lower portion 16 may be positioned primarily over or just slightly behind the mandibular central incisors.

Referring to FIGS. 32-36, an appliance 10 in accordance with the present invention may be beneficially used by a patient suffering from bruxism, sleep apnea, or both bruxism and sleep apnea. For example, as noted above, an appliance 10 may include a first feature 22*a* comprising an indentation 24 or recess 24 and a second feature 22*b* comprising a protrusion 26 or mound 26. (Alternatively, a first feature 22*a* may comprise a protrusion 26 or mound 24 and a second feature 22*b* may comprise an indentation 24 or recess 24.) Interaction of such features 22*a*, 22*b* may be helpful in treating bruxism, sleep apnea, or both bruxism and sleep apnea.

For example, as noted above, such features 22*a*, 22*b* may be located on or secured to anterior areas of the respective first and second bases 20*a*, 20*b*. Moreover, the first and second features 22*a*, 22*b* may be shaped, sized, or position such that contact therebetween may be or comprise an initial, primary, or exclusive point of contact for forces of occlusion or the like passing from mandibular teeth to maxillary teeth of the corresponding patient. As a result, an appliance 10 may cause all forces of occlusion to be directed to the front of the mouth or to the front teeth. The brain of a patient may not allow the muscles of mastication to produce the same force of occlusion when pressure is only on the front teeth. Thus, an appliance may 10 may prevent a patient from clenching or grinding teeth and provide to the patient the benefits associated therewith.

Alternatively, or in addition thereto, such features 22a, 22b may urge a lower jaw to a position that reduces the incidence of sleep apnea. That is, interaction or nesting of the complementary concave and convex surfaces the features 22a, 22b and the centering forces 46 associated therewith may bias or guide a lower jaw of the corresponding patient to a desired position. As noted above, this desired position may be selected to open the airway of the patient, thereby decreasing snoring and reducing the incidence or symptoms of sleep apnea.

In certain embodiments, the ability of an appliance 10 in accordance to the present invention to treat sleep apnea may be enhanced through the addition of one or more biasing members 62. A biasing member 62 may apply a force to a lower jaw of a patient. The biasing member 62 may be oriented such that the force applied thereby may tend to maintain a protrusion 26 properly centered within an opposing indentation 24. Thus, a biasing member 62 may assist opposing features 22a, 22b in maintaining the lower jaw of the patient in the desired position.

A biasing member 62 in accordance with the present invention may have any suitable shape and composition. In selected embodiments, a biasing member 62 may be formed of an elastomeric material. In such embodiments, when a biasing member 62 is stretched from its neutral position, a return or restorative force may be generated and used to maintain the lower jaw of the patient in the desired position.

In selected embodiments, a biasing member 62 may apply a force to a lower jaw of a patient by applying a force to a lower portion 16 worn by the patient. For example, a biasing member 62 may extend from an upper portion 12 worn by the patient to a lower portion 16 worn by the patient. In so doing, a biasing member 62 may connect to the upper and lower portions 12, 16 in any suitable manner. For example, in selected embodiments, the upper and lower portions 12, 16 may include engagement mechanisms 64 extending to engage one or more biasing members 62.

An engagement mechanism 64 may have any suitable configuration. In certain embodiments, the configuration of one or more engagement mechanisms 64 may be dictated by the configuration of one or more biasing members 62 corresponding thereof. For example, in selected embodiments, a biasing member 62 may include one or more (e.g., a series of) apertures 66. Accordingly, an engagement mechanism 64 may comprise an extension 68 (e.g., a post, hook, or the like) that may extend into an aperture 66, one end of an aperture 66, or the like to engage the corresponding biasing member 62. In certain embodiments, the edges of such an extension 68 may be chamfered, rounded, or the like to reduce or prevent any irritation or injury to the interior of the patient's mouth.

An engagement mechanism 64 may be connected to a corresponding upper or lower portion 12, 16 in any suitable manner. For example, in selected embodiments, an engagement mechanism 64 (e.g., an extension 68) may monolithically formed as part of a base 20, feature 22, or the like. Alternatively, an engagement mechanism 64 (e.g., extension 68) may be bonded onto a base 20, feature 22, or the like. Accordingly, in selected embodiments, an engagement mechanism 64 may include one or more features facilitating such bonding.

For example, in selected embodiments, an engagement mechanism 64 may comprise an extension 68 and a flange 70 connected to a base of the extension 68. The flange 70 may provide a larger surface area for bonding and increase the strength with which a corresponding engagement mechanism 64 may be bonded to an upper or lower portion 12, 16.

In selected embodiments, one or more engagement mechanisms 64 may each comprise an extension 68 and corresponding flange 70 monolithically formed from a single piece of metal or metal alloy. An appliance 10 in accordance with the present invention may have any suitable number of engagement mechanisms 64 and corresponding biasing members 62. Moreover, the engagement mechanisms 64 and corresponding one or more biasing members 62 may be located, oriented, or the like to applied desired force or forces to the lower jaw of the patient.

For example, in selected embodiments, an appliance 10 may include four engagement mechanisms 64 and at least one biasing member 62. Two engagement mechanisms 64 and at least one biasing member 62 or a portion of at least one biasing member 62 may correspond to each side of the appliance 10. The two engagement mechanisms 64 (one on each of the upper and lower portions 12, 16) and the biasing member 62 or a portion of the biasing member 62 extending therebetween may be located and oriented to urge a lower jaw forward and toward an upper jaw. For example, for each side of an appliance 10, one engagement mechanism 64 may located on an outer, posterior portion of a lower portion 16 while the other engagement mechanism 64 may be located on an upper portion 12 so as to be anterior to at least one maxillary incisor (e.g., a lateral or central maxillary incisor) and/or laterally between the outer edges of the maxillary lateral incisors of the wearer.

Alternatively, an appliance 10 may include three engagement mechanisms 64a, 64b, 64c. A first engagement mechanism 64a may be positioned on an anterior area (e.g., front and lateral center) of an upper portion 12. A second engagement mechanism 64b may be positioned on a right, posterior portion of a lower portion 16. A third engagement mechanism 64c may be positioned on a left, posterior portion of the lower portion 16. A first biasing member 62 may extend from the first engagement mechanism 64a to the second engagement mechanism 64b, while a second biasing member 62 may extend from the first engagement mechanism 64a to the third engagement mechanism 64c. Alternatively, the first and second biasing members 62 may comprise a single, monolithic, biasing member 62 extending from the second engagement mechanism 64b to the first engagement mechanism 64b to the third engagement mechanism 64c.

The force applied by an arrangement of engagement mechanisms 64 in accordance with the present invention, and biasing member 62 or biasing members 62 to a lower jaw may have various components 72. A first component 72a may tend to urge a lower jaw forward and toward an upper jaw. Opposing second and third components 72b, 72c may tend to center a lower jaw with respect to an upper jaw.

The tension, pre-stretch, or the like in the one or more biasing mechanisms 62 may be selected to maintain a desired position, even when the patient relaxes his or her jaw muscles. Additionally, the biasing members 62 may not be so tight (or have such a high spring constant or short elongation limit) as to make the patient feel that his or her mouth is tied shut or overly restrained. A proper amount of force may make the patient feel as if his or her lower jaw is simply floating in place.

An appliance 10 may treat sleep apnea substantially exclusively through one or more biasing members 62 in embodiments where one or more features 22 are omitted. Thus, in selected embodiments, one or more biasing mechanisms 62 may be used (e.g., arranged and connected as disclosed above) in combination with upper and lower portions 12, 16 that each comprise a base 20 without a corresponding or attached feature 22.

Referring to FIGS. 37-42, in certain alternative embodiments, interaction between an indentation 24 and an opposing protrusion 26 may guide a lower jaw differently for longitudinal excursions than for lateral excursions. This may be accomplished by configuring an indentation 24 to be a groove 74 that extends in a lateral direction 11b across a corresponding feature 22.

In selected embodiments, a groove 74 may follow or form an arc 76 that is opposite in concavity to a dental arch 78 of the wearer of the corresponding appliance 10. That is, a dental arch 78 of a wearer may be concave when viewed from a location posterior thereto and convex when view from a location anterior thereto. Accordingly, a groove 74 in accordance with the present invention may follow or form an arc 76 that is convex when viewed from a location posterior thereto and concave when view from a location anterior thereto. This arc 76 may enable a lower jaw or selected portions thereof to move (e.g., move laterally with a relatively small longitudinal component) in a more natural or comfortable manner during lateral excursions.

That is, a protrusion 26 that engages (e.g., enters) an indentation 24 configured as an arced groove 74 extending primarily in a lateral direction 11b may tend to track the arc 76 of that groove 74 during lateral excursions. Accordingly, an arc 76 may enable a lower jaw or selected portions thereof to move laterally and anteriorly (e.g., laterally with a small anterior component) as a protrusion 26 departs (e.g., to the left or right) off of a central or neural position. Thus, the shape of the arc 76 may be selected to lessen the strain in the TMJ during lateral excursions.

In selected embodiments, a groove 74 may have a floor 80 and walls 82 like a canyon has a canyon floor and canyon walls. Depending on the orientation of the corresponding features 22 on an appliance 10, such a floor 80 may actually be a "ceiling." However, for purposes of discussion and to preserve the geologic analogy, a groove 74 will be discussed as having a floor 80 and walls 82.

The walls 82 of a groove 74 may guide 84, direct 84, or bias 84 an abutting protrusion 26 to a floor 80 of the groove 74. For example, in certain embodiments during a longitudinal excursion (e.g., when a lower jaw moves in or out in the longitudinal direction 11a), a protrusion 26 may pass or move out of alignment with an opposing indentation 24. That is, a protrusion 26 may move off of a floor 80 of a corresponding groove 74 and "climb" the walls 82 of the groove 74. Accordingly, in a longitudinally misaligned position, a new, greater separation 44 between an upper and lower jaw may also be applied or enforced. Additionally, the walls 82 of a groove 74 may bias 84 an opposing protrusion 26 toward a floor 80 of the groove 74. That is, if a protrusion 26 is contacting the walls 82 of a groove 74, forces of occlusion may result in a centering force 46 urging a lower jaw to return to a desired (e.g., a neutral and/or centered) alignment wherein the protrusion 26 is in contact with the floor 80 of the groove 74.

A floor 80 of a groove 74 may slope toward a center 86 (e.g., the lateral center 86) of the floor 80 or slope away 88 from the center 86. Accordingly, the contour of a floor 80 may be selected to control separation (e.g., separation between a lower and upper jaw in the transverse direction 11c) during lateral excursions.

For example, as shown in the illustrated embodiment, the floor 80 may slope away 88 from the center 86 on both sides of that center 86. Accordingly, with such embodiments when a protrusion 26 directly contacts a center 86 of a floor 80, the corresponding appliance 10 may maintain a certain initial separation between an upper and lower jaw. However, during a lateral excursion, the protrusion 26 may slide off of the center 86 in the lateral direction 11b. In a misaligned position, a new, lower separation between an upper and lower jaw may be allowed or permitted. In certain embodiments or applications, or with certain patients, a lower separation may lower the strain imposed on the TMJ in a lateral excursion.

Alternatively, the floor 80 may slope toward the center 86 on both sides of that center 86. Accordingly, with such embodiments when a protrusion 26 directly contacts a center 86 of a floor 80, the corresponding appliance 10 may maintain a certain initial separation between an upper and lower jaw. However, during a lateral excursion, the protrusion 26 may climb away from the center 86 in the lateral direction 11b. In a misaligned position, a new, greater separation between an upper and lower jaw may be enforced. Accordingly, forces of occlusion may result in a centering force urging a lower jaw to return to a desired (e.g., a neutral and/or centered) alignment wherein the protrusion 26 is in contact with the center 86 of the floor 80 of the groove 74.

In selected embodiments, the slope of a floor 80 toward a center 86 may be much less than the slope of the walls 82 toward the floor 80. Accordingly, when a wearer of an appliance 10 bites down, the centering forces in the lateral direction 11b may be much less than the centering forces in the longitudinal direction 11a. This may enable the wearer to feel more freedom in the lateral direction 11b without letting the lower jaw of the wearer fall back in the longitudinal direction 11a and restrict airflow.

Referring to FIG. 43-51, in certain embodiments, a feature 22 may comprise an indentation 24 having one or more grooves 90 formed therewithin. In such embodiments, an indentation 24 may comprise an outer boundary 92, a concave surface 28, one or more grooves 90, and a deepest point 92. The outer boundary 92 may circumscribe the deepest point 94. The indentation 24 may slope continuously from each point on the outer boundary 92 to the deepest point 94.

The one or more grooves 90 may be superimposed onto the concave surface 28. The one or more grooves 90 may create a preferential path or preferential paths in which an opposing protrusion 26 may travel. The one or more grooves 90 may resemble or be configured as channels that extend deeper than the concave surface 28. In selected embodiments, one or more grooves 90 may follow or form an arc 96 or a V-shape 96. The top, midpoint, or middle of the arc 96 or the point of the V-shape 96 may correspond to or be located at the deepest point 94. Accordingly, in selected embodiments, the one or more grooves 90 may slope to the deepest point 94.

Thus, even though one or more grooves 90 may interrupt a concave surface 28 of an indentation 24, the indentation 24 as a whole may still bias an opposing protrusion 26 to the deepest point. That is, an appliance 10 may, as a reaction to a biting force (and without regard to whether the point of contact is on the concave surface 28 or within a groove 90), generate a centering force 46 (e.g., a centering force 46 directed front to back, back to front, right to left, left to right, or some combination or sub-combination thereof) urging a lower jaw of the patient toward one particular alignment (e.g., the particular alignment wherein the peak of the protrusion 26 contacts the deepest point 94) whenever the peak of the opposing protrusion 26 is not in contact with the deepest point 94.

The arc 96 or V-shape 96 may open in a direction opposite a dental arch 78 of the wearer of the corresponding appliance 10. That is, a dental arch 78 of a wearer may be open to the posterior direction. Accordingly, the arc 96 or V-shape 96 formed by one or more grooves 90 may open to the anterior direction. This arc 96 or V-shape 96 may enable a lower jaw or selected portions thereof to move (e.g., move laterally and longitudinally) in a more natural or comfortable manner during lateral excursions.

That is, a protrusion 26 that engages (e.g., enters) an indentation 24 comprising an arced or V-shaped groove 90 or combinations of grooves 90 may tend to track the arc 96 or V-shape of that groove 90 or those grooves 90 during lateral and/or longitudinal excursions. Accordingly, an arc 96 or V-shape 96 may enable a lower jaw or selected portions thereof to move laterally and anteriorly as a protrusion 26 departs (e.g., to the left or right) off of a central or neural position (e.g., out of contact with a deepest point 92). Thus, the shape of the arc 96 or V-shape 96 may be selected to improve comfort for a patient, lessen the strain in the TMJ during lateral excursions, or the like.

In selected embodiments, the biasing member 62 and related structures disclosed in FIGS. 32-36 and the corresponding written description may be applied to an appliance 10 have features 22 disclosed in FIGS. 37-51 and the corresponding written description.

Referring to FIGS. 52-56, an appliance 10 in accordance with the present invention may include a tongue-retention feature 98. For example, in selected embodiments, an upper portion 12 of an appliance 10 may include, be connected to, or support a tongue-retention feature 98. A tongue-retention feature 98 may engage a tongue 100 of a patient so as to hold the tongue 100 in a forward position within the mouth of the patient. Accordingly, during sleep, a tongue-retention feature 98 may prevent a tongue 100 from falling back within the mouth of a patient and inhibiting breathing. Thus, a tongue-retention feature 98 may enable an appliance 10 to better combat sleep apnea.

In certain embodiments, a tongue-retention feature 98 may be a cavity into which a patient may insert his or her tongue 100. As a tongue 100 is inserted within a cavity defined by a tongue-retention feature 98, the air therewithin may be expelled. Accordingly, when a tongue 100 is fully seated within a tongue-retention feature 98, the moist exterior of the tongue 100 may interact with an interior surface 102 of the tongue-retention feature 98 to create a suction effect resisting extraction of the tongue 100 from the tongue-retention feature 98. In this manner, a tongue-retention feature 98 may hold a tongue 100 in a forward position until the suction effect is broken (e.g., broken by flexing, moving, or distorting a tongue 100 in a manner that permits air to pass between the tongue 100 and the tongue-retention feature 98).

A tongue-retention feature 98 may be shaped to create and preserve a desired suction effect. In selected embodiments, a tongue-retention feature 98 may have a somewhat conical shape. That is, a tongue-retention feature 98 may have an interior surface 102 that tapers out from a relatively narrow anterior tip 104 to a relatively wide posterior opening 106. In certain embodiments, a tongue-retention feature 98 may have a shape that resembles the forward portion of a tongue 100 of a patient. Accordingly, a tip 108 of a tongue 100 may comfortably fit within and fill an anterior tip 104, while a more-posterior portion of a tongue 100 may fit within (e.g., mostly or substantially fill) a posterior opening 106.

An interior surface 102 of a tongue-retention feature 98 may be shaped and configured to create and preserve a desired suction effect. In selected embodiments, an interior surface 102 may be smooth and rounded without discontinuities or other irregularities that may permit an unwanted ingress of air between the interior surface 102 and the exterior of a tongue 100 (e.g., an unwanted ingress that may break a suction effect). An interior surface 102 may also have a finish selected to provide a desired amount of suction (e.g., a higher gloss finish when or where more suction is needed or a lower gloss or rougher finish when or where less suction is needed).

In certain embodiments, a tongue-retention feature 98 may be formed by or between an upper (i.e., palatal) member 110 and a lower (i.e., sublingual) member 112. An upper member 110 may extend within and/or bridge across an upper dental arch. An upper member 110 may be sized, shaped, and positioned to contact a forward, upper surface of a tongue 100. In selected embodiments, an upper member 110 may track (e.g., be formed to closely follow or match) at least a portion of the hard palate 114 of a patient. Accordingly, an upper member 110 may minimally impinge on the space (i.e., the space within a mouth) occupied by a tongue 100. This may improve the comfort with which an appliance 10 comprising a tongue-retention feature 98 may be worn.

A lower member 112 may extend within and/or bridge across a lower dental arch. A lower member 112 may be sized, shaped, and positioned to contact a forward, lower surface of a tongue 100. Accordingly, a lower member 112 may extend proximate (e.g., proximate without impinging upon) an interior surface of an anterior region of the mandible of a patient. In selected embodiments, an upper member 110 may meet with, join, or blend into a lower member 112 at or near a corresponding base 20 (e.g., a base 20 corresponding to maxillary teeth 14).

Figure 57:
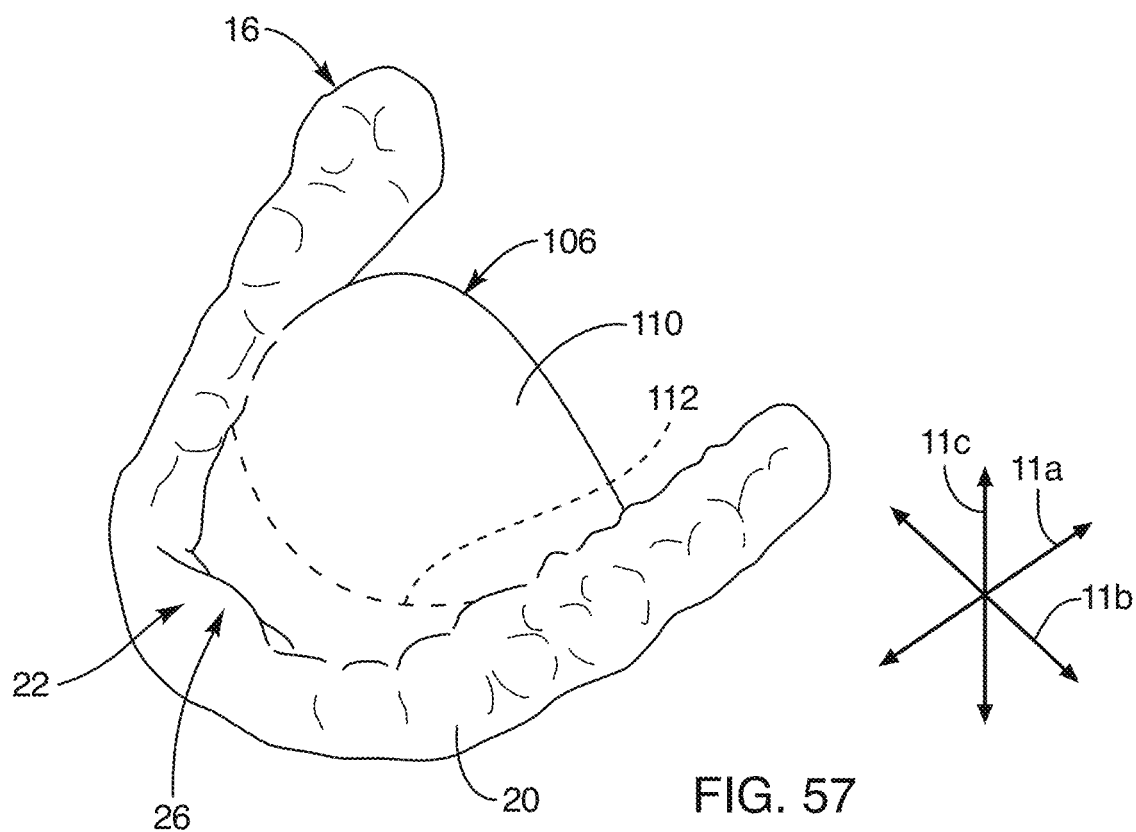
FIG. 57 is a perspective view of an alternative embodiment of a lower portion of a dental appliance, wherein the lower portion includes or is connected to a tongue-retention feature in accordance with the present invention.
Figure 58:
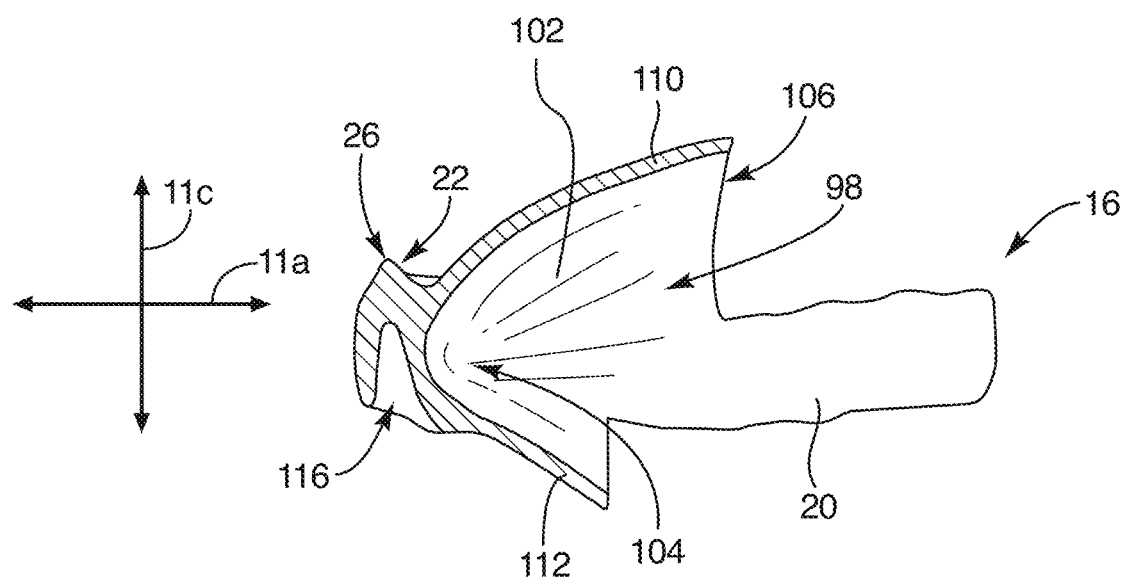
FIG. 58 is a cross-sectional side view of the lower portion and tongue-retention feature of FIG. 57.
Figure 59:
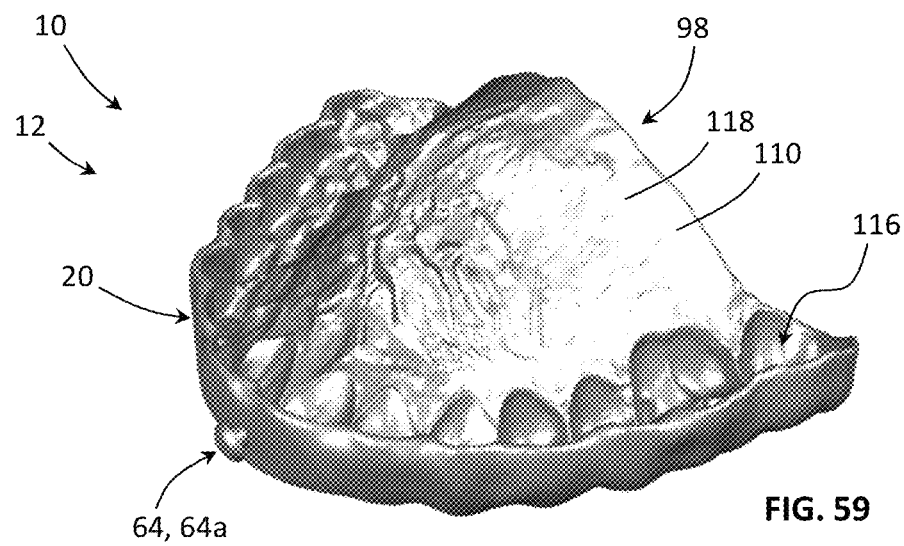
FIG. 59 is a perspective view of another alternative embodiment of an upper portion of a dental appliance in accordance with the present invention.
Figure 60:
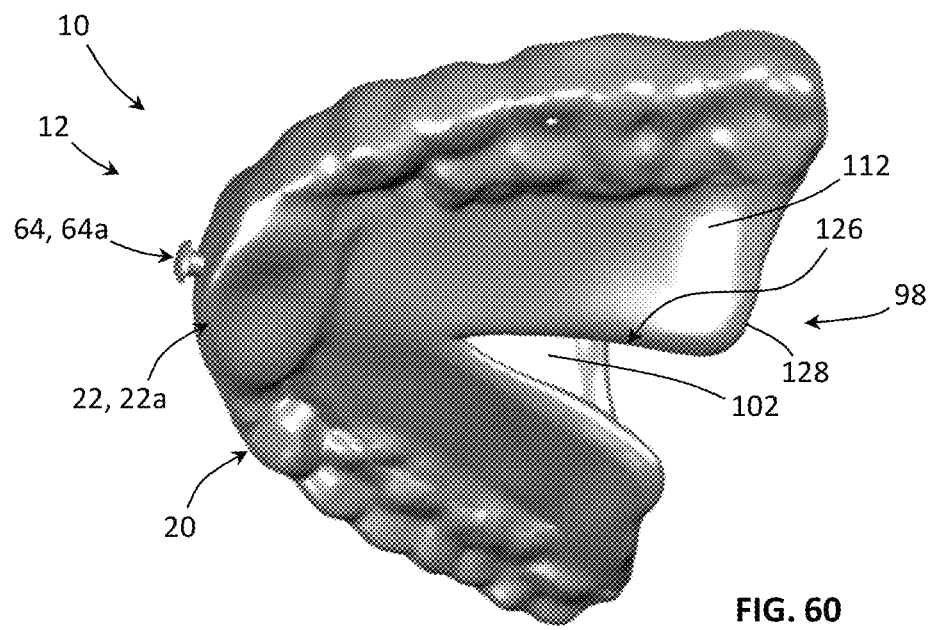
FIG. 60 is another perspective view of the upper portion of FIG. 59.
Figure 61:
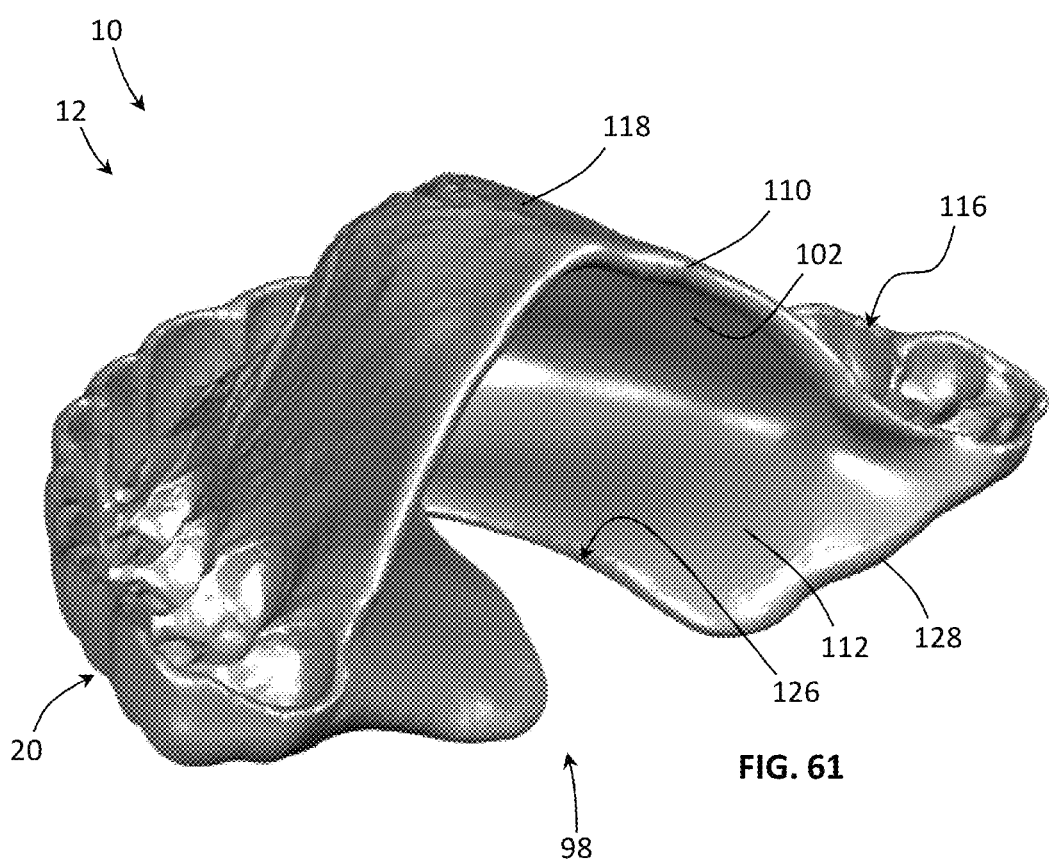
FIG. 61 is another perspective view of the upper portion of FIG. 59.
Figure 62:
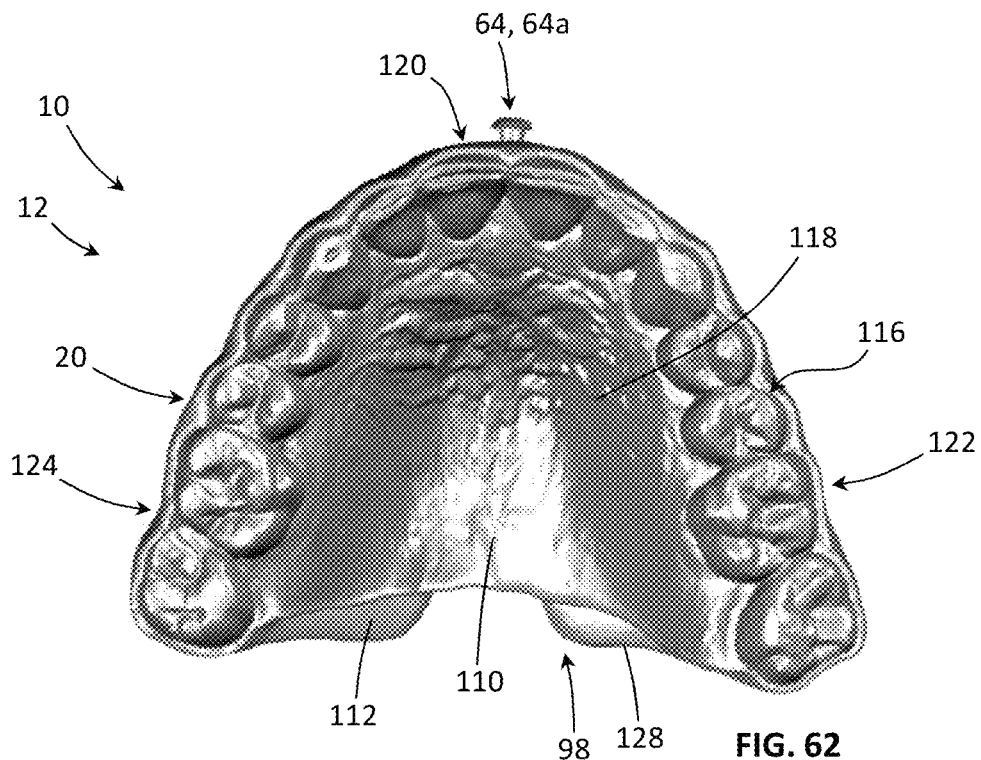
FIG. 62 is a top view of the upper portion of FIG. 59.
Figure 63:
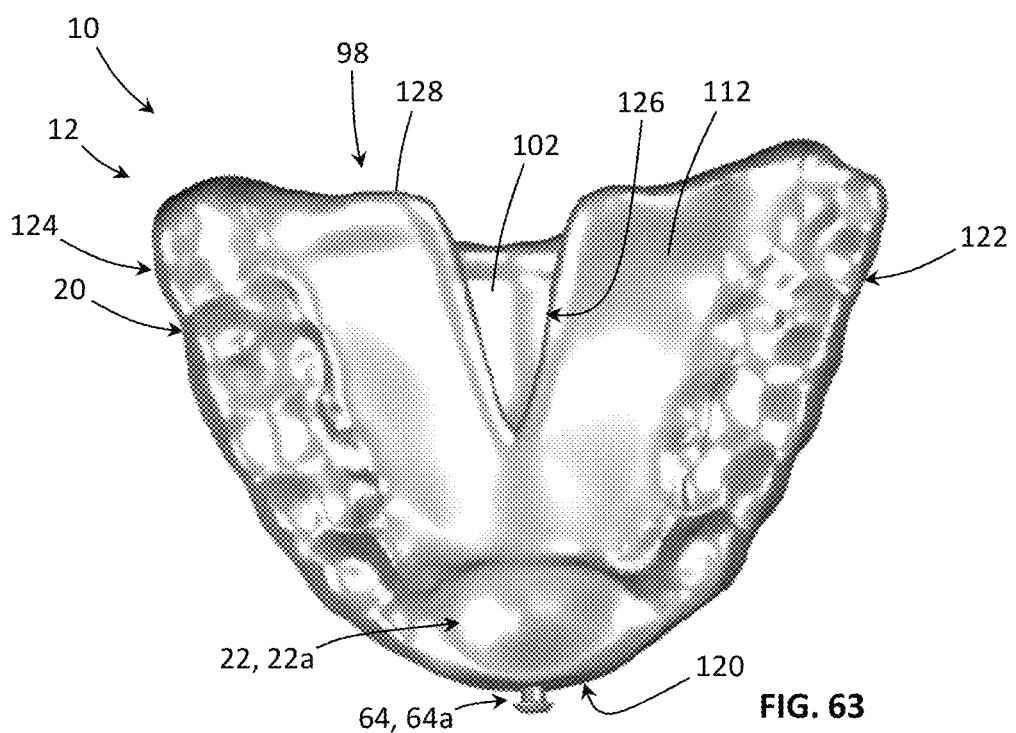
FIG. 63 is a bottom view of the upper portion of FIG. 59.
Figure 64:
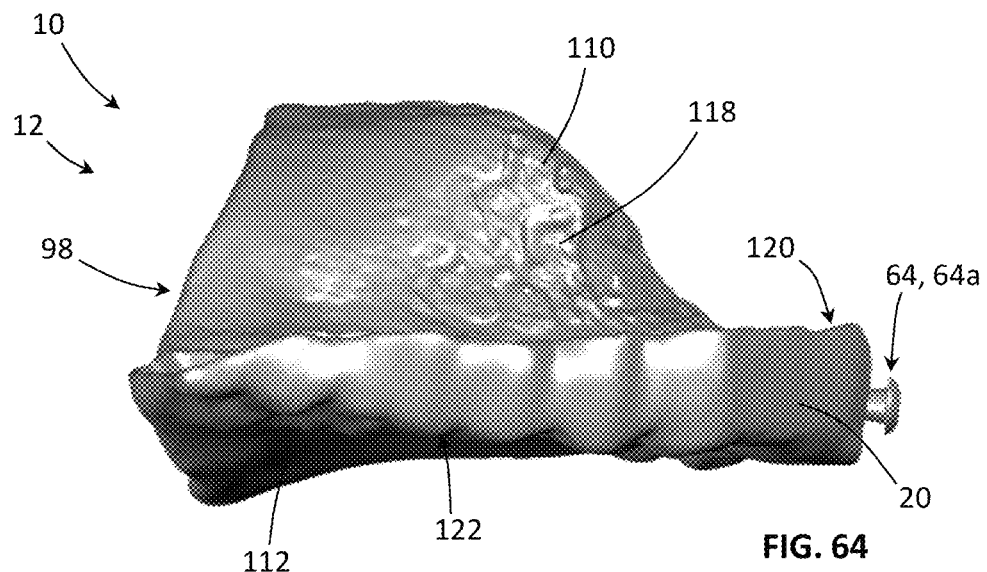
FIG. 64 is a right side view of the upper portion of FIG. 59.
Figure 65:
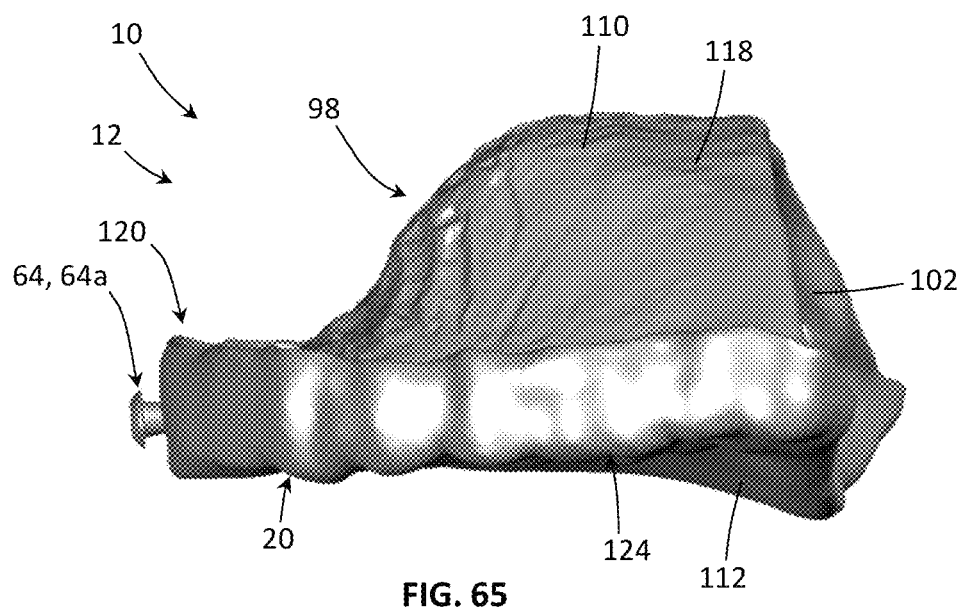
FIG. 65 is a left side view of the upper portion of FIG. 59.
Figure 66:
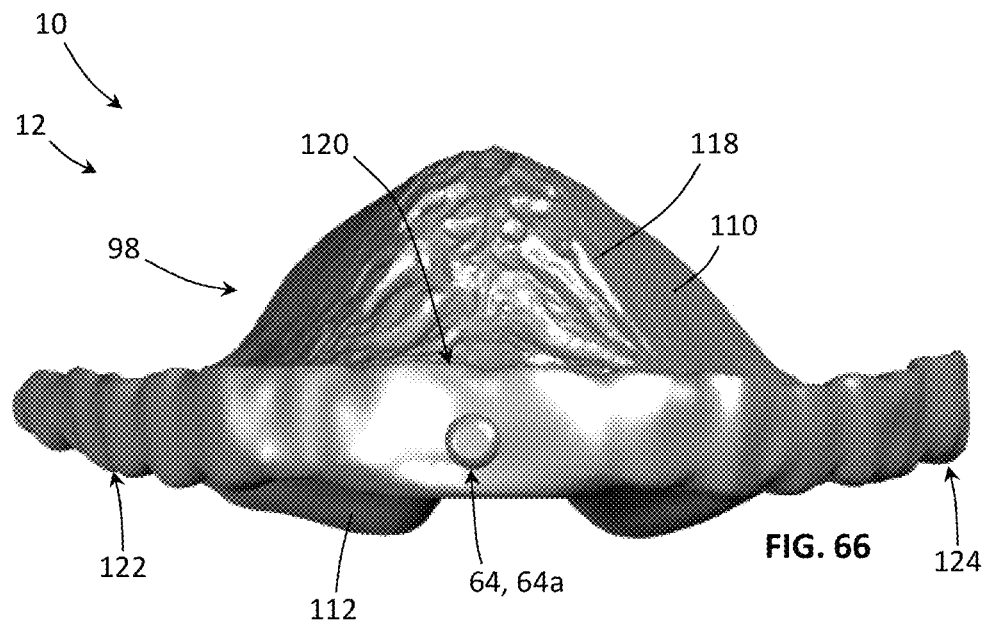
FIG. 66 is a front view of the upper portion of FIG. 59.
Figure 67:
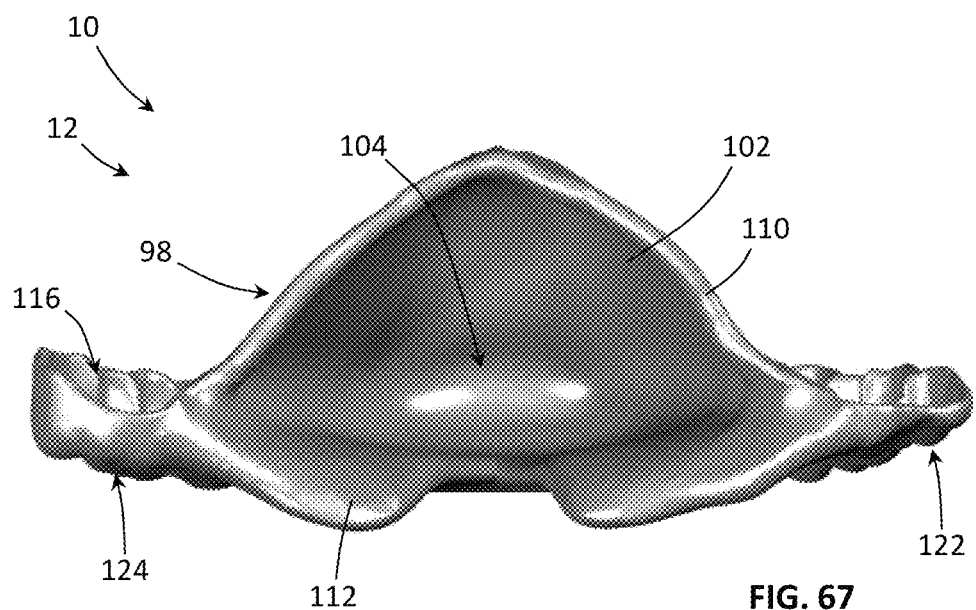
FIG. 67 is a rear view of the upper portion of FIG. 59.
Figure 68:
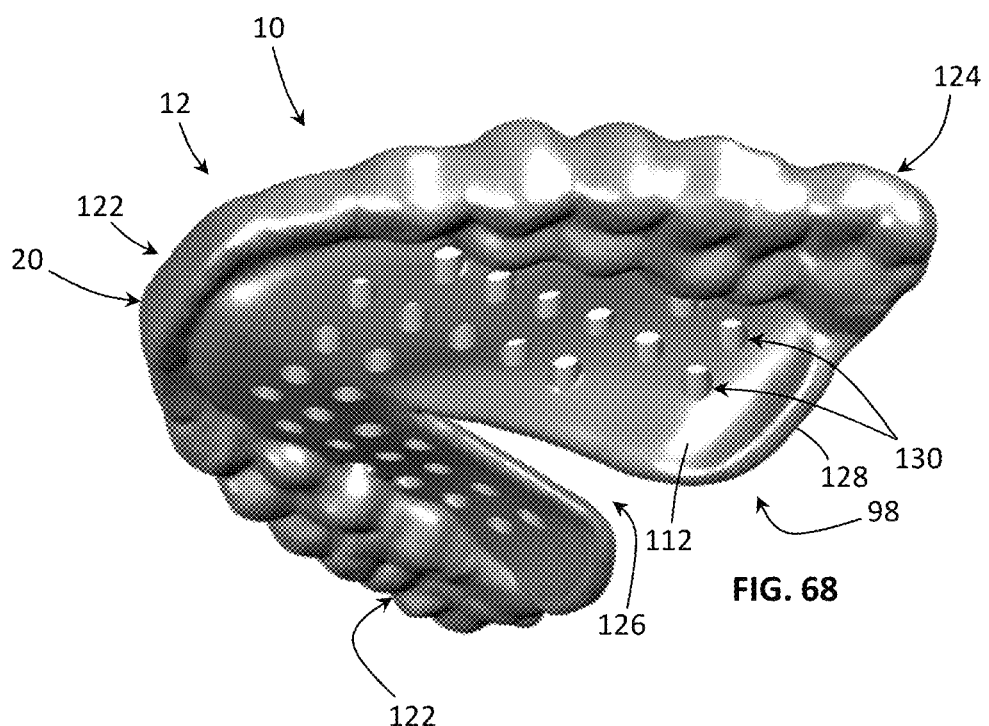
FIG. 68 is a perspective view of another alternative embodiment of a dental appliance in accordance with the present invention.
Figure 69:
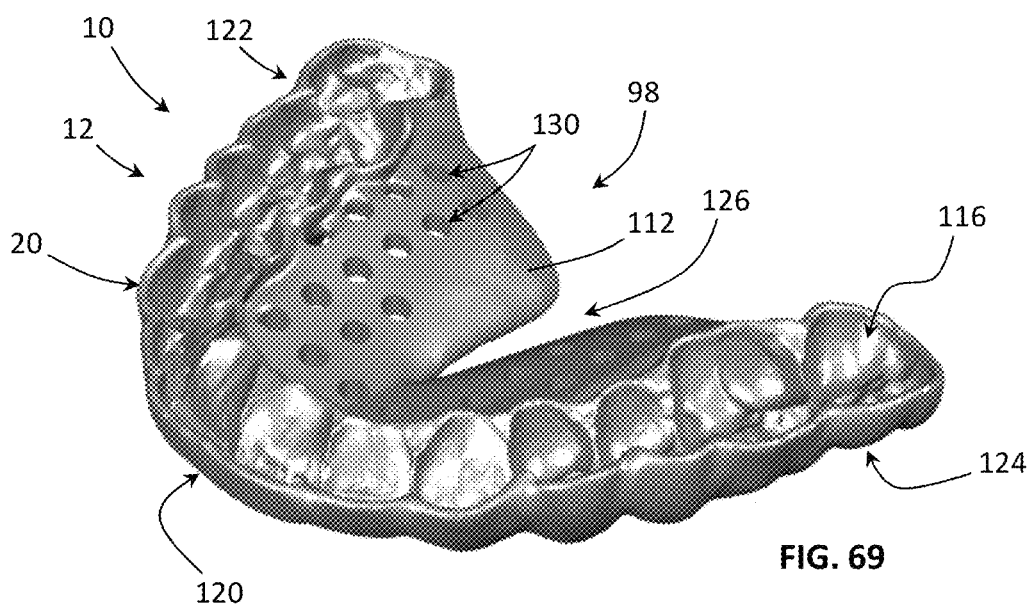
FIG. 69 is another perspective view of the dental appliance of FIG. 68.
Figure 70:
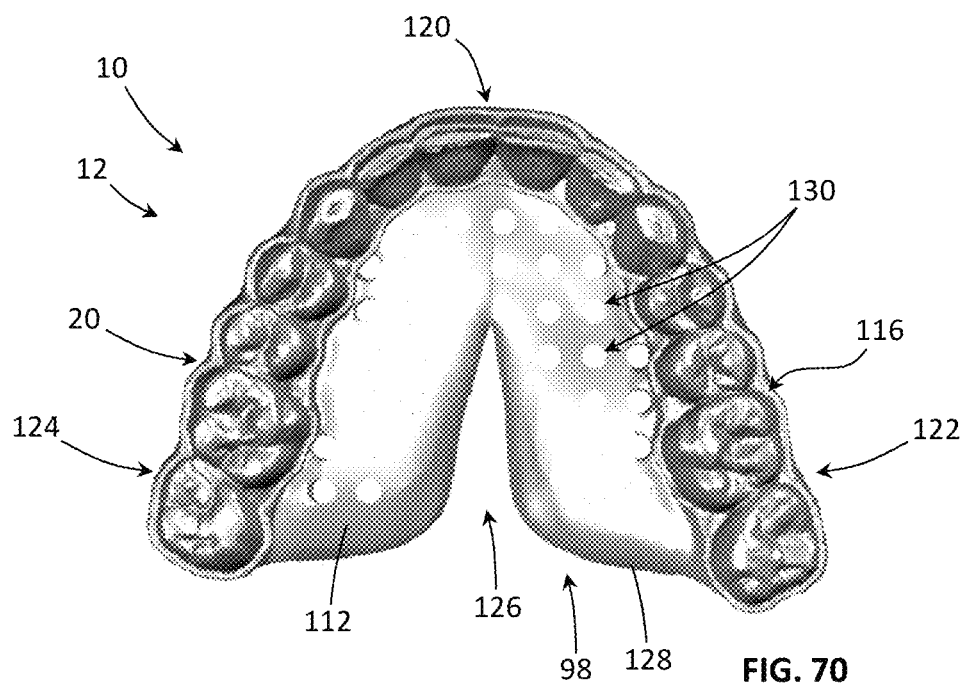
FIG. 70 is a top view of the dental appliance of FIG. 68.
Figure 71:
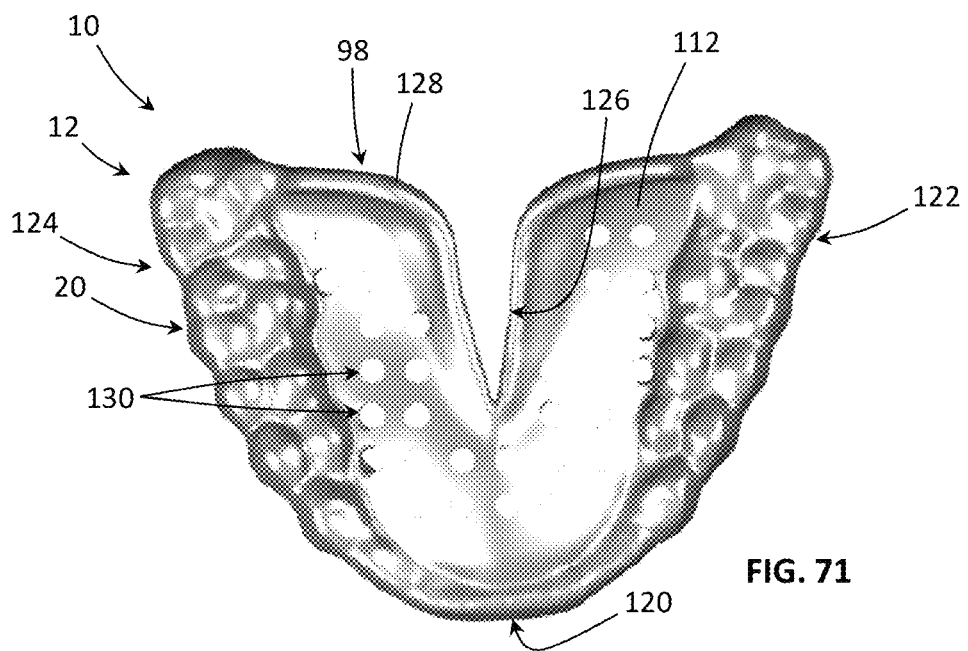
FIG. 71 is a bottom view of the dental appliance of FIG. 68.
Figure 72:
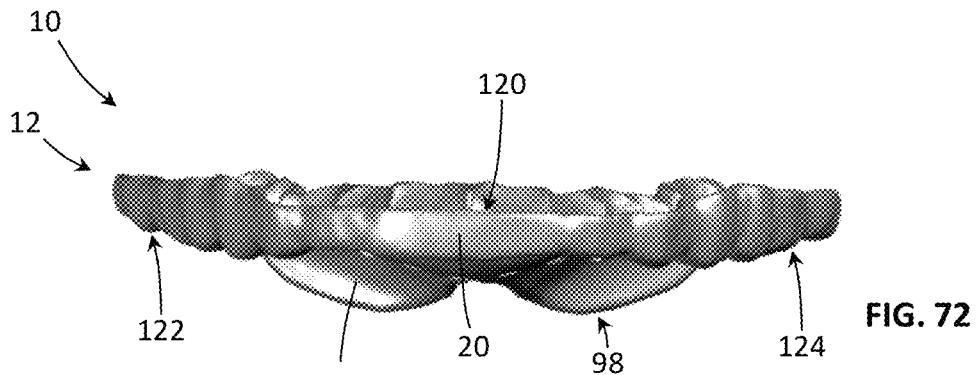
FIG. 72 is a front view of the dental appliance of FIG. 68.
Figure 73:
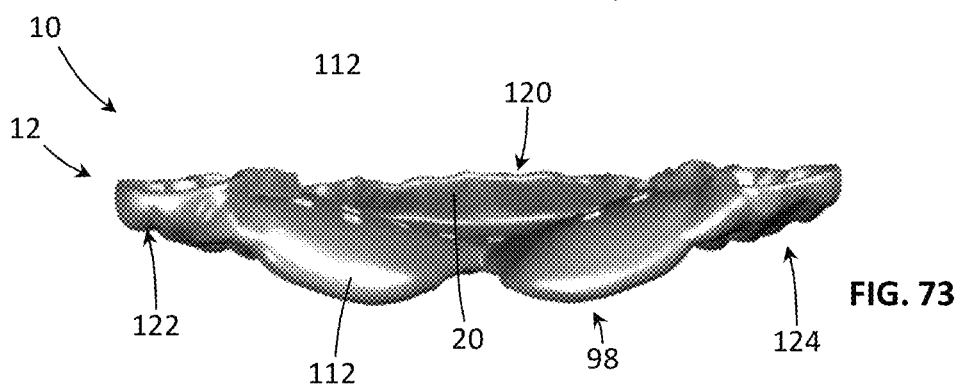
FIG. 73 is a rear view of the dental appliance of FIG. 68.
Figure 74:
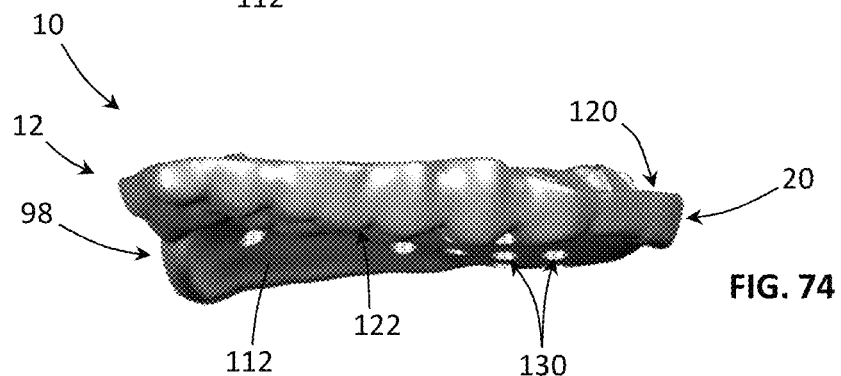
FIG. 74 is a right side view of the dental appliance of FIG. 68.
Figure 75:
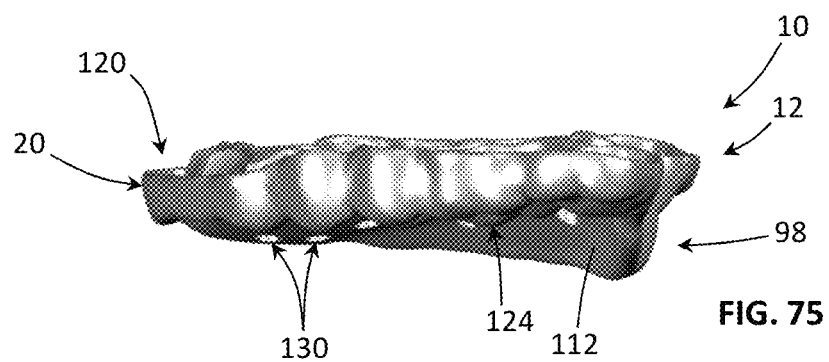
FIG. 75 is a left side view of the dental appliance of FIG. 68.

Referring to FIGS. 57 and 58, in certain embodiments, a lower portion 16 (rather than an upper portion 12) of an appliance 10 may include, be connected to, or support a tongue-retention feature 98. In such embodiments, a tongue-retention feature 98 may move with a mandible of a patient.

Referring to FIGS. 59-67, in selected embodiments, a dental appliance 10 may comprise a base 20 shaped to extend along at least a portion of an upper dental arch of a patient. Accordingly, a base 20 may have an arcuate shape or be referred to as an arcuate base 20.

A base 20 may be shaped to match with a custom fit at least certain maxillary teeth 14 of the patient. That is, a base 20 may have a cavity 116 formed therein that tracks (e.g., closely follows selected contours of) at least selected maxillary teeth 14 of a patient. This may enable a base 20 to hold itself in place by selectively engaging one or more maxillary teeth 14 of a patient. In certain embodiments, a base 20 may be shaped to match with a custom fit all maxillary teeth 14 of the patient.

A tongue-retention feature 98 may connect to a base 20. A tongue-retention feature 98 may comprise a palatal portion or member 110 and a sublingual portion or member 112. A sublingual portion 112 may cooperate with a palatal portion 110 to form a cavity shaped to receive an anterior portion of a tongue 100 of the patient therewithin. A palatal portion 110 may have an exterior surface 118 custom formed to match at least a portion of a hard palate of the patient. Accordingly, an interior surface 102 of a palatal portion 110 may be smoother (e.g., have a smoother surface finish) than an exterior surface 118 of the palatal portion 110.

In selected embodiments, a base 20 and tongue-retention feature 98 may form a complete dental appliance 10. That is, acting alone, a base 20 and tongue-retention feature 98 may provide all of the functionality of a dental appliance 10. Alternatively, a base 20 and tongue-retention feature 98 may form an upper portion 12 of a dental appliance 10. In such embodiments, a lower portion 16 may also form part of the dental appliance 10.

For example, in certain embodiments, a first feature 22a may be positioned on an anterior area of a base 20. A first feature 22a may be positioned opposite a second feature 22b of a lower portion 16. Accordingly, mandibular motion of a patient (e.g., biting down) may result in a first feature 22a contacting a second feature 22b to produce one or more of the benefits explained hereinabove. Alternatively, or in addition thereto, an engagement mechanism 64 may connect to a base 20. Accordingly, mandibular motion or position of a patient may be influenced by one or more biasing members 62 extending from a lower portion 16 as explained hereinabove.

In selected embodiments, a dental appliance 10 or an upper portion 12 of a dental appliance 10 (e.g., a base 20, tongue-retention feature 98, first feature 22a, engagement mechanism 64, or the like or a combination or sub-combination thereof) may be a seamless unit formed in an additive manufacturing process.

In certain embodiments, a base may comprise an anterior portion 120, a right portion 122 extending distally away from the anterior portion 120, and a left portion 124 extending distally away from the anterior portion 120. A palatal portion 110 may seamlessly extend from a lingual side of the right portion 122 to a lingual side of the left portion 124. A palatal portion 110 may further seamlessly extend from a lingual side of the anterior portion 120.

A sublingual portion 112 may seamlessly extend from a lingual side of the right portion 122 and seamlessly extend from a lingual side of the left portion 124. A sublingual portion 112 may further seamlessly extend from a lingual side of the anterior portion 120. In selected embodiments, a sublingual portion 112 may comprise a central notch 126 extending forward from a posterior extreme 128 of the sublingual portion 112 to provide clearance for a lingual frenulum of the patient. In certain embodiments, a posterior extreme 128 of a sublingual portion 112 may be rounded or curve or curl downward to enable a tongue 100 of a patient to more comfortably extend over the posterior extreme 128 and onto the sublingual portion 112.

Referring to FIGS. 66-75, a tongue-retention feature 98 may be formed or defined by a sublingual portion 112 extending under an anterior portion of a tongue 100. In certain embodiments, a sublingual portion 112 may cooperate with a hard palate 114 of a patient to form a cavity for receiving and suctionally engaging an anterior portion of the tongue 100. Accordingly, in selected embodiments, a palatal portion 110 may be omitted. In the illustrated embodiment, a first feature 22a and an engagement mechanism 64 are also omitted.

In certain applications of an appliance 10 in accordance with the present invention, a lifting of a tongue 100 (rather than a suction effect) may be the desired result for a tongue-retention feature 98. For example, during athletic activity (e.g., running, cycling, or the like), it may be desired to lift a tongue 100 (e.g., hold an anterior portion of a tongue up against the hard palate 114) without creating a suction effect or without blocking off an underside of the tongue 100 from being moistened with saliva. Accordingly, in selected embodiments, a sublingual portion 112 may be perforated by one or more apertures 130. The number of, size of, and spacing between such apertures 130 may be selected to provide a desired reduction in a suction effect and/or a desired moistening of an underside of the tongue 100.

Figure 76:
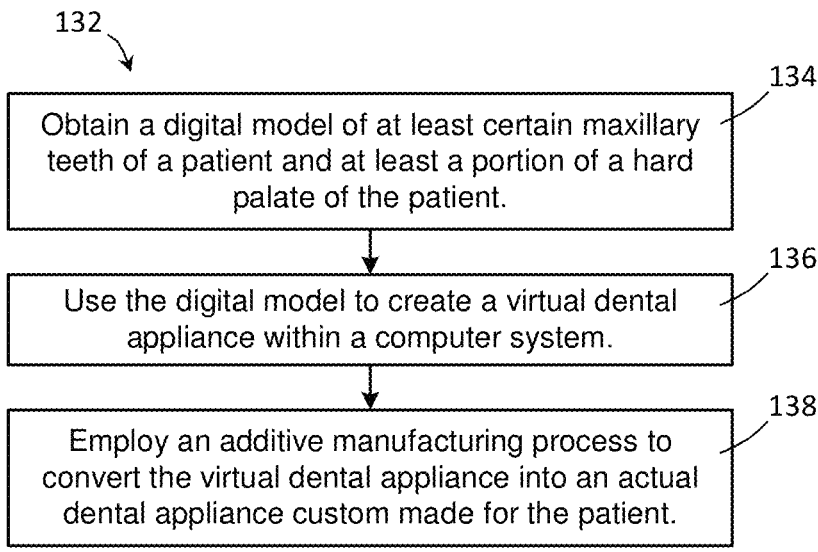
FIG. 76 is a schematic block diagram of one embodiment of a method for manufacturing a dental appliance in accordance with the present invention.

Referring to FIG. 76, an appliance 10 having a tongue-retention feature 98 in accordance with the present invention may be manufactured in any suitable manner. In selected embodiments, a method 132 of manufacture may use three dimensional printing (i.e., an additive manufacturing process) to produce a base 20, anterior feature 22, engagement mechanism 64, tongue-retention feature 98, or the like or a combination or sub-combination thereof as a monolithic (i.e., seamless) unit.

For example, a three dimensional image of a patient's mouth may be obtained 134 via a digital scan. The three dimensional image may be a digital model of at least certain maxillary teeth 14 of a patient and at least a portion of a hard palate 114 of the patient. Such an image or model may be used 136 to create a virtual dental appliance 10 within a computer system. For example, a three dimensional image or model may be imported into a computer-aided drafting (CAD) application, a computer-aided drafting and manufacturing (CAD/CAM) application, or the like where it may be used 136 as a basis or template for creating a virtual base 20 or a combination of a virtual base 20 and a virtual palatal portion 110.

Once a virtual dental appliance 10 or some independent part thereof (e.g., a virtual upper portion 12 of a dental appliance 10) is properly created 136, it may be printed in a polymeric material using a three dimensional printing process. That is, an additive manufacturing process may be employed 138 to convert a virtual dental appliance 10 into an actual dental appliance 10 custom made for the patient.

Figure 77:
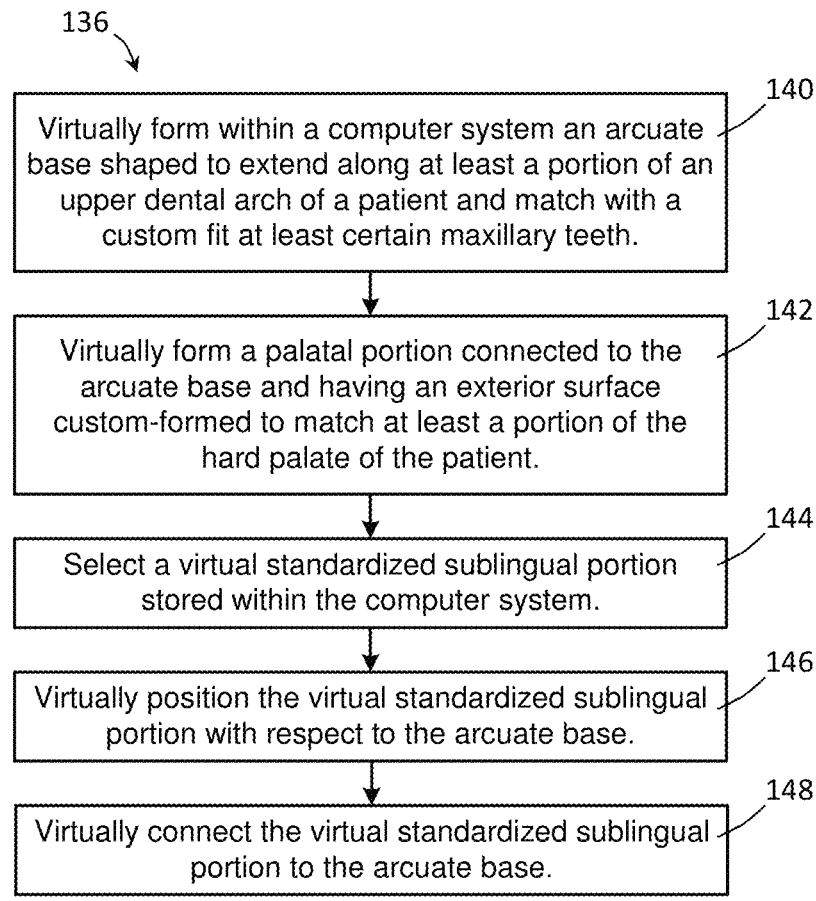
FIG. 77 is a schematic block diagram of one embodiment of a method for creating a virtual dental appliance in accordance with the present invention.
Figure 78:
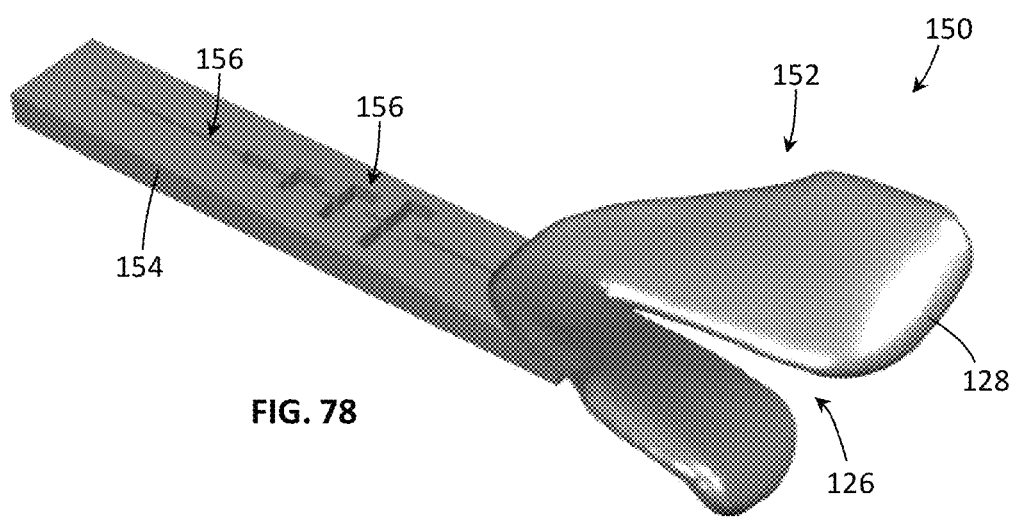
FIG. 78 is a perspective view of a tool in accordance with the present invention.
Figure 79:
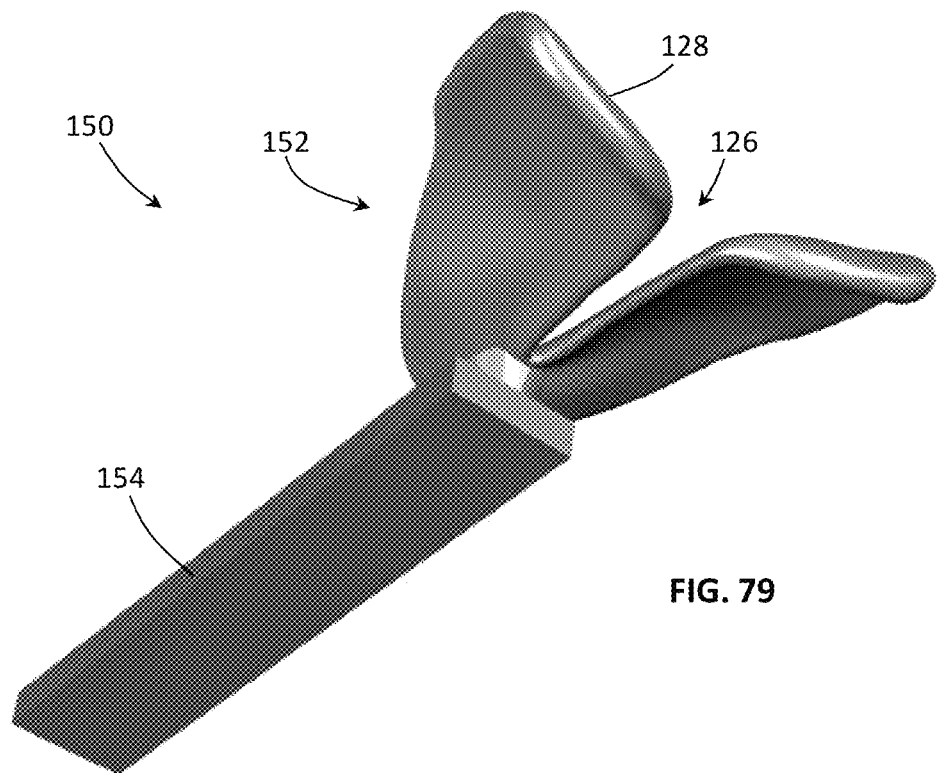
FIG. 79 is another perspective view of the tool of FIG. 78.
Figure 80:
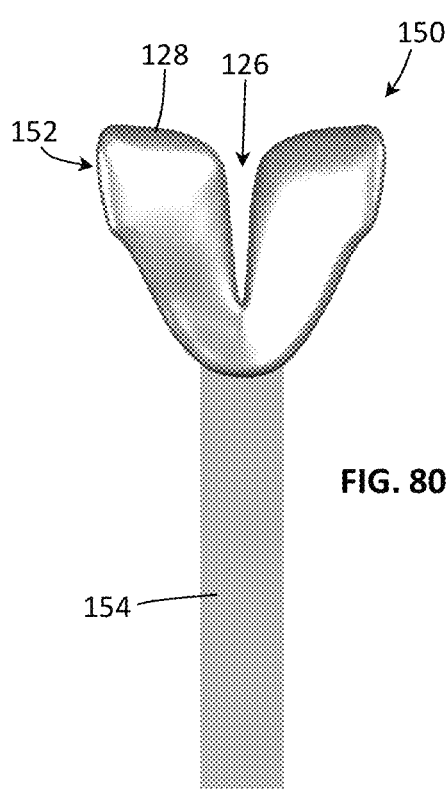
FIG. 80 is a top view of the tool of FIG. 78.
Figure 81:
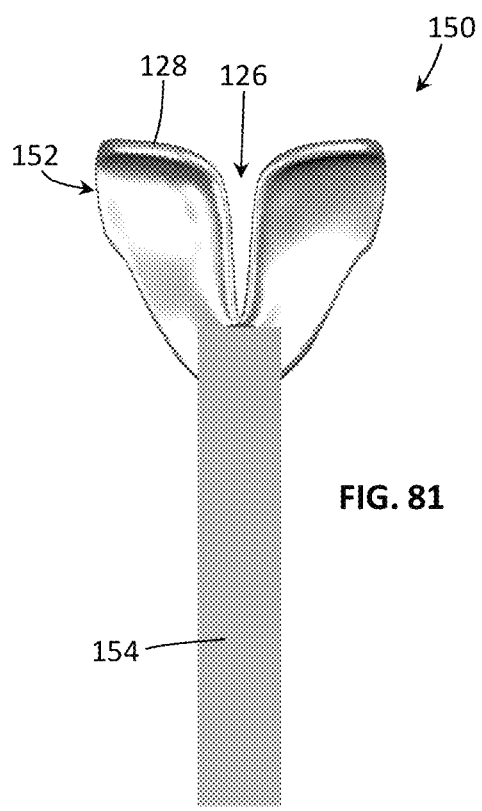
FIG. 81 is a bottom view of the tool of FIG. 78.
Figure 82:
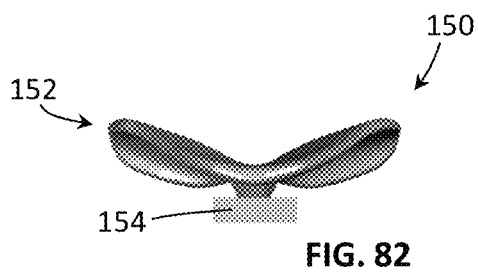
FIG. 82 is a front view of the tool of FIG. 78.
Figure 83:
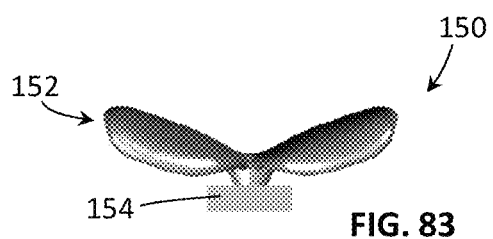
FIG. 83 is a rear view of the tool of FIG. 78.
Figures 84, 85:
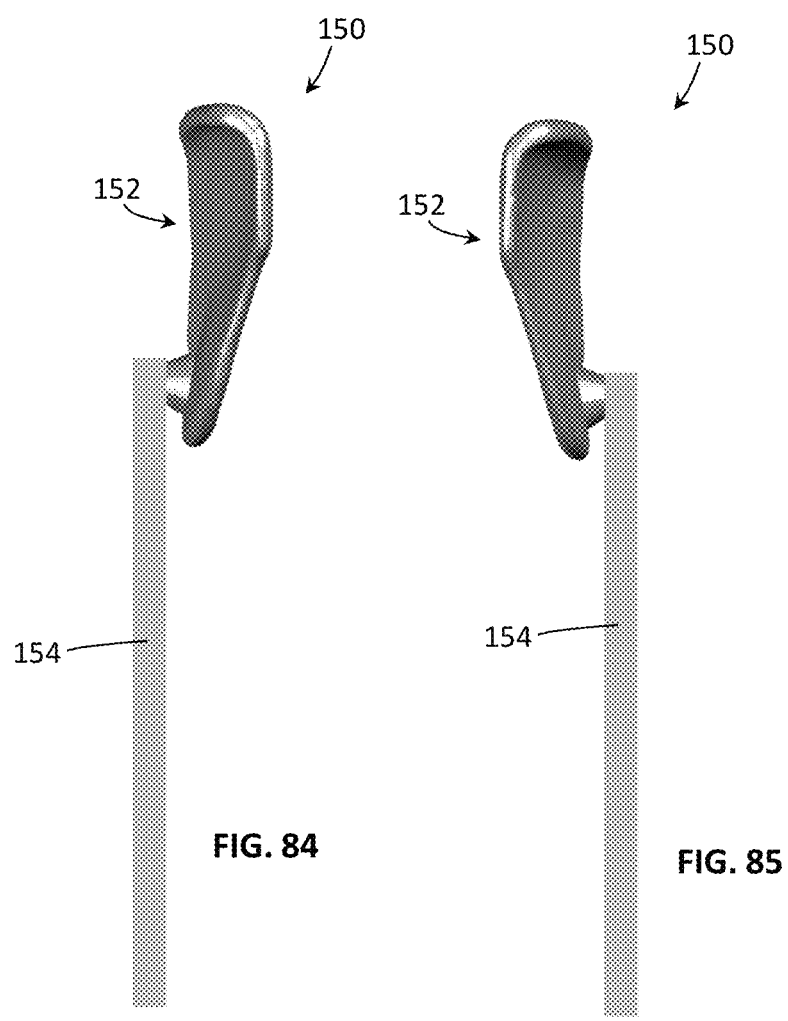
FIG. 84 is a right side view of the tool of FIG. 78.
FIG. 85 is a left side view of the tool of FIG. 78.
Figure 86:
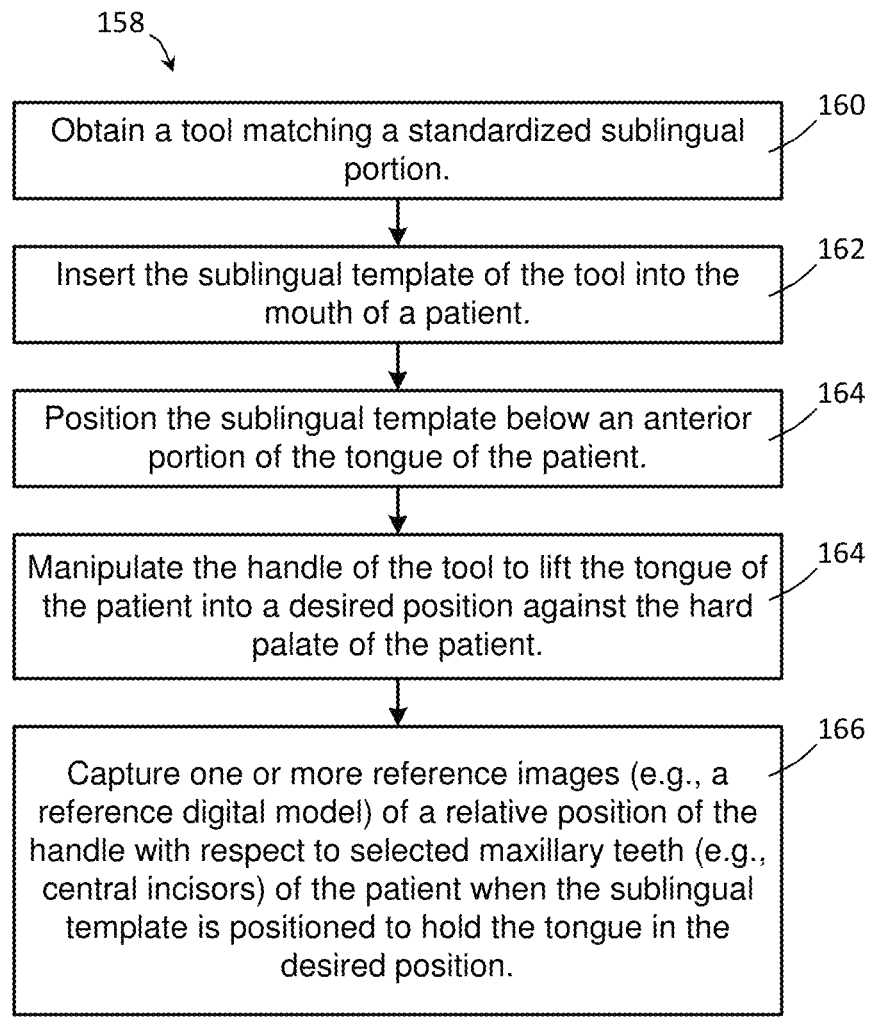
FIG. 86 is a schematic block diagram of one embodiment of a method in accordance with the present invention for using the tool of FIG. 78.

Referring to FIG. 77, using 136 a digital model to create a virtual dental appliance 10 within a computer system may involve multiple steps or processes. In selected embodiments, such using 136 may include one or more of: (1) virtually forming 140 within a computer system a base 20 (e.g., an arcuate base 20) shaped to extend along at least a portion of an upper dental arch of a patient and match with a custom fit at least certain maxillary teeth 14; (2) virtually forming 142 a palatal portion 110 connected to the base 20 and having an exterior surface 118 custom-formed to match at least a portion of the hard palate 114 of the patient; (3) selecting 144 a virtual standardized sublingual portion 112 stored within the computer system; (4) virtually positioning 146 the standardized sublingual portion 112 with respect to the base 20; and (5) virtually connecting 148 the standardized sublingual portion 112 to the base 20.

In certain embodiments, the step or process of virtually forming 142 a palatal portion 110 may be omitted when that component is not to be included within the dental appliance 10. In selected embodiments, virtually connecting 148 a standardized sublingual portion 112 to a base 20 may include filling and/or smoothing one or more interfaces and/or junctions therebetween so as to provide the desired comfort, strength, and functionality in the actual appliance 10.

Using 136 a digital model to create a virtual dental appliance 10 within a computer system may involve using a CAD application, CAD/CAM application, or the like. In selected embodiments, such using 136 may further include employing a CAD or CAD/CAM application to import an anterior feature 22 (e.g., a first feature 22a) into the three dimensional model (e.g., into a virtual dental appliance 10). The anterior feature 22 may be a predefined, standard part. Accordingly, it may be imported and located as desired. A CAD or CAD/CAM application may be further used to import an engagement mechanism 64 into the three dimensional model. The engagement mechanism 64 may also be a predefined, standard part. Accordingly, it may be imported and located as desired.

In certain alternative embodiments, a CAD application, a CAD/CAM application, or the like to create may be used to a custom sublingual portion 112. Accordingly, a sublingual portion 112 may be created for each patient with such an application. In such embodiments, creating, sizing, shaping, and/or positioning a sublingual portion 112 may replace certain steps 144, 146, 148 of the method 136 disclosed above.

Referring to FIGS. 78-86, in selected embodiments, a tool 150 may assist in determining how to virtually position 146 a standardized sublingual portion with respect to a base 20. A tool 150 may be an actual version of a standardized sublingual portion 112. Accordingly, in certain embodiments, both a tool 150 and a standardized sublingual portion 112 may include a sublingual template 152, and a handle 154 connected to the sublingual template 152.

A sublingual template 152 may include a notch 126, rounded or curled posterior edge 128, and the like just like a finished sublingual portion 112. In certain embodiments, a handle 154 may be an elongated member extending forward away from a front end of a corresponding sublingual template 152. A handle 154 may include one or more structures 156 (e.g., markings or indentations) formed therein or thereon.

A method 158 for using a tool 150 may include one or more of: (1) obtaining a tool 150 matching a standardized sublingual portion 112; (2) inserting the sublingual template 152 portion of the tool 150 into the mouth of a patient; (3) positioning the sublingual template 152 below an anterior portion of the tongue 100 of the patient; (4) manipulating the handle 154 of the tool to lift the tongue 100 of the patient into a desired position against the hard palate 114 of the patient; and (5) capturing one or more reference images (e.g., a reference digital model) of a relative position of the handle 154 with respect to selected maxillary teeth 14 (e.g., central incisors) of the patient when the sublingual template 152 is positioned to hold the tongue in the desired position.

Once one or more references images or a reference digital model are captured, they or it may be used to virtually position 146 a standardized sublingual portion 112. For example, within the previously disclosed embodiments of a method 136 in accordance with the present invention, positioning 146 a standardized sublingual portion 112 may become: (1) virtually positioning the virtual standardized sublingual portion 112 so that the handle 154 thereof is positioned with respect to virtual maxillary teeth 14 of the patient the same as the handle 154 and teeth 14 in the one or more reference images or the reference digital model; and (2) virtually deleting the handle 154. In certain embodiments, one or more structures 156 on a handle 154 may provide visual markers that aid (e.g., aid a human or computer) in virtually positioning the virtual standardized sublingual portion 112 so that the handle 154 thereof is positioned with respect to virtual maxillary teeth 14 of the patient the same as the handle 154 and teeth 14 in the one or more reference images or the reference digital model. Accordingly, a tool 150 may enable a dental professional or the like to position a sublingual template 152 in a position that works for a patient (e.g., is comfortable for the patient and positions the tongue 100 of the patient in a desired position) and then reliably replicate that position in a virtual space.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
   obtaining a digital model of at least certain maxillary teeth of a patient and at least a portion of a hard palate of the patient; and
   using the digital model to create a virtual dental appliance within a computer system, the using comprising
   virtually forming a first arcuate base shaped to extend along at least a portion of an upper dental arch of the patient and match, with a custom fit, the at least certain maxillary teeth, virtually forming a palatal portion connected to the first arcuate base, the palatal portion having an exterior surface custom-formed to match the at least a portion of the hard palate,
   selecting a standardized sublingual portion stored within the computer system,
   virtually positioning the standardized sublingual portion with respect to the palatal portion such that the standardized sublingual portion cooperates with the palatal portion to create a cavity shaped to receive an anterior portion of a tongue of the patient therewithin, and
   virtually connecting the standardized sublingual portion to at least one of the first arcuate base and the palatal portion.

2. The method of claim 1, further comprising employing an additive manufacturing process to convert the virtual dental appliance into an actual dental appliance custom made for the patient.

3. The method of claim 1, further comprising obtaining an actual version of the standardized sublingual portion.

4. The method of claim 3, further comprising inserting the actual version of the standardized sublingual portion into a mouth of the patient.

5. The method of claim 4, further comprising manipulating a handle of the actual version of the standardized sublingual portion to position a sublingual template thereof below the tongue of the patient and to lift the tongue of the patient into a desired position against the hard palate.

6. The method of claim 5, further comprising digitally capturing an actualized position of the handle with respect to maxillary teeth of the patient while the actual version of the standardized sublingual portion holds the tongue of the patient in the desired position against the hard palate.

7. The method of claim 6, wherein the standardized sublingual portion stored within the computer system comprises a virtual version of the handle.

8. The method of claim 7, wherein the virtually positioning the standardized sublingual portion comprises virtually positioning the virtual version of the handle with respect to maxillary teeth of the patient to match the actualized position.

9. The method of claim 8, wherein the virtually connecting the standardized sublingual portion comprises deleting the virtual version of the handle.

10. The method of claim 9, wherein the virtually connecting the standardized sublingual portion further comprises virtually smoothing a transition between the standardized sublingual portion and the at least one of the first arcuate base and the palatal portion.

11. A dental appliance comprising:
- an arcuate base shaped to extend along at least a portion of an upper dental arch of a patient and match, with a custom fit, at least certain maxillary teeth of the patient;
- a tongue-retention feature connected to the arcuate base and comprising a palatal portion and a sublingual portion, the sublingual portion cooperating with the palatal portion to form a cavity shaped to receive an anterior portion of a tongue of the patient therewithin; and
- the tongue-retention feature wherein the palatal portion has an exterior surface custom formed to match at least a portion of a hard palate of the patient.

12. The dental appliance of claim 11, wherein the dental appliance is a seamless unit formed in an additive manufacturing process.

13. The dental appliance of claim 12, wherein the arcuate base is configured to match, with a custom fit, all of the upper teeth of the patient.

14. The dental appliance of claim 13, wherein the arcuate base comprises an anterior portion, a right portion extending distally away from the anterior portion, and a left portion extending distally away from the anterior portion.

15. The dental appliance of claim 14, wherein the palatal portion seamlessly extends from a lingual side of the right portion to a lingual side of the left portion.

16. The dental appliance of claim 15, wherein the palatal portion seamlessly extends from a lingual side of the anterior portion.

17. The dental appliance of claim 16, wherein the sublingual portion seamlessly extends from the lingual side of the right portion and seamlessly extends from the lingual side of the left portion.

18. The dental appliance of claim 17, wherein the sublingual portion seamlessly extends from a lingual side of the anterior portion.

19. The dental appliance of claim 18, wherein the sublingual portion comprises a central notch extending forward from a posterior extreme of the sublingual portion to provide clearance for a lingual frenulum of the patient.

20. The dental appliance of claim 19, wherein an interior surface of the palatal portion is smoother than the exterior surface of the palatal portion.

* * * * *